(12) United States Patent
Jessop et al.

(10) Patent No.: US 11,498,853 B2
(45) Date of Patent: Nov. 15, 2022

(54) WATER WITH SWITCHABLE IONIC STRENGTH

(71) Applicant: QUEEN'S UNIVERSITY AT KINGSTON, Kingston (CA)

(72) Inventors: Philip G. Jessop, Kingston (CA); Sean M. Mercer, Halifax (CA); R. Stephen Brown, Kingston (CA); Tobias Robert, Kingston (CA)

(73) Assignee: QUEEN'S UNIVERSITY AT KINGSTON

( * ) Notice: Subject to any disclaimer, the term of this patent is extended or adjusted under 35 U.S.C. 154(b) by 314 days.

(21) Appl. No.: 16/279,221

(22) Filed: Feb. 19, 2019

(65) Prior Publication Data

US 2019/0315637 A1    Oct. 17, 2019

Related U.S. Application Data

(63) Continuation of application No. 13/578,290, filed as application No. PCT/CA2011/050075 on Feb. 10, 2011, now abandoned.
(Continued)

(51) Int. Cl.
  *C02F 1/44* (2006.01)
  *B01D 61/00* (2006.01)
  (Continued)

(52) U.S. Cl.
  CPC ............. *C02F 1/44* (2013.01); *B01D 61/002* (2013.01); *B01D 61/005* (2013.01); *C02F 1/008* (2013.01);
  (Continued)

(58) Field of Classification Search
  None
  See application file for complete search history.

(56) References Cited

U.S. PATENT DOCUMENTS 2,630,386 A   3/1953  Walker
2,712,531 A   7/1955  Maguire
(Continued)

FOREIGN PATENT DOCUMENTS

CA   2116288   11/1997
CA   2539418    9/2007
(Continued)

OTHER PUBLICATIONS

McCann et al. (J. Phys. Chem. A., 2009, 113, 5022-5029). (Year: 2009).*
(Continued)

*Primary Examiner* — Clare M Perrin
(74) *Attorney, Agent, or Firm* — Kathleen D. Rigaut; Howson & Howson LLP

(57) ABSTRACT

A method and system for reversibly converting water between an initial ionic strength and an increased ionic strength, using a switchable additive, is described. The disclosed method and system can be used, for example, in distillation-free removal of water from solvents, solutes, or solutions. Following extraction of a solute from a medium by dissolving it in water, the solute can then be isolated from the aqueous solution or "salted-out" by converting the water to a solution having an increased ionic strength. The solute then separates from the increased ionic strength solution as a separate phase. Once the solute is, for example, decanted off, the increased ionic strength aqueous solution can be converted back to water having its original ionic strength and reused. Switching from lower to higher ionic strength is readily achieved using low energy methods such as bubbling with $CO_2$, $CS_2$ or COS. Switching from higher to lower ionic strength is readily achieved using low energy methods such as bubbling with air, heating, agitating, introducing a vacuum or partial vacuum, or any combination or thereof.

20 Claims, 16 Drawing Sheets

Related U.S. Application Data

(60) Provisional application No. 61/303,170, filed on Feb. 10, 2010, provisional application No. 61/423,458, filed on Dec. 15, 2010.

(51) Int. Cl.
| | |
|---|---|
| *C02F 1/00* | (2006.01) |
| *C02F 1/68* | (2006.01) |
| C02F 1/20 | (2006.01) |
| C02F 103/08 | (2006.01) |
| C02F 103/10 | (2006.01) |
| C02F 1/52 | (2006.01) |
| B01D 61/02 | (2006.01) |
| C02F 1/02 | (2006.01) |

(52) U.S. Cl.
CPC ............... *C02F 1/445* (2013.01); *C02F 1/68* (2013.01); *B01D 61/025* (2013.01); *C02F 1/02* (2013.01); *C02F 1/5281* (2013.01); *C02F 2209/05* (2013.01); *Y02A 20/131* (2018.01)

(56) References Cited

U.S. PATENT DOCUMENTS

| | | |
|---|---|---|
| 2,801,217 A | 7/1957 | Nelson |
| 2,812,333 A | 11/1957 | Steele |
| 2,949,427 A | 8/1960 | Andersen et al. |
| 3,060,007 A | 10/1962 | Freedman |
| 3,088,909 A | 5/1963 | Hood |
| 3,130,156 A | 4/1964 | Neff |
| 3,143,461 A | 8/1964 | Sidney |
| 3,171,799 A | 3/1965 | Batchelder |
| 3,231,487 A | 1/1966 | Nettles |
| 3,228,956 A | 11/1966 | Monroe |
| 3,385,891 A | 5/1968 | Fenton |
| 3,444,931 A | 5/1969 | Braden |
| 3,598,800 A | 8/1971 | Gatz |
| 3,796,266 A | 3/1974 | Carlin |
| 3,882,940 A | 5/1975 | Carlin |
| 3,884,974 A | 5/1975 | Heffe |
| 3,923,668 A | 12/1975 | Johnston |
| 3,925,201 A | 12/1975 | Nowak et al. |
| 4,079,166 A | 3/1978 | Gibson et al. |
| 4,434,249 A | 2/1984 | Ballestrasse et al. |
| 4,434,850 A | 3/1984 | McCoy |
| 4,499,274 A | 2/1985 | Feth et al. |
| 4,591,447 A | 5/1986 | Kubala |
| 4,605,773 A | 8/1986 | Maloney |
| 4,623,678 A | 11/1986 | Moore et al. |
| 4,770,670 A | 9/1988 | Hazbun et al. |
| 5,176,797 A | 1/1993 | Hartan et al. |
| 5,308,869 A | 5/1994 | Keana et al. |
| 5,435,920 A | 7/1995 | Penth |
| 5,457,083 A | 10/1995 | Muia et al. |
| 5,472,638 A | 12/1995 | McLaughlin |
| 5,905,061 A | 5/1999 | Patel |
| 5,977,031 A | 11/1999 | Patel |
| 6,022,727 A | 2/2000 | Worden et al. |
| 6,026,968 A | 2/2000 | Hachisuka et al. |
| 6,218,342 B1 | 4/2001 | Patel |
| 6,391,205 B1 | 5/2002 | McGinnis |
| 6,499,546 B1 | 12/2002 | Freeman et al. |
| 6,589,917 B2 | 7/2003 | Patel et al. |
| 6,823,692 B1 | 11/2004 | Patel |
| 6,890,969 B2 | 5/2005 | Rabasco et al. |
| 6,939,393 B2 | 8/2005 | Asprion et al. |
| 7,560,029 B2 | 7/2009 | McGinnis |
| 7,700,533 B2 | 4/2010 | Egbe et al. |
| 7,816,305 B2 | 10/2010 | Saini et al. |
| 7,914,680 B2 | 3/2011 | Cath et al. |
| 7,982,069 B2 | 7/2011 | Jessop et al. |
| 8,002,989 B2 | 8/2011 | McGinnis |
| 8,021,549 B2 | 9/2011 | Kirts |
| 8,083,942 B2 | 12/2011 | Cath et al. |
| 8,181,794 B2 | 5/2012 | McGinnis et al. |
| 8,216,474 B2 | 7/2012 | Cath et al. |
| 8,246,791 B2 | 8/2012 | McGinnis et al. |
| 8,283,385 B2 | 10/2012 | Jessop |
| 8,460,554 B2 | 6/2013 | McGinnis et al. |
| 8,529,766 B2 | 9/2013 | Minami et al. |
| 8,551,221 B2 | 10/2013 | Wolfe et al. |
| 8,580,124 B2 | 11/2013 | Jessop et al. |
| 8,753,514 B2 | 6/2014 | McGinnis |
| 8,795,525 B2 | 8/2014 | McGinnis et al. |
| 8,815,091 B2 | 8/2014 | McGinnis |
| 8,900,444 B2 | 12/2014 | Jessop et al. |
| 10,377,647 B2 | 8/2019 | Jessop et al. |
| 11,236,250 B2 | 2/2022 | Resendes et al. |
| 2001/0051593 A1 | 12/2001 | Patel |
| 2002/0099113 A1 | 7/2002 | Rabasco et al. |
| 2004/0036055 A1 | 2/2004 | Asprion et al. |
| 2004/0110891 A1 | 6/2004 | Guo et al. |
| 2005/0103684 A1 | 5/2005 | Evans |
| 2006/0293208 A1 | 12/2006 | Egbe et al. |
| 2007/0034378 A1 | 2/2007 | Welton et al. |
| 2007/0092801 A1 | 4/2007 | Tipton |
| 2008/0023401 A1 | 1/2008 | Arato |
| 2008/0058549 A1 | 3/2008 | Jessop et al. |
| 2008/0197084 A1 | 8/2008 | Jessop |
| 2008/0234411 A1 | 9/2008 | Barrett et al. |
| 2009/0136402 A1 | 5/2009 | Heldebrant |
| 2010/0024423 A1 | 2/2010 | McGinnis et al. |
| 2010/0028202 A1 | 2/2010 | Wan et al. |
| 2010/0098656 A1 | 4/2010 | Breyne et al. |
| 2010/0155329 A1 | 6/2010 | Iyer |
| 2010/0212319 A1 | 8/2010 | Donovan |
| 2010/0240566 A1 | 9/2010 | Meine et al. |
| 2011/0076214 A1 | 3/2011 | Yu et al. |
| 2011/0124745 A1 | 5/2011 | Jessop et al. |
| 2011/0203994 A1 | 8/2011 | McGinnis et al. |
| 2011/0257334 A1 | 10/2011 | Jessop et al. |
| 2012/0067819 A1 | 3/2012 | McGinnis |
| 2012/0073795 A1 | 3/2012 | McGinnis et al. |
| 2012/0116076 A1 | 5/2012 | Jessop et al. |
| 2012/0228222 A1 | 9/2012 | McGinnis et al. |
| 2012/0267306 A1 | 10/2012 | McGinnis et al. |
| 2012/0267307 A1 | 10/2012 | McGinnis |
| 2012/0267308 A1 | 10/2012 | Carmignani et al. |
| 2012/0273417 A1 | 11/2012 | McGinnis et al. |
| 2012/0279921 A1 | 11/2012 | Nicoll |
| 2013/0048561 A1 | 2/2013 | Wilson et al. |
| 2013/0087072 A1 | 4/2013 | Jessop |
| 2013/0105377 A1 | 5/2013 | Jessop et al. |
| 2013/0200291 A1 | 8/2013 | Jessop et al. |
| 2014/0054215 A1 | 2/2014 | McGinnis et al. |
| 2014/0238937 A1 | 8/2014 | McGinnis |
| 2015/0014232 A1 | 1/2015 | McGinnis et al. |
| 2015/0190772 A1 | 7/2015 | Jessop et al. |

FOREIGN PATENT DOCUMENTS

| | | |
|---|---|---|
| CA | 2891474 | 5/2014 |
| CA | 2789498 C | 4/2019 |
| CN | 101326144 A | 12/2008 |
| CN | 101381327 | 3/2009 |
| CN | 102232004 | 11/2011 |
| CN | 104327663 | 2/2015 |
| DE | 277691 | 4/1990 |
| DE | 4028904 | 7/1992 |
| EP | 0 088 377 A2 | 9/1983 |
| EP | 0145250 | 6/1985 |
| EP | 0322924 | 7/1989 |
| EP | 2623185 | 8/2013 |
| FR | 2168138 | 3/1975 |
| JP | S48-20768 A | 3/1973 |
| JP | 50122057 | 9/1975 |
| JP | 58003754 | 1/1983 |
| JP | S5920253 | 2/1984 |
| JP | 59191743 | 10/1984 |
| JP | 61050967 | 3/1986 |
| JP | S61227821 | 10/1986 |
| JP | 62057617 | 3/1987 |
| JP | H01231921 | 9/1989 |

(56) References Cited

FOREIGN PATENT DOCUMENTS

| | | |
|---|---|---|
| JP | H01-304026 | 12/1989 |
| JP | 1993-508154 | 11/1993 |
| JP | H072645 | 1/1995 |
| JP | A1997208657 | 8/1997 |
| JP | H1033938 | 2/1998 |
| JP | 10204409 | 8/1998 |
| JP | 1999-511140 | 9/1999 |
| JP | A200239339 | 9/2000 |
| JP | A001019689 | 1/2001 |
| JP | 2001353407 | 12/2001 |
| JP | 2002544506 | 12/2002 |
| JP | 2003261315 | 9/2003 |
| JP | 200425011 | 1/2004 |
| JP | 200459750 | 2/2004 |
| JP | 2004-231941 | 8/2004 |
| JP | 2004504131 | 12/2004 |
| JP | 2007222847 | 9/2007 |
| JP | 2008-508389 | 3/2008 |
| JP | 200856642 | 3/2008 |
| JP | 2008-168227 | 7/2008 |
| JP | 2008231421 | 10/2008 |
| JP | 2008238073 | 10/2008 |
| JP | 2009-006275 | 1/2009 |
| JP | 2009-213972 A | 9/2009 |
| JP | 2009539584 | 11/2009 |
| JP | 2010-500168 | 1/2010 |
| JP | 201137951 | 2/2011 |
| JP | 2011525147 | 9/2011 |
| JP | 2011-194388 | 10/2011 |
| JP | 2012520750 | 9/2012 |
| JP | HO6002615 | 10/2016 |
| WO | 19-19481 | 12/1991 |
| WO | 1997-006810 | 2/1997 |
| WO | 200069899 | 11/2000 |
| WO | 20011036000 | 5/2001 |
| WO | 2004106288 | 12/2004 |
| WO | 2007056859 | 5/2007 |
| WO | 2007146094 | 12/2007 |
| WO | 2008-021700 | 2/2008 |
| WO | 2008068411 | 6/2008 |
| WO | 2008094846 | 8/2008 |
| WO | 2009151709 | 12/2009 |
| WO | 2009155596 | 12/2009 |
| WO | WO-2010014774 A2 * | 2/2010 ........... B01D 53/226 |
| WO | 2010037109 | 4/2010 |
| WO | 2010077548 | 7/2010 |
| WO | 2010102934 | 9/2010 |
| WO | 2011097727 | 8/2011 |
| WO | 2012/040335 | 3/2012 |
| WO | 2013/033082 | 3/2013 |
| WO | 2013/036111 | 3/2013 |
| WO | 2013/8032742 | 3/2013 |
| WO | 2013/070921 | 5/2013 |
| WO | 2014/019094 | 2/2014 |
| WO | 2014/097309 | 6/2014 |
| WO | 2016/191890 | 12/2016 |
| WO | 2017/024376 | 2/2017 |

OTHER PUBLICATIONS

English Translation of Office Action on Japanese Patent Application No. 2013-543479 dated Feb. 12, 2019.
English Translation of First Office Action on Japanese Divisional Application No. 2018-033317 dated Apr. 9, 2019.
Koichi Arai, "Carbon Dioxide Gas Absorption and Regeneration Characteristics of Polyethyleneimine Aqueous Solutions", Abstracts of Research Presentations at the 53rd Annual Meeting of the Society of Chemical Engineers, Japan, the Society of Chemical Engineers, Japan, Mar. 4, 1988, p. 174.
Notice of Allowance dated Jul. 2, 2019 issued in respect of U.S. Appl. No. 13/993,890.
Notice of Allowance dated May 16, 2019 issued in respect of U.S. Appl. No. 13/993,890.
Notice of Allowance dated Mar. 12, 2019 issued in respect of U.S. Appl. No. 13/993,890.
Notice of Allowance dated Feb. 21, 2019 issued in respect of U.S. Appl. No. 13/993,890.
Notice of Allowance dated Feb. 11, 2019 issued in respect of U.S. Appl. No. 13/993,890.
English Translation of Preliminary Office Action on Brazilian Patent Application No. BR112013014972-8 dated Aug. 9, 2019.
English Translation of Preliminary Office Action on Brazilian Patent Application No. BR112012020112-3 dated Aug. 25, 2020.
Leilei Liu et al.: "Current Patents of Forward Osmosis Membrane Process", Recent Patents on Chemical Engineering, Bentham Science Publishers Ltd, NL, vol. 2, Jan. 1, 2009 (Jan. 1, 2009), pp. 76-82.
Communication under Rule 71(3) on 11741795.6 dated Apr. 23, 2019.
Extended European Search Report on EP 19202927.0 dated Mar. 17, 2020.
Ming Ming Ling et al: "Highly Water-Soluble Magnetic Nanoparticles as Novel Draw Solutes in Forward Osmosis for Water Reuse", Industrial & Engineering Chemistry Research, vol. 49, No. 12, Jun. 16, 2010 (Jun. 16, 2010) pp. 5869-5876.
Examiner's Requisition on CA 2,789,498 dated Dec. 5, 2016.
English Translation of Office Action Notification on Israeli Patent Application No. 221391 dated Feb. 7, 2019.
Hearing Notice on Indian Patent Application No. 7032/DELNP/2012 dated Aug. 18, 2020.
Technical Examination Reporton BR Application No. BR112012020112-3 dated Jan. 6, 2021.
Communication pursuant to Article 94(3) on EP Application No. 19202927 dated Sep. 7, 2021.
Phan, L. et al., "Switching the hydrophilicity of a solute", Green Chem., 2009, 11, 307-308.
McGinnis, R. L. et al., "A novel ammonia—carbon dioxide osmotic heat engine for power generation". Journal of Membrane Science 305 (2007) 13-19.
McCutcheon, J. R. et al., "A novel ammonia—carbon dioxide forward (direct) osmosis desalination process", Desalination 174 (2005) 1-11.
Mani, F. et al., "$CO_2$ absorption by aqueous $NH_3$ solutions: speciation of ammonium carbamate, bicarbonate and carbonate by a 13C NMR study", Green chem., 2006, 8, 995-1000.
Phillip, W. A. et al., "Reverse Draw Solute Permeation in Forward Osmosis: Modeling and Experiments", Environ. Sci. Technol. 2010, 44, 5170-5176.
Cath, T. Y. et al., "Forward osmosis: Principles, applications, and recent developments", Journal of Membrane Science 2006, 05, 048.
McGinnis, R. L. et al., "Global Challenges in Energy and Water Supply The Promise of Engineered Osmosis", Environ. Sci. Technol. 2008, 42 8625-8629.
McCutcheon, J. R. et al., "Desalination by ammonia—carbon dioxide forward osmosis: Influence of draw and feed solution concentrations on process performance", Journal of membrane Science 278 (2006) 114-123.
Colorado School of Mines, "An Integrated Framework for Treatment and Management of Produced Water", RPSEA Project 07122-12, 1st Edition, Nov. 2009.
Dow Chemical Company Tech Manual Excerpt, "FilmtecTM Membrane System Design Guidelines for Commercial Elements".
Wilf, M. et al., "Optimization of seawater RO systems design", Desalination 173 (2005) 1-12.
White, S. D. et al., "Phase Equilibria for Dimethylethylamine + Water and Trimethylamine + Water Mixtures", J. Chem. Eng. Data 1993, 38, 234-237.
Godshall, N. et al., "AltelaRainSM Produced Water Treatment Technology: Making Water from Waste", International Petroleum Environmental Conference, Nov. 6, 2006, Houston, Texas.
Sirivedhin, T. et al., "Reclaiming produced water for beneficial use: salt removal by electrodialysis", Journal of Membrane Science 243 (2004) 335-343.
Mucci, A. et al., "Solvent effect on the protonation of some alkylamines", Can. J. Chem. 1980, 58, 953-958.

(56) References Cited

OTHER PUBLICATIONS

Sorenson, E. C. et al., "Thermodynamics of proton dissociation from aqueous bicarbonate: apparent molar volumes and apparent molar heat capacities of potassium carbonate and potassium bicarbonate at T=(278.15 to 393.15) K and at the pressure 0.35 MPa", J. Chem. Thermodynamics 2004 36, 289-928.

Patterson, C. S. et al., "Carbonate equilibria in hydrothermal systems: first ionization of carbonic acid in NaCl media to 300° C.", Geochimica et Cosmochimico Acta vol. 46, 1653-1663 (Printed in U.S.A. 1982).

Park, S. N. et al., "Spectrophotometric measurement of the first dissociation constants of carbonic acid at elevated temperatures", J. Chem. Soc., Faraday Trans., 1998, 94(10), 1421-1425.

McCann, N. et al., "A calorimetric study of carbamate formation", J. Chem. Thermodynamics 43 (2011) 664-669.

Tetko I. V. and Tanchuk V. Y. "Application of Associative Neural Networks for Prediction of Lipophilicity in ALOGPS 2.1 Program" in J. Chem. Inf. Comput. Sci., 2002, 42, 1136-1145.

Bougie F. and Illiuta M.C., "Kinetics of absorption of carbon dioxide into aqueous solutions of 2-amino-2-hydroxymethyl-1,3-propanediol" Chem Eng Sci, 2009, 64, 153-162.

Al-Zoubi, R.M.; Marion, O.; Hall, D.G. "Direct and Waste-Free Amidations and Cycloadditions by Organocatalytic Activation of Carboxylic Acids at Room Temperature" Angew Chem Int Ed 2008, 47, 2876.

M.J. Muldoon, "Modern multiphase catalysis: new developments in the separation of homogeneous catalysts" Dalton Trans., 2010, 39, 337.

H. Mimoun, M. P. Machirant, I.S. de Roch, "Activation of Molecular Oxygen: Rhodium-Catalyzed Oxidation of Olefins" J. Am. Chem. Soc., 1977, 100, 5437.

O. Bortolini, F. di Furia, G. Modena, R. Seraglia, "Metal Catalysis in Oxidation By Peroxides. Part 19*. On the Mechanism of Rhodium-Catalyzed Oxidation of Terminal Olefins To Methyl Ketones By Dioxygen" J. Mol. Cat., 1984, 22, 313.

Ramachandra Rao, S., 1980, "Flocculation and dewatering of Alberta oil sands tailings." Int. J. Miner. Process., 7 (3), 245-253.

Michaels, A. 1962, "Settling Rates and Sediment Volumes of Flocculated Kaolin Suspensions." Ind. Eng. Chem. Fundamen., 1 (1), 24-33.

Schofield, R., 1954, "Flocculation of kaolinite due to the attraction of oppositely charged crystal faces" Discussions Faraday Soc., 18, 135-145.

Nasser & James, 2006, "Settling and sediment bed behaviour of kaolinite in aqueous media." Separation and Purification Technology, 51 (1), 10-17.

Delgado, A., Gonzalez-Caballero, F., R. Hunter, L. K., & Lyklema, J. (2005). Measurement and Interpretation of Electrokinetic Phenomena. Pure Appl. Chem., 77 (10), 1753-1805.

Takamura, K. "Microscopic Structure of Athabasca Oil Sand" Can. J. Chem. Eng. 1982, 60, 538.

Gupta, V.; Miller, J. D. "Surface force measurements at the basal planes of ordered kaolinite particles" J. Coll. Inter. Sci. 2010, 344, 362-371.

Maslova, M. V.; Gerasimova, L. G.; Forsling, W. "Surface Properties of Cleaved Mica" Colloid J. 2004, 66, 322.

Lee, S.; Puck, A.; Graupe, M.; Colorado Jr., R.; Shon, Y. S.; Lee, T. R.; Perry, S.S. "Structure, Wettability, and Frictional Properties of Phenyl-Terminated Self-Assembled Monolayers on Gold" Langmuir 2001, 17, 7364.

Speziale, J. "p-Dithiane" Org. Syn. Coll. 1963, 4, 396.

Frank, R.; Smith, P. "The Preparation of Mercaptans from Alcohols" J. Am. Chem. Soc. 1946, 68, 2103.

Nuzzo, R.; Allara, D. "Adsorption of Bifunctional Organic Disulfides on Gold Surfaces" J. Am. Chem. Soc. 1983, 105, 4481.

Bain, C.; Bieyuck, H.; Whitesides, G. "Comparison of Self-Assembled Monolayers on Gold: Coadsorption of Thiols and Disulfides" Langmuir 1989, 5, 723.

Van der Vegte, E. W.; Hadziioannou, G. "Acid-Base Properties and the Chemical Imaging of Surface-Bound Functional Groups Studied with Scanning Force Microscopy" J. Phys. Chem. B 1997, 101, 9563.

Van der Vegte, E.W.; Hadziioannou, G. "Scanning Force Microscopy with Chemical Specificity: An Extensive Study of Chemically Specific Tip-Surface Interactions and the Chemical Imaging of Surface Functional Groups" Langmuir 1997, 13, 4357.

Keglevich, G., et al., "Monitoring the pH-Dependent Oximation of Methyl Ethyl Ketone and Benzaldehyde by in situ Fourier Transform IR Spectroscopy in a Heterogeneous Liquid-Liquid Two-Phase System" Spectroscopy Letters, 42 (2009), 67-72.

Grattoni, A. "Fast Membrane Osmometer as Alternative to Freezing Point and Vapor Pressure Osmometry" et al., Anal. Chem., 80, 2617-2622 (2008).

Schmitz, S. et al., "Access to Poly{N-[3-(dimethylamino)propyl](meth)acrylamide} via Microwave-Assisted Synthesis and Control of LCST-Behavior in Water" Macromol. Rapid Commun., 2007, 28, 2080-2083.

H. Vink, "Precision Measurements of Osmotic Pressure in Concentrated Polymer Solutions" European Polymer Journal, 1971, vol. 7, pp. 1411-1419.

Paktinat, J. et al., "Case Studies: Impact of high Salt Tolerant Friction Reducers on Fresh Water Conservation in Canadian Shale Fracturing Treatments" Canadian Society for Unconventional Gas/Society of Petroleum Engineers, 149272, 2011.

Loeb, S., "Production of Energy From Concentrated Brines By Pressure-Retarded Osmosis I. Preliminary Technical and Economic Correlations" Journal of Membrane Science, 1, 49-63, 1976.

Reuters News Agency, Norway Opens Worlds First Osmotic Power Plant, CNET. Available from: Khttp://www.reuters.com/article/2009/11/24/us-norway-osmotic-idUSTRE5A-N20020091 124; 2009.

M. Gregory, Norway's Statkraft Opens First Osmotic Power Plant, BBC News. Available from: (http://news.bbc.co.uk/2/ni/8377186.stm, Nov. 24, 2009.

S. Loeb, et al., "Comparative Mechanical Efficiency of Several Plant Configurations Using a Pressure-Retarded Osmosis Energy Converter" J. Membr. Sci., 51(1990), 323-335.

S. Loeb, et al., "Production of Energy From Concentrated Brines By Pressure-Retarded Osmosis" J. Membr. Sci., 1(1976), 249-269.

Lottermoser A. The influence of atmospheric carbonic acid upon the surface tension of aqueous solutions of sodium salts of fatty acids. Transactions of the Faraday Society. 1935, 31:200-4.

Liu Y, Jessop PG, Cunningham M, Eckert CA, Liotta CL. Switchable surfactants. Science. Aug. 18, 2006, 313 (5789):958-60.

Lu, Jie, et al. Tunable solvents for homogeneous catalyst recycle. Industrial & engineering chemistry research. 2004, 43(7):1586-1590.

Lopez, DA et al. Inhibitors performance in CO2 corrosion EIS studies on the interaction between their molecular structure and steel microstructure. Corrosion Science 2005, 47(3):735-755.

Li, S. et al. Bronsted Guanidine Acid-Base Ionic Liquids: Novel Reaction . . . Catalyzed Heck Reaction. Organic Letters. 2006, 8(3):391-394.

Main, AD et al. Simple Preparation . . . Carbonate, unpublished material received from J.C. Linehan, Pacific Northwest National Laboratory (2001).

Minkenberg et al. Triggered self-assembly of simple dynamic covalent surfactants. Journal of the American Chemical Society. 2009, 131(32):11274-11275.

Munshi, P et al. Hydrogenation of Carbon Dioxide Catalyzed by Ruthenium Trimethylphosphine . . . Amines. J. Am. Chem.Soc. 2002, 124(27):7963-7971.

Oszczapowicz, Janusz, and Ewa Raczyhska. Amidines. Part 13. Influence of substitution at imino nitrogen atom on p K a values of N 1 N 1-Dimethylacetamidines. Journal of the Chemical Society, Perkin Transactions. 1984. 2(10):1643-1646.

Pincet, Frédéric, et al. Spontaneous and reversible switch from amphiphilic to oil-like structures. Physical review letters. 2005, 95(21):218101.

(56) References Cited

OTHER PUBLICATIONS

Cheng, Zhiyu, et al. Ionic Self-Assembled Redox-Active Polyelectrolyte-Ferrocenyl Surfactant Complexes Mesomorphous Structure and Electrochemical Behavior. Macromolecules 2007, 40(21):7638-7643.
Ghosh, S. et al. Tunable Disassembly of Micelles Using a Redox Trigger. Langmuir. 2007, 23(15):7916-7919.
Poteau, S. et al. Influence of pH on Stability and Dynamic Properties of Asphaltenes and Other Amphiphilic Molecules at the Oil-Water Interface. Energy & Fuels 2005, 19:1337-1341.
Pérez, Eduardo R., et al. Activation of carbon dioxide by bicyclic amidines. The Journal of organic chemistry. 2004, 69 (23):8005-8011.
Pollet, P et al. Organic aqueous tunable solvents (OATS): A vehicle for coupling reactions and separations. Accounts of Chemical Research. Sep. 2010, 43(9):1237-1245.
Phan, L, et al. Soybean oil extraction and separation using switchable or expanded solvents. Green Chemistry. 2009, 11: 53-59 (first published online Oct. 28, 2008).
Sakai, H et al. Photochemical switching of vesicle formation using an azobenzene-modified surfactant. J. Phys. Chem. B. 1999, 103:10737-10740.
Schroth W. et al. Dimethylammonium-dimethylcarbamat (Dimcarb) als Losungs- und Extraktionsmittel. Z. Chem. 1989, 29(2):56-57.
Sakai, H. et al. Control of Molecular Aggregate Formation and Solubilization using Electro- and Photoresponsive Surfactant Mixtures. Surfactant Science Series. 2005, 124:507-543.
Saji, TI et al. Reversible formation and disruption of micelles by control of the redox state of the head group. Journal of the American Chemical Society. 1985, 107(24):6865-6868.
Scoggins, MW. A Rapid Gas Chromatographic Analysis of Diastereomeric Diamines. J. Chromatogr. Sci. 1975,13 (3):146-148.
Tsuchiya, K et al. Control of viscoelasticity using redox reaction. Journal of the American Chemical Society. 2004, 126 (39):12282-12283.
Schmittel, M et al. N,N'-Dimethyl-2,3-dialkylpyrazinium salts as redox-switchable surfactants? Redox, spectral, EPR and surfactant properties. Chem. Comm 2005, 45:5650-5652.
Tetko, IV and VY Tanchuk. Virtual Computational Chemistry Laboratory—Design and Description. J. Comput. Aid. Mol. Des. 2005, 19(6):453-463.
Texter J. (editor) Chapter 2 by Holmberg, K., "Cleavable Surfactants." In Reactions and synthesis in surfactant systems. 2001, 45-58.
Jemura, Y et al. Preparation of Resins Having Various Phosphoniutn Groups and Their Adsorption and. Iution Behavior for Anionic Surfactants. Journal of Applied Polymer-Science. 1999, 72(3):371-378.
Zaki, N. et al. A Novel Process for Demulsification of Water-in-Crude Oil 'Emulsions by Dense Carbon Dioxide. Ind. Eng. Chem. Res. 2003, 42(25):6661-6672.
International Search Report for PCT/CA2006/001877 filed Nov. 15, 2006.
English translation of second Chinese Office Action dated Jan. 17, 2012 for CN Appl. No. 200680046495.5.
English translation of First Chinese Office Action dated Oct. 18, 2010 for CN Appl. No. 200680046495.5.
Dexter, AF and AP Middelberg. Peptides as functional surfactants. J. Ind Eng Chem Res. 2008, 47(17):6391-6398.
Dexter, AF et al. Reversible active switching of the mechanical properties of a peptide film at a fluid-fluid interface. J. Nat Mater. 2006, 5(6):502-506.
Fowler, CI et al. Emulsion polymerization of styrene and methyl methacrylate using cationic switchable surfactants. Macromolecules. 2011, 44:2501-2509.
Harjani, JR et al. A synthesis of acetamidines. J. Org. Chem. 2011, 76(6): 1683-1691.
Scott, LM. M.Sc. Thesis, Queen's University, 2009.
Mihara, M. et al. Redispersible polymer colloids using carbon dioxide as an external trigger. Macromolecules. 2011, 44 (10):3688-3693.
Mirarefi, P and CT Lee. Photo-induced unfolding and inactivation of bovine carbonic anhydrase in the presence of a photoresponsive surfactant. Biochimica et Biophysica Acta (BBA)-Proteins and Proteomics. 2010, 1804(1):106-114.
Arthur T, J Harjani, PG Jessop, and PV Hodson. Green Chem. 2012, DOI: 10.1039/CIGC15620A.
Cook, MJ, AR Katritzky, and SJ Nadji. Chem. Soc. Perkin Trans. 1976, 2:211-214.
Hall Jr., HJ. Correlation of the base strengths of amines1. Am. Chem. Soc. 1957, 79(20):5441-5444.
Tanrisever, T et al. Kinetics of emulsifier-free emulsion polymerization of methyl methacrylate. J Appl Polym Sci. 1996, 61(3) 485-493.
PCT International Search Report for International Application No. PCT/CA2010/001707 filed on Oct. 28, 2010.
PCT Written Opinion of the International Searching Authority for International Application No. PCT/CA2010/001707.
Examiner's Requisition dated Feb. 29, 2012 for Canadian Patent Application No. 2,527,144.
European Search Report dated Jul. 12, 2010 for European Patent Application No. 06804740.6.
Office Action (Restriction Requirement) dated Dec. 23, 2009 on U.S. Appl. No. 11/599,623.
Office Action dated Jun. 10, 2010 on U.S. Appl. No. 11/599,623.
Office Action (Restriction Requirement) dated Jun. 16, 2008 on U.S. Appl. No. 11/717,172.
Office Action dated Mar. 3, 2009 on U.S. Appl. No. 11/717,172.
Office Action dated Dec. 30, 2009 on U.S. Appl. No. 11/717,172.
English translation of Second Office Action for Chinese Patent Application No. 201080053784.4 dated Oct. 29, 2014.
English translation of First Office Action for Egyptian Patent Application No. PCT 796/2012 dated Sep. 27, 2014.
English translation of First Office Action for Japanese Patent Application No. 2012-535562 dated Jul. 29, 2014.
English translation of First Office Action for Mexican Patent Application No. MX/a/2012/005047 dated Aug. 18, 2014.
English translation of First Office Action for Japanese Patent Application No. 2012-552216 dated Sep. 2, 2014.
English translation of Third Office Action for Chinese Patent Application No. 201080053784.4 dated Jul. 7, 2015.
Examiner's Requisition on CA 2,683,660 dated Jul. 20, 2015.
Examiner's Requisition on CA 2,683,660 dated Apr. 5, 2016.
English translation of Second Office Action for Japanese Patent Application No. 2012-535562 dated Jul. 28, 2015.
Soto et al. Flotation of Apatite from Calcareous Ores with Primary Amines. Minerals and Metallurgical Processing. 1985, 2(3):160-166.
Notice of Allowance for Japanese Patent Application No. 2012-535562 dated Jun. 28, 2016 (in Japanese).
English translation of Second Office Action for Egyptian Patent Application No. PCT 796/2012 dated Mar. 24, 2015.
Office Action for U.S. Appl. No. 13/616,900 dated Aug. 26, 2015.
Restriction Requirement for U.S. Appl. No. 13/751,963 dated Apr. 1, 2015.
Office Action for U.S. Appl. No. 13/751,963 dated Oct. 6, 2015.
Tutar, "Switchable surfactants: master of science thesis in the master degree programme materials and nanotechnology," Department of Chemical and Biological Engineering, Chaimers University of Technology (2011) (45 pages).
Final Office Action for U.S. Appl. No. 13/751,963 dated Jul. 1, 2016.
English translation of Third Office Action for Chinese Patent Application No. 201180012690.7 dated Mar. 12, 2015.
English translation of Fourth Office Action for Chinese Patent Application No. 201180012690.7 dated Sep. 17, 2015.
Communication from EPO dated Dec. 8, 2015 on European Appln. No. 11741795.6 enclosing ESR and European Search Opinion dated Nov. 30, 2015.
English translation of Office Action for Israeli Appln. No. 221391 dated Apr. 11, 2016.
First Examination Report on Australian Patent Application No. 2016202686 dated Oct. 27, 2016.

(56) References Cited

OTHER PUBLICATIONS

Notice of Decision of Rejection on Japanese Patent Application No. 2012-552216 dated Sep. 29, 2015.
English translation of First Office Action on Japanese Patent Application No. 2016-016551 dated Aug. 30, 2016.
Office Action for Israeli Patent Application No. 226915 dated Apr. 12, 2016.
First Office Action on Chinese Application No. 201180065159.6 dated Dec. 22, 2014.
Zhou et al. Re-examination of Dynamics of Polyelectrolytes in Salt-Free Dilute Solutions by Designing and Using a Novel Neutral-Charged-Neutral Reversible Polymer. Macromolecules. 2009, 42(18):7146-7154.
Second Office Action on Chinese Application No. 201180065159.6 dated Nov. 11, 2015.
Third Office Action on Chinese Application No. 201180065159.6 dated May 3, 2016.
Fortune et al. Highly Effective Gene Transfection In Vivo by Alkylated Polyethylenimine. Journal of Drug Delivery. 2011, Article ID 204058.
Rivas et al. Polyethyleneimine Supports for Resins with Retention Properties for Heavy Metals Part I. Polymer Bulletin. 1985, 14(3):239-243.
Guice et al. pH Response of Model Diblock and Triblock Copolymer Networks Containing Polystyene and Poly(2-hydroxyethyl methacrylate-co-2-(dimethylamino)ethyl methacrylate). Macromolecules. 2008, 41(12):4391-4397.
Wetering et al. Structure-Activity Relationships of Water-Soluble Cationic Methacrylate/Methacrylamide Polymers for Nonviral Gene Delivery. Bioconjugate Chem. 1999, 10(4):589-597.
Jackson et al. Cyclopolymerization. XI. Polyelectrolytes and Polyampholytes from N-Alkyl-N,N-diallylamines and Methacrylamide. Journal of Macromolecular Science: Part A—Chemistry. 1976, 10(5):959-980.
First Office Action on Japanese Patent Application No. 2013-543479 dated Dec. 8, 2015.
Restriction Requirement on U.S. Appl. No. 13/993,890 dated Sep. 2, 2016.
Fourth Office Action on Chinese Application No. 201180065159.6 dated Nov. 30, 2016.
Anton, P et al. Structure and properties of zwitterionic polysoaps: functionalization by redox-switchable moieties. Progress in Colloid & Polymer Science VI. 1992, 89:56-59.
Aydogan, N and Abbott, N. Comparison of the Surface Activity and Bulk Aggregation of Ferrocenyl Surfactants with Cationic and Anionic Headgroups. L. Langmuir. 2001, 17(19):5703-5706.
Dorrance N. "New chemical process makes manufacturing environmentally friendly", Queen's Gazette XXXVI(13): 8 (Sep. 12, 2005).
Dumont et al. Synthesis and study of the antileukemic activity of N,N'-substituted amidines and bisamidines. Journal de Pharmacie de Belgique. 1986, 40(6):373-386.
Datwani, S. et al. Redox-Dependent Surface Tension and Surface Phase Transitions of a Ferrocenyl Surfactant: Equilibrium and Dynamic Analyses with Fluorescence Images. J Langmuir. 2003, 19(20):8292-8301.
Defrise-Quertain, et al. Vesicle formation by double long-chain amidines. J. Chem. Soc., Chem. Comm. 1986, 1060-1062.
Edwards et al. Mechanistic studies of the corrosion inhibitor oleic imidazoline. Corrosion Science. 1994, 36(2):315-325.
Hori et al. New method of organic synthesis using DBU (6th report) Reversible Immobilization of Carbon Dioxide Gas by Forming Carbonate, Carbamate Salt. Kinki Chemical Society, Japan, Chem. Exp. 1986, 1(3):173-176.
Heldebrant et al., The Reaction of 1,8-Diazabicyclo[5.4.0]undec-7-ene (DBU) with Carbon Dioxide, Journal of Organic Chemistry. 2005, 70(13):5335-5338.
Hill, A.J. et al. Some amidines of the holocaine type. I. Journal of the Chemical Society. 1926, 48(3):732-737.

Jaroszewska-Manaj, J. et al. Amidines. Part 41. Effects of substitution at the amidino carbon atom and at the imino nitrogen atom on the preferred configuration at the C[double bond, length as m-dash]N bond in the 13C NMR spectra of N1,N1-dimethyl-N2-alkylamidines. J. Chem. Soc., Perkin Trans. 2001, 1186-1191.
Jessop, et al. A solvent having switchable hydrophilicity. Green Chemistry. 2010, 12:809-814.
Jessop et al. Green chemistry: Reversible nonpolar-to-polar solvent. Nature. Aug. 25, 2005, 436(7054): 1102.
K. L. Lee, R. W. Baker, H. K. Lonsdale, Membranes for power generation by pressure-retarded osmosis, Journal of membrane science, 8 (1981) 141-171.
G. Anyatonwu "Methanethiosulfonate Ethylammonium Block of Amine Currents through the Ryanodine Receptor Reveals Single Pore Architecture" J. Biol. Chem. 278 (2003) 45528-45538.
M. Kanezashi "Characteristics of Ammonia Permeation Through Porous Silica Membranes" Aiche J. 56 (2010) 1204-1212.
Examiner's Requisition on CA 2,778,600 dated Sep. 26, 2017.
English translation of Second Office Action for Israeli Appln. No. 221391 dated Apr. 19, 2017.
Communication & Examination Report from EPO dated Jun. 16, 2017 on European Appln. No. 11741795.6.
English translation of Office Action for Japanese Patent Application No. 2012-552216 dated Aug. 8, 2017.
English translation of Decision of Rejection for Japanese Patent Application No. 2016-016551 dated May 16, 2017.
R. R. Davison, W. H. Smith, Jr., D. W. Hood, Structure and Amine-Water Solubility in Desalination by Solvent Extraction, Journal of Chemical and Engineering Data (1960) 5(4):420-423.
English translation of First Office Action for Mexican Patent Application No. MX/a/2012/009296 dated Apr. 20, 2017.
Final Office Action for U.S. Appl. No. 13/993,890 dated Sep. 12, 2017.
Second Office Action for Israeli Patent Application No. 226915 dated Apr. 3, 2017.
Extended European Search Report dated Jun. 8, 2017 for European Patent Application No. 11848305.6.
Examiner's Requisition dated Dec. 22, 2017 for Canadian Patent Application No. 2,821,789.
Final Rejection Notice on Japanese Patent Application No. 2013-543479 dated Oct. 31, 2017.
Non-Final Office Action for U.S. Appl. No. 13/751,963 dated Aug. 9, 2017.
English translation of Office Action on JP 2012-552216 dated Feb. 27, 2018.
International Search Report and Written Opinion for PCT/CA2016/050644 dated Aug. 12, 2016.
International Search Report and Written Opinion for PCT/CA2015/050908 dated Apr. 20, 2016.
International Search Report and Written Opinion for PCT/CA2013/050603 dated Oct. 31, 2013.
Non-Final Office Action for U.S. Appl. No. 14/419,164 dated Feb. 23, 2017.
K. Nakamura et al., Threadlike Micelle Formation of Anionic Surfactants in Aqueous Solution (2006) Langmuir 22:9853-9859.
Wang et al., Influence of pH on the Aggregation Morphology of a Novel Surfactant with Single Hydrocarbon Chain and Multi-Amine Headgroups (2008) J. Phys. Chem. B. 112: 1409-1413.
Su, X. et al., Switchable Viscosity Triggered by CO2 Using Smart Worm-Like Micelles (2013) Chem. Commun. 49: 2655-2657.
Boo, C. et al., Performance Evaluation of Trimethylamine-Carbon Dioxide Thermolytic Draw Solution for Engineered Osmosis (2015) J. Membrane Science 473: 302-309.
Crooks et al, "Kinetics of the Reaction between Carbon Dioxide and Tertiary Amines" J. Org. Chem., 1990, 55, pp. 1372-1374.
Littel et al., "Kinetics of CO2 With Primary and Secondary Amines in Aqueous Solutions-I. Zwitterion Deprotonation Kinetics for DEA and DIPA in Aqueous Blends of Alkanolamines" Chem. Eng. Sci., 1992, 47 (8), pp. 2027-2305.
First Examination Report on Indian Patent Application No. 7032/DELNP/2012 dated Jan. 4, 2018.
English translation of Second Office Action for Mexican Patent Application No. MX/a/2012/009296 dated Dec. 13, 2017.

(56) References Cited

OTHER PUBLICATIONS

Non-Final Office Action on U.S. Appl. No. 13/993,890 dated Jan. 18, 2018.
A. Aly et al. "Functionality of amidines and amidrazones" (2008) ARKIVOC (i) 153-194.
Second Official Action on Mexican Patent Application No. MX/a/2013/006797 dated Oct. 3, 2017.
Partial ESR on European Patent Application No. 10825900.3 dated Feb. 22, 2018.
Office Action on European Patent Application No. 11848305.6 dated Jul. 9, 2018.
Extended ESR on European Patent Application No. 10825900.3 dated Jun. 1, 2018.
Examiner's Requisition on CA 2,778,600 dated Jun. 29, 2018.
English Translation of Office Action on IL 221391 dated Apr. 23, 2018.
English Translation of Third Office Action on MX/a/2013/006797 dated May 8, 2018.
Office Action on EP 11741795.6 dated Feb. 27, 2018.
Office Action on EP 11741795.6 dated May 28, 2018.
Third Official Action on Mexican Patent Application No. MX/a/2012/009296 dated Aug. 1, 2018.
Sartori et al. "Sterically Hindered Amines for CO2 Removal from Gases" Ind. Eng. Chem. Fundam., 1983, 22, pp. 239-249.
Bonenfant et al. "Determination of the Structural Features of Distinct Amines Important for the Absorption of CO2 and Regeneration in Aqueous Solution" Ind. Eng. Chem. Res., 2003, 42, pp. 3179-3184.
Final Office Action on U.S. Appl. No. 13/993,890 dated Sep. 14, 2018.
Reconsideration Report dated Nov. 6, 2018 on appeal No. 2018-2776 in respect of appeal of Examiner's decision of refusal on Japanese Patent Application No. 2013-543479.
English Translation of Second Office Action on Brazilian Patent Application No. BR112013014972-8 dated Apr. 29, 2020.
First Examination Reporton Indian Patent Application No. 6081/DELNP/2013 dated Mar. 26, 2019.
Hearing Notice on Indian Patent Application No. 6081/DELNP/2013 dated May 11, 2020.
Communication under Rule 71(3) on 11848305.6 dated Jul. 23, 2019.
Text intended for grant accompanying Communication under Rule 71 (3) on 11848305.6 dated Jul. 23, 2019.
Office Action dated Feb. 28, 2012 on U.S. Appl. No. 13/172,090.
Office Action dated Sep. 5, 2012 on U.S. Appl. No. 13/172,090.
Office Action dated May 14, 2012 on Canadian Application Serial No. 2,539,418.
El-Aasser, M and P Lovell, Eds. Emulsion Polymerization and Emulsion Polymers. John Wiley & sons, Inc.: Chichester, NY, 1997, 222-227.
Liang, C. Cationic and Anionic Carbon Dioxide Responsive Switchable Surfactants. M. Sc. Thesis, Queen's University, Kingston, Ontario. 2010.
Qin, Y et al. Reversible performance of dodecyl tetramethyl guanidine solution induced by CO2 trigger. Tenside Surf. Det. 2009, 46(5):294-296.
Phan, LN. CO2-Triggered Switchable Solvent Systems and Their Applications. M.Sc. Thesis, Queen's University, Kingston, Ontario, prepared Feb. 2008. Embargoed from publication until publication date Oct. 27, 2008.
Examiner's Report No. 1 for Australian Patent Application No. 2010312290 dated Apr. 15, 2014.
Final Office Action for U.S. Appl. No. 13/616,900 dated Dec. 16, 2013.
Office Action for U.S. Appl. No. 13/616,900 dated May 6, 2013.
Office Action for Canadian Patent Application No. 2,527,144 dated Nov. 22, 2012.
Office Action for Canadian Patent Application No. 2,629,943 dated Nov. 22, 2012.
English translation of third Office Action for Chinese Application No. 200680046495.5 dated Nov. 14, 2012.
Final Office Action for U.S. Appl. No. 11/599,623 dated Mar. 3, 2011.
Office Action for European Patent Application No. 06804740.6 dated Jun. 3, 2013.
Office Action (Restriction Requirement) for U.S. Appl. No. 12/901,189 dated Dec. 13, 2012.
Office Action for U.S. Appl. No. 12/914,948 dated Dec. 11, 2012.
Final Office Action for U.S. Appl. No. 12/914,948 dated Mar. 19, 2013.
Office Action (Restriction Requirement) for U.S. Appl. No. 12/914,948 dated Aug. 21, 2012.
Patel, A et al., "New Opportunities for the Drilling Industry Through Innovative Emulsifier Chemistry" OnePetro—SPE (Society of Petroleum Engineers), SPE-80247, Conference Paper—International Symposium on Oilfield Chemistry (Feb. 5-7, 2003), 1-8.
Römpp-Lexikon Chemie, 1999, Georg Thieme Verlag, D-70469 Stuttgart, XP002588469, ISBN: 3-13-735010-7—pp. 4112-4113.
Chinese Office Action in Chinese Patent Application No. 201080053784.4 dated Dec. 16, 2013 (with English translation) (12 pages).
Examiner's Requisition on Canadian Patent Application No. 2,789,498 dated Dec. 5, 2016.
Restriction Requirement on U.S. Appl. No. 14/522,693 dated Sep. 22, 2016.
Examiner's Requisition on Canadian Patent Application No. 2,778,600 dated Dec. 19, 2016.
Donaldson, TL et al. Carbon Dioxide Reaction Kinetics and Transport in Aqueous Amine Membranes. Ind. Eng. Chem. Fundam. 1980, 19:260-266.
Merger, S.M. et al., "Switchable Water: aqueous solutions of switchable ionic strength", ChemSusChem. Apr. 26, 2010; 3(4): 467-70.
First Official Action on Mexican Patent Application No. MX/a/2013/006797, dated Feb. 2, 2017 (English translation).
International Search Report and Written Opinion for PCT/CA2011/050075, dated Feb. 10, 2011, pp. 1-7.
The State Intellectual Property Office of China, English Translation of first Office Action for Chinese Patent Application No. 201180012690.7, dated Aug. 9, 2013, pp. 1-5.
IP Australia, Patent Examination Report No. 1 for Australian Patent Application No. 2011214865, dated Feb. 12, 2014, pp. 1-2.
IP Australia, Patent Examination Report No. 1 for Australian Patent Application No. 2011342287, dated Dec. 23, 2013, pp. 1-2.
International Search Report and Written Opinion for PCT/CA2011/050077, dated Dec. 15, 2010, pp. 1-6.
Li, X. et al., "Study on the Synthesis of Copolymer Containing N-substituted Acrylamide Component", Polymer Communications, 1984, p. 190-195. No. 2.
Phan, L. et al., "Switchable-polarity Solvents Prepared with a Single Liquid Component", J. Org. Chem., 2008, p. 127-132, vol. 73.
Kucera, J. et al., "Reverse Osmosis: Industrial Applications and Processes", 2010, p. 1-8, Wiley InterScience, Salem, Massachuseetts.
Jessop, P.G. et al., "Tertiary Amine Solvents Having Switchable Hydrophilicity", Green Chem., 2011, p. 619-623.
Second Notification of Office Action issued in Chinese Patent Application No. 201180012690.7 dated Jun. 26, 2014.
Yen, S.K. et al., "Study of draw solutes using 2-methylimidazole-based compounds in forward osmosis", Journal of Membrane Science, 364: 242-252 (2010).
Ge, Q. et al., "Draw solutions for forward osmosis processes: Developments, challenges, and prospects for the future", Journal of Membrane Science, 442: 225-237 (2013).
Office Action on U.S. Appl. No. 14/522,693, dated Feb. 1, 2017.
Office Action on U.S. Appl. No. 13/993,890, dated Feb. 27, 2017.
Second Office Action on Japanese Patent Application No. 2013-543479, dated Dec. 6, 2016.
Communication pursuant to Article 94(3) EPC, dated Sep. 11, 2019, issued in European Patent Application No. 10825900.3.

(56) References Cited

OTHER PUBLICATIONS

Summons to attend oral proceedings pursuant to Rule 115(1) EPC, dated May 6, 2020, issued in European Patent Application No. 10825900.3.
Communication pursuant to Rule 71(3) EPC, dated May 10, 2021, issued in European Patent Application No. 10825900.3.

* cited by examiner

N,N-(dimethylamino)ethanol ("DMAE")

N-methyldiethanolamine ("MDEA")

N,N,N',N'-tetramethyl-1,4-diamino-butane ("TMDAB")

N,N,N',N'-tetrakis(2-hydroxyethyl)ethylenediamine ("THEED")

1,1,4,7,10,10-hexamethyltriethylene-tetramine ("HMTETA")

1-[bis-[3-(dimethylamino)]propyl]amino]-2-propanol ("DMAPAP")

CO₂ Blank    Filtrate CO₂ Treated

WATER WITH SWITCHABLE IONIC STRENGTH

CROSS-REFERENCE TO RELATED APPLICATIONS

This application is a continuation application of U.S. application Ser. No. 13/578,290, filed Aug. 10, 2012, which is a § 371 of International Application No. PCT/CA2011/050075, filed Feb. 10, 2011, which claims the benefit of U.S. Provisional Application No. 61/303,170, filed Feb. 10, 2010 and U.S. Provisional Application No. 61/423,458, filed Dec. 15, 2010. The entire disclosure of each of the aforesaid applications is incorporated by reference in the present application.

FIELD OF THE INVENTION

The field of the invention is solvents, and specifically an aqueous solvent composition that can be reversibly converted between low ionic strength and higher ionic strength.

BACKGROUND OF THE INVENTION

Conventional solvents have fixed physical properties which can lead to significant limitations in their use as media for reactions and separations. Many chemical production processes involve multiple reactions and separation steps, and often the type of solvent that is optimum for any one step is different from that which is optimum for the next step. Thus it is common for the solvent to be removed after each step and a new solvent added in preparation for the next step. This removal and replacement greatly adds to the economic cost and environmental impact of the overall process. Therefore, there exists a need for a solvent that can change its physical properties.

Solvents are commonly used to dissolve material in manufacturing, cleaning, dyeing, extracting, and other processes. In order for a solvent to dissolve a material quickly, selectively, and in sufficient quantity, it is usually necessary for the solvent to have particular physical properties. Examples of such properties. Include ionic strength, hydrophobicity, hydrophilicity, dielectric constant, polarizability, acidity, basicity, viscosity, volatility, hydrogen-bond donating ability, hydrogen-bond accepting ability, and polarity. At some point in such a process after the dissolution, separation of the material from the solvent may be desired. Such a separation can be expensive to achieve, especially if the solvent is removed by distillation, which requires the use of a volatile solvent, which can lead to significant vapor emission losses and resulting environmental damage, e.g., through smog formation. Furthermore, distillation requires a large input of energy. It would therefore be desirable to find a non-distillate route for the removal of solvents from products.

Water is a particularly desirable solvent because of its low price, non-toxicity, nonflammability, and lack of adverse impact on the environment, but the separation of water from a product or other material by distillation is particularly expensive in terms of energy because of the high heat capacity of water and the high heat of vaporization of water. Therefore the need fora non-distillative route for the separation of water from products or other materials is particularly strong.

A common method for separating water from moderately hydrophobic yet water-soluble materials is 'salting out', a method in which a salt is added to an aqueous solution that includes a dissolved moderately hydrophobic compound, in sufficient amounts to greatly increase the ionic strength of the aqueous portion. High ionic strength greatly decreases the solubility of some compounds in water; thus most of the selected compound or material is forced out of the aqueous phase. The compound or material either precipitates (forms a new solid phase), creams out (forms a new liquid phase) or partitions into a pre-existing hydrophobic liquid phase if there is one. This "salting out" method requires no distillation but is not preferred because of the expense of using very large amounts of salts and, more importantly, because of the expense of removing the salt from the water afterwards.

SUMMARY OF THE INVENTION

An object of the present invention is to provide water with a switchable ionic strength. In an aspect there is provided a system for switching the ionic strength of water or an aqueous solution, comprising: means for providing an additive comprising at least one nitrogen that is sufficiently basic to be protonated by carbonic acid; means for adding the additive to water or to an aqueous solution to form an aqueous mixture with switchable ionic strength; means for exposing the mixture with switchable ionic strength to an ionizing trigger, such as $CO_2$, COS, $CS_2$ or a combination thereof, to raise the ionic strength of the mixture; and means for exposing the mixture with raised ionic strength to i) heat, (ii) a flushing gas, (ii) a vacuum or partial vacuum, (Iv) agitation, or (v) any combination thereof, to reform the aqueous mixture with switchable ionic strength. In specific embodiments, this system is used to remove water from a hydrophobic liquid or a solvent or in a desalination process.

In another aspect there is provided a system for controlling the amount, or the presence and absence, of dissolved salt in an aqueous mixture comprising a compound which reversibly converts to a salt upon contact with an ionizing trigger in the presence of water, the compound having the general formula (1):

(1)

where $R^1$, $R^2$, and $R^3$ are independently:

H;

a substituted or unsubstituted $C_1$ to $C_8$ aliphatic group that is linear, branched, or cyclic, optionally wherein one or more C of the alkyl group is replaced by $\{-Si(R^{10})_2-O-\}$ up to and including 8 C being replaced by 8 $\{-Si(R^{10})_2-O-\}$;

a substituted or unsubstituted $C_nSi_m$ group where n and m are independently a number from 0 to 8 and n+m is a number from 1 to 8;

a substituted or unsubstituted $C_4$ to $C_8$ aryl group wherein aryl is optionally heteroaryl, optionally wherein one or more C is replaced by $\{-Si(R^{10})_2-O-\}$;

a substituted or unsubstituted aryl group having 4 to 8 ring atoms, optionally including one or more $\{-Si(R^{10})_2-O-\}$, wherein aryl is optionally heteroaryl;

a $-(Si(R^{10})_2-O)_p-$ chain in which p is from 1 to 8 which is terminated by H, or is terminated by a substituted or unsubstituted $C_1$ to $C_8$ aliphatic and/or aryl group; or a substituted or unsubstituted ($C_1$ to $C_8$ aliphatic)-($C_4$ to $C_8$ aryl) group wherein aryl is optionally heteroaryl, optionally wherein one or more C is replaced by a {Si($R^{10}$)$_2$—O—};

wherein $R^{10}$ is a substituted or unsubstituted $C_1$ to $C_8$ aliphatic group, a substituted or unsubstituted $C_1$ to $C_8$ alkoxy, a substituted or unsubstituted $C_4$ to $C_8$ aryl wherein aryl is optionally heteroaryl, a substituted or unsubstituted aliphatic-alkoxy, a substituted or unsubstituted aliphatic-aryl, or a substituted or unsubstituted alkoxy-aryl groups; and wherein a substituent is independently: alkyl; alkenyl; alkynyl; aryl; aryl-halide; heteroaryl; cycloalkyl; Si(alkyl)$_3$; Si(alkoxy)$_3$; halo; alkoxyl; amino; alkylamino; alkenylamino; amide; amidine; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; amidine, phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester; or a combination thereof; and a substituent may be further substituted, wherein when an increase in ionic strength, or the presence of salt, is desired, the compound is exposed to the ionizing trigger in the presence of water, resulting in protonation of the compound, and wherein when a decrease in ionic strength, or the absence of salt, is desired, any ionizing trigger in said mixture is at a level that is insufficient to convert the compound to or maintain the compound in protonated form.

In a further aspect there is provided a system, comprising:

means for providing switchable water which is an aqueous liquid comprising an additive, that has switchable ionic strength;

means for exposing the switchable water to an ionizing trigger in the presence of water thereby protonating the additive to form ionic protonated-additive, which is water-miscible or water-soluble, so that the switchable water forms an ionic aqueous liquid;

means for exposing the ionic aqueous liquid to i) heat, (ii) a flushing gas, (iii) a vacuum or partial vacuum, (iv) agitation, or (v) any combination thereof, thereby expelling the ionizing trigger from the ionic aqueous liquid which leads to deprotonation of the protonated-additive, so that the switchable water forms a non-ionic aqueous liquid; and optionally, means for separating a selected compound from the ionic aqueous liquid prior to formation of the non-Ionic aqueous liquid.

In a further aspect there is provided a system for removing a selected compound from a solid material, comprising:

means for contacting a mixture of solid material and selected compound with switchable water, which comprises a mixture of water and a switchable additive in its nonprotonated, non-ionic form, so that at least a portion of the selected compound becomes associated with the switchable water to form an aqueous non-ionic solution;

optionally, means for separating the solution from residual solid material;

means for contacting the solution with an ionizing trigger in the presence of water to convert a substantial amount of the switchable additive from its unprotonated form to its protonated form, resulting in a two-phase liquid mixture having a liquid phase comprising the selected compound, and an aqueous ionic liquid phase comprising water and the ionic protonated additive; and means for separating the selected compound from the liquid phase.

Yet another aspect provides a system for modulating an osmotic gradient across a membrane, comprising:

a semi-permeable membrane;

a switchable water comprising an additive having a switchable ionic strength on one side of said semi-permeable membrane;

means for contacting the semi-permeable membrane with feed stream; and means for contacting the switchable water with an ionizing trigger to ionize the additive and thereby increase solute concentration in the switchable water and modulate the osmotic gradient.

An aspect provides a desalination system comprising:

a semi-permeable membrane that is selectively permeable for water, a draw solution comprising an additive having switchable ionic strength and water;

means for introducing an ionizing trigger to the draw solution to ionize the additive;

means for contacting the semi-permeable membrane with a feed stream of an aqueous salt solution to permit flow of water from the aqueous salt solution through the semi-permeable membrane into the draw solution comprising the ionized additive; and means for separating the additive from the water.

Another aspect provides a system for concentrating a dilute aqueous solution, comprising:

a semi-permeable membrane that is selectively permeable for water;

a draw solution comprising an additive having switchable ionic strength;

means for introducing an ionizing trigger to the draw solution to ionize the additive;

means for contacting the semi-permeable membrane with a feed stream of the dilute aqueous solution to permit flow of water from the dilute aqueous solution through the semi-permeable membrane into the draw solution comprising the ionized additive; and optionally, means for separating the additive from the water.

Another aspect provides a method of separating a solute from an aqueous solution, comprising combining in any order: water; a solute; $CO_2$, COS, $CS_2$ or a combination thereof; and an additive that comprises at least one nitrogen atom that is sufficiently basic to be protonated by carbonic acid; and allowing separation of two components: a first component that comprises an ionic form of the additive wherein the nitrogen atom is protonated and optionally, water; and a second component that comprises the solute; wherein the solute is not reactive with the additive, $CO_2$, COS, $CS_2$ or a combination thereof.

In yet another aspect, there is provided a method for modulating ionic strength, comprising providing an aqueous solution of lower ionic strength comprising water and an additive that comprises at least one nitrogen that is sufficiently basic to be protonated by carbonic acid; contacting the aqueous solution of lower ionic strength with $CO_2$, COS, $CS_2$ or a combination thereof, to form a higher ionic strength solution; subjecting the higher ionic strength solution to heat, contact with a flushing gas, or heat and contact with a flushing gas; and reforming the aqueous solution of lower ionic strength.

In an aspect, there is provided a method for destabilizing or preventing formation of a dispersion, comprising combining in any order to form a mixture: water; a water-immiscible or water-insoluble ingredient; an additive that comprises at least one nitrogen that is sufficiently basic to be protonated by carbonic acid; and $CO_2$, COS, $CS_2$ or a combination thereof; and allowing the mixture to separate into two components, a first component comprising the water-immiscible ingredient and a second component comprising water and an ionic form of the additive.

It should be understood for all aspects and embodiments thereof that employment of an additive as described in the present application incudes employment of more than one additive.

In embodiments of the above aspects, the additive is a compound of formula (1),

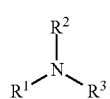

(1)

where $R^1$, $R^2$, and $R^3$ are each independently: H; a substituted or unsubstituted $C_1$ to $C_8$ aliphatic group that is linear, branched, or cyclic, optionally wherein one or more C of the alkyl group is replaced by $\{-Si(R^{10})_2-O-\}$ up to and including 8 C being replaced by 8 $\{-Si(R^{10})_2-O-\}$; a substituted or unsubstituted $C_n Si_m$ group where n and m are independently a number from 0 to 8 and n+m is a number from 1 to 8; a substituted or unsubstituted $C_4$ to $C_8$ aryl group wherein aryl is optionally heteroaryl, optionally wherein one or more C is replaced by a $\{-Si(R^{10})_2-O-\}$; a substituted or unsubstituted aryl group having 4 to 8 ring atoms, optionally including one or more $\{-Si(R^{10})_2-O-\}$, wherein aryl is optionally heteroaryl; a $-(Si(R^{10})_2-O)_p-$ chain in which p is from 1 to 8 which is terminated by H, or is terminated by a substituted or unsubstituted $C_1$ to $C_8$ aliphatic and/or aryl group; or a substituted or unsubstituted ($C_1$ to $C_8$ aliphatic)-($C_4$ to $C_8$ aryl) group wherein aryl is optionally heteroaryl, optionally wherein one or more C is replaced by $\{-Si(R)_2-O-\}$; wherein $R^{10}$ is a substituted or unsubstituted $C_1$ to $C_8$ aliphatic group, a substituted or unsubstituted $C_1$ to $C_8$ alkoxy, a substituted or unsubstituted $C_4$ to $C_8$ aryl wherein aryl is optionally heteroaryl, a substituted or unsubstituted aliphatic-alkoxy, a substituted or unsubstituted aliphatic-aryl, or a substituted or unsubstituted alkoxy-aryl group; and wherein a substituent is independently: alkyl; alkenyl; alkynyl; aryl; aryl-halide; heteroaryl; cycloalkyl; Si(alkyl)$_3$; Si(alkoxy)$_3$; halo; alkoxyl; amino; alkylamino; dialkylamino, alkenylamino; amide; amidine; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester, or a combination thereof; and a substituent may be further substituted.

In certain embodiments of the above aspects, the ionic form of the additive is a compound of formula (2)

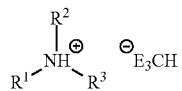

(2)

wherein $R^1$, $R^2$, and $R^3$ are as defined for the compound of formula (1) above, and E is O, S or a mixture of O and S.

In certain embodiments of the compounds of formulas (1) and (2), one or more of $R^1$, $R^2$, and $R^3$ comprise one or more nitrogen that is sufficiently basic to be protonated by carbonic acid. As would be readily appreciated by the skilled worker, each of the one or more nitrogen that is sufficiently basic to be protonated by carbonic acid is associated with a corresponding counter ion $E_3CH^-$ in the compound of formula (2).

In certain embodiments of the compounds of formulas (1) and (2), two of $R^1$, $R^2$, and $R^3$, taken together with the nitrogen to which they are attached, are joined to form a heterocyclic ring. In some embodiments, the heterocyclic ring has 4 to 8 atoms in the ring. In certain embodiments of formula (1) $R^1$, $R^2$, and $R^3$ may be H. $R^1$, $R^2$, and $R^3$ may be a substituted or unsubstituted $C_1$ to $C_8$ alkyl group that is linear, branched, or cyclic, optionally containing 1 to 8 $\{-Si(R^{10})_2-O-\}$. $R^1$, $R^2$, and $R^3$ may be a substituted or unsubstituted $C_2$ to $C_8$ alkenyl group that is linear, branched, or cyclic, optionally containing 1 to 8 $\{-Si(R^{10})_2-O-\}$. $R^1$, $R^2$, and $R^3$ may be a substituted or unsubstituted $C_n Si_m$ group where n and m are independently a number from 0 to 8 and n+m is a number from 1 to 8. $R^1$, $R^2$, and $R^3$ may be a substituted or unsubstituted $C_5$ to $C_8$ aryl group optionally containing 1 to 8 $\{-Si(R^{10})_2-O-\}$. $R^1$, $R^2$, and $R^3$ may be a substituted or unsubstituted heteroaryl group having 4 to 8 atoms in the aromatic ring optionally containing 1 to 8 $\{-Si(R^{10})_2-O-\}$. $R^1$, $R^2$, and $R^3$ may be a $-(Si(R^1)_2-O)_p-$ chain in which p is from 1 to 8 which is terminated by H or a substituted or unsubstituted $C_1$ to $C_8$ alkyl group that is linear, branched, or cyclic. $R^1$, $R^2$, and $R^3$ may be a substituted or unsubstituted $C_1$ to $C_8$ alkylene-$C_5$ to $C_8$ aryl group optionally containing 1 to 8 $\{-Si(R^{10})_2-O-\}$. $R^1$, $R^2$, and $R^3$ may be a substituted or unsubstituted $C_2$ to $C_8$ alkenylene-$C_5$ to $C_8$ aryl group optionally containing 1 to 8 $\{-Si(R^{10})O-\}$. $R^1$, $R^2$, and $R^3$ may be a substituted or unsubstituted $C_1$ to $C_8$ alkylene-heteroaryl group having 4 to 8 atoms in the aromatic ring optionally containing 1 to 8 $\{-Si(R^{10})_2-O-\}$. $R^1$, $R^2$, and $R^3$ may be a substituted or unsubstituted $C_2$ to $C_8$ alkenylene-heteroaryl group having 4 to 8 atoms in the aromatic ring optionally containing 1 to 8 $\{-Si(R^{10})_2-O-\}$. $R^{10}$ may be a substituted or unsubstituted: $C_1$ to $C_8$ alkyl, $C_5$ to $C_8$ aryl, heteroaryl having from 4 to 8 carbon atoms in the aromatic ring, or $C_1$ to $C_8$ alkoxy moiety.

In embodiments of the above aspects, the additive is a compound of formula (6),

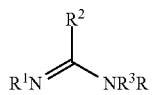

(6)

where $R^1$, $R^2$, $R^3$, and $R^4$ are independently:
H;
a substituted or unsubstituted $C_1$ to $C_8$ aliphatic group that is linear, branched, or cyclic, optionally wherein one or more C of the alkyl group is replaced by $\{-Si(R^{10})_2-O-\}$ up to and including 8 C being replaced by 8 $\{-Si(R^1_2-O-\}$;
a substituted or unsubstituted $C_n Si_m$ group where n and m are independently a number from 0 to 8 and n+m is a number from 1 to 8;
a substituted or unsubstituted $C_4$ to $C_8$ aryl group wherein aryl is optionally heteroaryl, optionally wherein one or more C is replaced by $\{-Si(R^{10})_2-O-\}$;

a substituted or unsubstituted aryl group having 4 to 8 ring atoms, optionally including one or more {—Si(R$^{10}$)$_2$—O—}, wherein aryl is optionally heteroaryl;

a —(Si(R$^{10}$)$_2$—O)$_p$— chain in which p is from 1 to 8 which is terminated by H, or is terminated by a substituted or unsubstituted C$_1$ to C$_8$ aliphatic and/or aryl group; or a substituted or unsubstituted (C$_1$ to C$_8$ aliphatic)-(C$_4$ to C$_8$ aryl) group wherein aryl is optionally heteroaryl, optionally wherein one or more C is replaced by a {—Si(R$^{10}$)$_2$—O—};

wherein R$^{10}$ is a substituted or unsubstituted C$_1$ to C$_8$ aliphatic group, a substituted or unsubstituted C$_1$ to C$_8$ alkoxy, a substituted or unsubstituted C$_4$ to C$_8$ aryl wherein aryl is optionally heteroaryl, a substituted or unsubstituted aliphatic-alkoxy, a substituted or unsubstituted aliphatic-aryl, or a substituted or unsubstituted alkoxy-aryl groups; and wherein a substituent is independently: alkyl; alkenyl; alkynyl; aryl; aryl-halide; heteroaryl; cycloalkyl; Si(alkyl)$_3$; Si(alkoxy)$_3$; halo; alkoxyl; amino; alkylamino; alkenylamino; amide; amidine; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; amidine, phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester; or a combination thereof; and a substituent may be further substituted.

In certain embodiments of the above aspects, the ionic form of the additive is a compound of formula (6'):

wherein R$^1$, R$^2$, R$^3$ and R$^4$ are as defined for the compound of formula (6) above, and E is O, S or a mixture of O and S.

In embodiments of the above aspects, the at least one nitrogen being sufficiently basic to be protonated by carbonic acid is the at least one nitrogen having a conjugate acid with a pK$_a$ range from about 6 to about 14, or about 8 to about 10.

In certain embodiments of the above aspects, the additive is MDEA (N-methyl diethanol-amine); TMDAB (N,N,N', N'-tetramethyl-1, 4-diaminobutane); THEED (N, N,N',N'-tetrakis(2-hydroxyethyl) ethylenediamine); DMAPAP (1-[bis[3-(dimethylamino)]propyl]amino]-2-propanol); HMTETA (1,1,4,7,10,10-hexamethyl triethylenetetramine) or DIAC (N',N'-(butane-1,4-diyl)bis(N,N-dimethylacetimidamide.

In an embodiment of certain aspects, the dilute aqueous solution is wastewater.

In certain embodiments of the aspect of a method for destabilizing or preventing formation of a dispersion, the combining in any order comprises forming a mixture by adding the additive to an aqueous solution that comprises the solute; and contacting the mixture with CO$_2$, COS, CS$_2$ or a combination thereof. In another embodiment, the combining in any order comprises forming a mixture by adding the solute to water or an aqueous solution; contacting the mixture with CO$_2$, COS. CS$_2$ or a combination thereof; and adding the additive. In yet another embodiment, the combining in any order comprises forming a mixture by adding the solute to an aqueous solution that comprises the additive; and contacting the mixture with CO$_2$, COS, CS$_2$ or a combination thereof. In another embodiment, the combining in any order comprises adding a mixture comprising the solute and the additive to an aqueous solution that comprises CO$_2$, COS. CS$_2$ or a combination thereof. In another embodiment, the combining in any order comprises forming a mixture by adding the solute to an aqueous solution that comprises CO$_2$, COS, CS$_2$ or a combination thereof, and adding the additive.

In certain embodiments of this aspect, the solute comprises a product of a chemical reaction. The first component may further comprise a water-soluble catalyst. The solute may comprise a catalyst. In another embodiment of certain aspects, combining further comprises combining the water, the solute, the additive, and the CO$_2$, COS, CS$_2$ or a combination thereof, with a hydrophobic liquid, wherein after the separating step the second component comprises the hydrophobic liquid.

In certain embodiments, a mixture of water, the solute, and the additive is a homogeneous liquid. In other embodiments, a mixture of water and the ionic form of the additive is a homogeneous liquid. In yet another embodiment, a mixture of water and the ionic form of the additive is a suspension. In another embodiment, a mixture of water and the ionic form of the additive is a solid. In certain embodiments the solute is soluble or miscible in low ionic strength aqueous solutions and is insoluble or immiscible in high ionic strength aqueous solutions.

Some embodiments further comprise isolating the first component, and subjecting it to a trigger to form an aqueous solution comprising the additive, wherein the trigger is heat, bubbling with a flushing gas, or heat and bubbling with a flushing gas. In certain embodiments, Isolating Includes centrifuging, decanting, filtering, or a combination thereof. In certain embodiments, the additive is water-soluble or water-miscible in both its ionized form and its non-ionized form. In certain embodiments, only the ionized form of the additive is water-soluble or water-miscible and the non-Ionized form is water insoluble or immiscible.

In certain embodiments of the above aspects, number of moles of water in the aqueous solution and number of moles of basic nitrogen in the additive in the aqueous solution is approximately equivalent. In other embodiments of the above aspects, number of moles of water in the aqueous solution is in excess over number of moles of basic nitrogen in the additive in the aqueous solution.

In an embodiment of the aspect regarding a method for destabilizing or preventing formation of a dispersion, the dispersion is an emulsion and the water-immiscible ingredient is a liquid or a supercritical fluid. In other embodiments, the dispersion is a reverse emulsion and the water-immiscible ingredient is a liquid or a supercritical fluid. In yet another embodiment of this aspect, the dispersion is a foam and the water-immiscible ingredient is a gas. In other embodiments of this aspect, the dispersion is a suspension and the water-immiscible ingredient is a solid. In embodiments of the aspects described herein, a mixture may further comprise a surfactant.

In an embodiment of the aspect regarding the method for modulating ionic strength, the method is used as a sensor of CO$_2$, COS or CS$_2$; a detector of CO$_2$, COS or CS$_2$; a chemical switch; a surfactant deactivator; or to conduct electricity.

In further embodiments of the aspect regarding a method of separating a solute from an aqueous solution, the aspect regarding modulating ionic strength, and the aspect regarding a method for destabilizing or preventing formation of a dispersion are used to remove water from a hydrophobic liquid or a solvent.

In further embodiments, methods of these aspects are used in a desalination process or a wastewater treatment process.

BRIEF DESCRIPTION OF THE DRAWINGS

Embodiments of the invention will now be described, by way of example, with reference to the accompanying drawings.

FIG. 14B Study 2 of Example 12; and FIG. 14C Study 3 of Example 12).

FIG. 15B clay+1 mM TMDAB after 1 h $CO_2$; FIG. 15C clay+1 mM TMDAB-$CO_2$ by addition of $N_2$ for 1 h; and FIG. 11D photographs of mixtures 30 TMDAB, after $CO_2$, and after $N_2$).

FIG. 16D photographs of mixtures+TMDAB after $CO_2$, and after $N_2$).

FIG. 17B $CO_2$ blank+clay (control); FIG. 17C photographs of mixtures $CO_2$ filtrate+clay and $CO_2$ blank+clay (control)).

DETAILED DESCRIPTION OF THE INVENTION

Definitions

Figure 1:
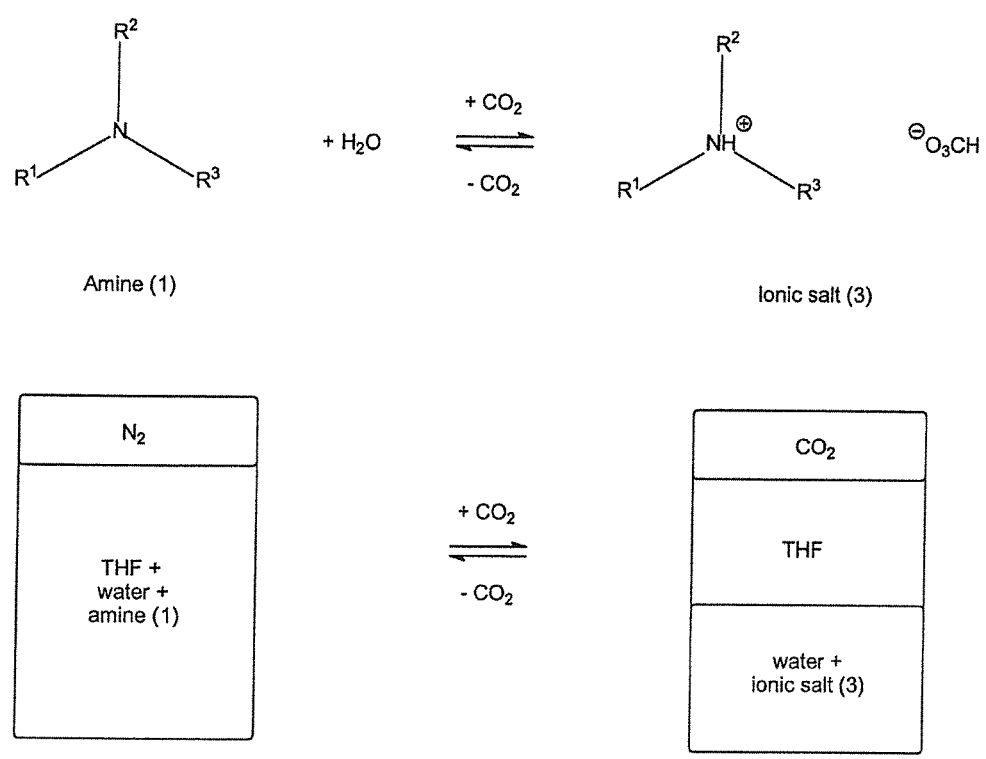
FIG. 1 shows a chemical reaction equation and a schematic of the switching reaction between differing ionic strength forms of an aqueous solution of an amine.

Unless defined otherwise, al technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, "aliphatic" refers to hydrocarbon moieties that are linear, branched or cyclic, may be alkyl, alkenyl or alkynyl, and may be substituted or unsubstituted. "Alkenyl" means a hydrocarbon moiety that is linear, branced or cyclic and contains at least one carbon to carbon double bond. "Aryl" means a moiety including a substituted or unsubstituted aromatic ring, including heteroaryl moieties and moieties with more than one conjugated aromatic ring; optionally it may also include one or more non-aromatic ring. "$C_5$ to $C_8$ Aryl" means a moiety including a substituted or unsubstituted aromatic ring having from 5 to 8 carbon atoms in one or more conjugated aromatic rings. Examples of aryl moieties include phenyl.

"Heteroaryl" means a moiety including a substituted or unsubstituted aromatic ring having from 4 to 8 carbon atoms and at least one heteroatom in one or more conjugated aromatic rings. As used herein, "heteroatom" refers to non-carbon and non-hydrogen atoms, such as, for example, O, S, and N. Examples of heteroaryl moieties include pyridyl tetrahydrofuranyl and thienyl.

"Alkylene" means a divalent alkyl radical, e.g., —$C_fH_{2f}$— wherein f is an integer. "Alkenylene" means a divalent alkenyl radical, e.g., —CHCH—. "Arylene" means a divalent aryl radical, e.g., —$C_6H_4$—. "Heteroarylene" means a divalent heteroaryl radical, e.g., —$C_5H_3N$—. "Alkylene-aryl" means a divalent alkylene radical attached at one of its two free valencies to an aryl radical, e.g.,— $CH_2$—$C_5H_5$. "Alkenylene-aryl" means a divalent alkenylene radical attached at one of its two free valencies to an aryl radical, e.g., —CHCH—$C_6H_5$. "Alkylene-heteroaryl" means a divalent alkylene radical attached at one of its two free valencies to a heteroaryl radical, e.g., —$CH_2$—$C_5H_4N$. "Alkenylene-heteroaryl" means a divalent alkenylene radical attached at one of its two free valencies to a heteroaryl radical, e.g., —CHCH—$C_5H_4N$—.

"Alkylene-arylene" means a divalent alkylene radical attached at one of its two free valencies to one of the two free valencies of a divalent arylene radical, e.g., —$CH_2$—$C_6H_4$—. "Alkenylene-arylene" means a divalent alkenylene radical attached at one of its two free valencies to one of the two free valencies of a divalent arylene radical. e.g., —CHCH—$C_6H_4$—. "Alkylene-heteroarylene" means a divalent alkylene radical attached at one of its two free valencies to one of the two free valencies of a divalent heteroarylene radical. e.g., —CH—$C_5H_3N$—. "Alkenylene-heteroarylene" means a divalent alkenylene radical attached at one of its two free valencies to one of the two free valencies of a divalent heterarylene radical, e.g., —CHCH—$C_5H_3N$—.

"Substituted" means having one or more substituent moieties whose presence does not interfere with the desired reaction. Examples of substituents include alkyl, alkenyl, alkynyl, aryl, aryl-halide, heteroaryl, cycloalkyl (non-aromatic ring), Si(alkyl)$_3$, Si(alkoxy)$_3$, halo, alkoxyl, amino, alkylamino, alkenylamino, amide, amidine, hydroxyl, thioether, alkylcarbonyl, alkylcarbonyloxy, arylcarbonyloxy, alkoxycarbonyloxy, aryloxycarbonyloxy, carbonate, alkoxycarbonyl, aminocarbonyl, alkylthiocarbonyl, phosphate, phosphate ester, phosphonato, phosphinato, cyano, acylamino, imino, sulfhydryl, alkylthio, arylthio, thiocarboxylate, dithiocarboxylate, sulfate, sulfato, sulfonate, sulfamoyl, sulfonamide, nitro, nitrile, azido, heterocyclyl, ether, ester, silicon-containing moieties, thioester, or a combination thereof. Preferable substituents are alkyl, aryl, heteroaryl, and ether. It is noted that aryl halides are acceptable substituents. Alkyl halides are known to be quite reactive, and are acceptable so long as they do not interfere with the desired reaction. The substituents may themselves be substituted. For instance, an amino substituent may itself be mono or independently disubstiued by further substituents defined above, such as alkyl, alkenyl, alkynyl, aryl, arylhalide and heteroaryl cycloalkyl (non-aromatic ring).

"Short chain aliphatic" or "lower aliphatic" refers to $C_1$ to $C_4$ aliphatic. "Long chain ailphatic" or "higher aliphatic" refers to $C_5$ to $C_8$ aliphatic.

As used herein, the term "unsubstituted" refers to any open valence of an atom being occupied by hydrogen. Also, if an occupant of an open valence position on an atom is not specified then it is hydrogen.

As used herein, the term "polymer" means a molecule of high relative molecular mass, the structure of which essentially comprises multiple repetition of units derived from molecules of low relative molecular mass. As used herein, the term "oligomer" means a molecule of intermediate relative molecular mass, the structure of which essentially comprises a small plurality of units derived from molecules of low relative molecular mass. A molecule can be regarded as having a high relative molecular mass if the addition or removal of one or a few of the units has a negligible effect on the molecular properties. A molecule can be regarded as having an intermediate relative molecular mass if it has molecular properties which do vary significantly with the removal of one or a few of the units. (See IUPAC Recommendations 1996 in (1996) *Pure and Applied Chemistry* 68: 2287-2311.)

The term "switched" means that the physical properties and in particular the ionic strength, have been modified. "Switchable" means able to be converted from a first state with a first set of physical properties, e.g., a first state of a given ionic strength, to a second state with a second set of physical properties, e.g., a state of higher ionic strength. A "trigger" is a change of conditions (e.g., Introduction or removal of a gas, change in temperature) that causes a change in the physical properties, e.g., ionic strength. The term "reversible" means that the reaction can proceed in either direction (backward or forward) depending on the reaction conditions.

"Carbonated water" means a solution of water in which $CO_2$ has been dissolved. "$CO_2$ saturated water" means a solution of water in which $CO_2$ is dissolved to the maximum extent at that temperature.

As used herein, "a gas that has substantially no carbon dioxide" means that the gas has insufficient $CO_2$ content to interfere with the removal of $CO_2$ from the solution. For some applications, air may be a gas that has substantially no $CO_2$. Untreated air may be successfully employed, i.e., air in which the $CO_2$ content is unaltered; this would provide a cost saving. For instance, air may be a gas that has substantially no $CO_2$ because in some circumstances, the approximately 0.04% by volume of $CO_2$ present in air is insufficient to maintain a compound in a switched form, such that air can be a trigger used to remove $CO_2$ from a solution and cause switching. Similarly, "a gas that has substantially no $CO_2$, $CS_2$ or COS" has insufficient $CO_2$, $CS_2$ or COS content to interfere with the removal of $CO_2$, $CS_2$ or COS from the solution.

As used herein, "additive" refers to a compound comprising at least one amine or amidine nitrogen that is sufficiently basic that when it is in the presence of water and $CO_2$ (which form carbonic acid), for example, the compound becomes protonated. When an aqueous solution that includes such a switchable additive is subjected to a trigger, the additive reversibly switches between two states, a non-Ionized state where the nitrogen is trivalent and is uncharged, and an ionized state where the nitrogen is protonated making it a 4-coordinate positively charged nitrogen atom. For convenience herein, the uncharged or non-ionic form of the additive is generally not specified, whereas the ionic form is generally specified. The terms 'ionized' or "ionic" as used herein in identifying a form the additive merely refer to the protonated or charged state of the amine or amidine nitrogen.

As would be readily appreciated by a worker skilled in the art, since few protonation reactions proceed to completion, when a compound is referred to herein as being "protonated" it means that ad, or only the majority, of the molecules of the compound are protonated. For example, when the additive has a single N atom, more than about 90%, or more than about 95%, or about 95%, of the molecules are protonated by carbonic acid.

As used herein, "amine additive" (see compound of formula (1) below) refers to a molecule with a structure $R^1R^2R^3N$, where $R^1$ through $R^3$ are independently hydrogen or aliphatic or aryl, which includes heteroaryl, as discussed below. The ionic form of an amine (see compound of formula (2) below) is termed an "ammonium salt". The bicarbonate salt of an amine (see compound of formula (3) below) is termed an "ammonium bicarbonate".

As used herein, "amidine additive" refers to a molecule with a structure $R^1N=C(R^2)-NR^3R^4$, where $R^1$ through $R^4$ are independently hydrogen or aliphatic or aryl, which includes heteroaryl, or siloxyl, as discussed below. The ionic form of an amidine (see compound of formula (6) below) is termed an "amidinium salt".

As used herein, the term "a basic nitrogen" or "a nitrogen that is sufficiently basic to be protonated by carbonic acid" is used to denote a nitrogen atom that has a lone pair of electrons available and susceptible to protonation. Although carbonic acid ($CO_2$ in water) is mentioned, such a nitrogen would also be protonated by $CS_2$ in water and COS in water. This term is intended to denote the nitrogen's basicity and it is not meant to imply which of the three trigger gases ($CO_2$, $CS_2$ or COS) is used.

'Ionic' means containing or involving or occurring in the form of positively or negatively charged ions, i.e., charged moieties. "Nonionic" means comprising substantially of molecules with no formal charges. Nonionic does not imply that there are no ions of any kind, but rather that a substantial amount of basic nitrogens are in an unprotonated state. 'Salts' as used herein are compounds with no net charge formed from positively and negatively charged ions. For purposes of this disclosure, "ionic liquids" are salts that are liquid below 100° C.; such liquids are typically nonvolatile, polar and viscous. "Nonionic liquids" means liquids that do not consist primarily of molecules with formal charges such as ions. Nonionic squids are available in a wide range of polarities and may be polar or nonpolar; they are typically more volatile and less viscous than ionic liquids.

"Ionic strength" of a solution is a measure of the concentration of ions in the solution. Ionic compounds (i.e., salts), which dissolve in water will dissociate into ions, increasing the ionic strength of a solution. The total concentration of dissolved ions in a solution will affect important properties of the solution such as the dissociation or solubility of different compounds. The ionic strength, I, of a solution is a function of the concentration of all ions present in the solution and is typically given by the equation (A), $$I = \frac{1}{2}\sum_{i=1}^{n} c_i z_i^2 \quad (A)$$

in which $c_i$ is the molar concentration of ion i in mol/dm³, $z_i$ is the charge number of that ion and the sum is taken over al ions dissolved in the solution. In non-ideal solutions, volumes are not additive such that it is preferable to calculate the ionic strength in terms of molality (mol/kg $H_2O$), such that ionic strength can be given by equation (B), $$I = \frac{1}{2}\sum_{i=1}^{n} m_i z_i^2 \quad (B)$$

in which $m_i$ is the molality of ion i in mol/kg $H_2O$, and $z_i$ is as defined in the previous paragraph.

A "polar" molecule is a molecule in which some separation occurs of the centres of positive and negative charge (or of partial positive and partial negative charge) within the molecule. Polar solvents are typically characterized by a dipole moment. Ionic liquids are considered to be polar solvents, even though a dipole may not be present, because they behave in the same manner as polar liquids in terms of their ability to solubilize polar solutes, their miscibility with other polar liquids, and their effect on solvatochromic dyes. A polar solvent is generally better than a nonpolar (or less polar) solvent at dissolving polar or charged molecules.

"Nonpolar" means having weak solvating power of polar or charged molecules. Nonpolar solvents are associated with either having little or no separation of charge, so that no positive or negative poles are formed, or having a small dipole moment. A nonpolar solvent is generally better than a polar solvent at dissolving nonpolar, waxy, or oily molecules.

"Hydrophobicity" is a property of a molecule leading it to be repelled from a mass of water. Hydrophobic molecules are usually nonpolar and non-hydrogen bonding. Such molecules tend to associate with other neutral and nonpolar molecules. The degree of hydrophobic character of a molecule, or hydrophobicity, can be quantified by a log P value. The log P is the logarithm of the lipid-water partition coefficient, P, of a molecule. The lipid-water partition coefficient seeks to determine the ratio of solubilities of a molecule in a lipid environment and a hydrophilic aqueous environment. The lipid-water partition coefficient is the equilibrium constant calculated as the ratio of the concentration of the molecule in the lipid phase divided by the concentration of the molecule in the aqueous phase.

"Moderately hydrophobic" is used herein to refer to compounds that are moderately or completely soluble in aqueous solutions of low ionic strength but that are much less soluble or essentially insoluble in aqueous solutions of high ionic strength. Such compound may be liquids or solids; they may be organic or inorganic. An example of a moderately hydrophobic compound is tetrahydrofuran.

Partition coefficients can be determined using n-octanol as a model of the lipid phase and an aqueous phosphate buffer at pH 7.4 as a model of the water phase. Because the partition coefficient is a ratio, it is dimensionless. The partition coefficient is an additive property of a molecule, because each functional group helps determine the hydrophobic or hydrophilic character of the molecule. If the log P value is small, the molecule will be miscible with (or soluble in) water such that the water and molecule will form a single phase in most proportions. If the log P value is large, the compound will be immiscible with (or insoluble in) water such that a two-phase mixture will be formed with the water and molecule present as separate layers in most proportions.

It is possible to theoretically calculate log P values for many organic compounds because of the additive nature of the partition coefficient arising from the individual functional groups of a molecule. A number of computer programs are available for calculating log P values. The log P values described herein are predicted using ALOGPS 2.1 software, which calculates the log P value for a given molecule using nine different algorithms and then averages the values. This computational method is fully described by Tetko I. V. and Tanchuk V. Y. in *J. Chem. Inf. Comput. Sci.,* 2002, 42, 1136-1145 and in *J. Comput. Aid. Mol. Des.,* 2005, 19, 453-463, both of which are incorporated herein by reference.

In contrast to hydrophobicity, "hydrophilicity" is a property of a molecule allowing it to be dissolved in or miscible with a mass of water, typically because the molecule is capable of transiently bonding with water through hydrogen bonding.

Hydrophilic molecules are usually polar. Such molecules may thus be compatible with other polar molecules. Hydrophillic molecules may comprise at least one hydrophilic substituent which can transiently bond with water through hydrogen bonding. Hydrophilic substituents include amino, hydroxyl, carbonyl, carboxyl, ester, ether and phosphate moieties.

"Insoluble" refers to a poorly solubilized solid in a specified liquid such that when the sold and liquid are combined a heterogeneous mixture results. It is recognized that the solubility of an "insoluble" solid in a specified liquid might not be zero but rather it would be smaller than that which is useful in practice. The use of the terms "soluble", "insoluble", "solubility" and the like are not intended to imply that only a solid/liquid mixture is intended. For example, a statement that the additive is soluble in water is not meant to imply that the additive must be a sold; the possibility that the additive may be a liquid is not excluded.

"Miscibility" is a property of two liquids that when mixed provide a homogeneous solution. In contrast, "immiscibility" is a property of two liquids that when mixed provide a heterogeneous mixture, for instance having two distinct phases (i.e., layers).

As used herein, "immiscible" means unable to merge into a single phase.

Thus two liquids are described as "immiscible" if they form two phases when combined in a proportion. This is not meant to imply that combinations of the two liquids will be two-phase mixtures in all proportions or under all conditions. The immiscibility of two liquids can be detected if two phases are present, for example via visual inspection. The two phases may be present as two layers of liquid, or as droplets of one phase distributed in the other phase. The use of the terms "immiscible", "miscible", "miscibility" and the like are not intended to imply that only a liquid/liquid mixture is intended. For example, a statement that the additive is miscible with water is not meant to imply that the additive must be a liquid; the possibility that the additive may be a solid is not excluded.

As used herein, the term "contaminant" refers to one or more compounds that is intended to be removed from a mixture and is not intended to imply that the contaminant has no value.

As used herein the term "emulsion" means a colloidal suspension of a liquid in another liquid. Typically, an emulsion refers a suspension of hydrophobic liquid (e.g., oil) in water whereas the term "reverse emulsion" refers to a suspension of water in a hydrophobic liquid.

As used herein the term 'suspension' means a heterogeneous mixture of fine solid particles suspended in liquid.

As used herein the term "foam" means a colloidal suspension of a gas in a liquid.

As used herein the term 'dispersion' means a mixture of two components, wherein one component is distributed as particles, droplets or bubbles in the other component, and is intended to include emulsion (I.e., liquid in liquid, liquid in supercritical fluid, or supercritical fluid in liquid), suspension (i.e., solid in liquid) and foam (i.e., gas in liquid).

"NMR" means Nuclear Magnetic Resonance. "IR spectroscopy" means infrared spectroscopy. 'UV spectroscopy' means ultraviolet spectroscopy.

Figure 2:
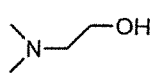
FIG. 2 presents the chemical structures of various tertiary amines useful as additives in the present invention.
Figure 2:
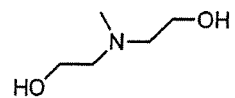
Figure 2:
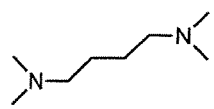
Figure 2:
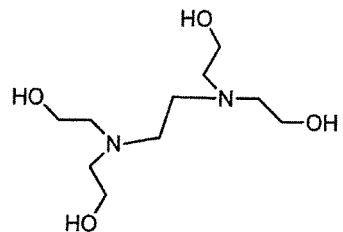
Figure 2:
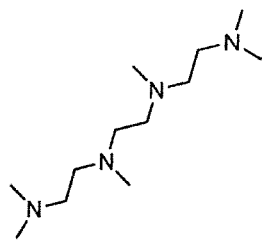
Figure 2:
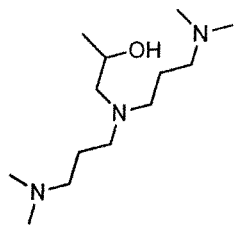

The term "DBU" means 1, 8-diazabicyclo-[5.4.0]-undec-7-ene. The term "DMAE" means N, N-(dimethylamino) ethanol. The term "MDEA" means N-methyl diethanolamine. The term "TMDAB" means N, N, N', N'-tetramethyl-1, 4-diaminobutane. The term"TEDAB" means N, N, N', N'-tetraethyl-1, 4-diaminobutane. The term "THEED" means N, N, N', N'-tetrakis(2-hydroxyethyl) ethylenediamine. The term "DMAPAP" means 1-[bis[3-(dimethylamino)]propyl]amino]-2-propanol. The term "HMTETA" means 1,1,4,7,10,10-hexamethyl triethylenetetramine. Structural formulae for these compounds are shown in FIG. 2.

The term "wastewater" means water that has been used by a domestic or industrial activity and therefore now includes waste products.

US Patent Application Publication No. 2008/0058549 discloses a solvent that reversibly converts from a nonionic liquid mixture to an ionic liquid upon contact with a selected trigger, such as $CO_2$. The nonionic liquid mixture includes an amidine or guanidine or both, and water, alcohol or a combination thereof.

Zhou K., et al. "Re-examination of Dynamics of Polyeletrolytes in Salt-Free Dilute solutions by Designing and Using a Novel Neutral-Charged-Neutral Reversible Polymer" Macromolecules (2009) 42, 7146-7154, discloses a polymer that can undergo a neutral-charged-neutral transition in DMF with 5% water. The transition between the neutral and charged state is achieved by alternately bubbling $CO_2$ and $N_2$ through a mixture containing the polymer.

Switchable Water

Provided herein is a liquid mixture comprising an aqueous component in which the ionic strength can be reversibly varied from a lower ionic strength to a higher ionic strength by subjecting the mixture to a trigger. Put simply, such aspects provide water that can be reversibly switched between water-with-substantially-no-salt and salty-water, over and over with little or substantially no energy input. The term "switchable water" is used herein to refer to the aqueous component which is pure water mixed with an additive, or an aqueous solution mixed with an additive, wherein the additive can switch between an ionic form and a non-ionic form in order to increase or decrease the ionic strength of the water or aqueous solution, respectively.

Traditionally, once a salt was added to water, high energy input was required to recapture the water (e.g., since the salted water had to be heated to its boiling point). Accordingly, certain aspects of this application provide methods of separating a compound from a mixture by solubilizing the compound in an aqueous solution of a first ionic strength (a switchable water) and then isolating the compound by switching the medium to a solution of a second ionic strength. Such methods use non-ionic aqueous solutions and ionic liquids Switchable water can be reused over and over in the extraction of a desired or selected compound.

Aqueous mixtures including switchable water as described herein are useful for extraction of a solute from a mixture, a solution, or a matrix. After use in its lower ionic strength form for example, for extraction of a water soluble solute, the switchable water is triggered to switch to its higher ionic strength form, to cause the precipitation or separation of the solute. The switchable water can then be re-used by switching it back to the lower ionic strength form. Solutes for extraction are either pure compounds or mixtures of compounds. They include both contaminants and desired materials. Such solutes can be extracted from various compositions, including, without limitation, soil, clothes, rock, biological material (for example, wood, pulp, paper, beans, seeds, meat, fat, bark, grass, crops, fur, natural fibres, cornstalks, oils), water, equipment, or manufactured materials (for example, machined parts, molded parts, extruded material, chemical products, refined oils, refined fuels, fabrics, fibres, sheets, and like materials, whether made of metal, mineral, plastic, inorganic, organic, or natural materials or combinations thereof). Desired solutes to be extracted include, without limitation, medicinal compounds, organic compounds, intermediate compounds, minerals, synthetic reagents, oils, sugars, foods, flavorants, fragrances, dyes, pesticides, fungicides, fuels, spices, and like materials.

Other non-limiting examples of selected solutes include the following: plant extracts (e.g., lignin, cellulose, hemicellulose, pyrolysis products, leaf extracts, tea extracts, petal extracts, rose hip extracts, nicotine, tobacco extracts, root extracts, ginger extracts, sassafras extracts, bean extracts, caffeine, gums, tannins, carbohydrates, sugars, sucrose, glucose, dextrose, maltose, dextrin); other bio-derived materials (e.g., proteins, creatines, amino acids, metabolites. DNA, RNA, enzymes); alcohols, methanol, ethanol, 1-propanol, 1-butanol, 2-propanol, 2-butanol, 2-butanol, t-butanol, 1,2-propanediol, glycerol, and the like; products of organic synthesis (e.g., ethylene glycol, 1,3-propanediol, polymers, poly(vinyl alcohol), polyacrylamides, poly(ethylene glycol), poly(propylene glycol)); industrially useful chemicals (e.g., plasticizers, phenols, formaldehyde, paraformaldehyde, surfactants, soaps, detergents, demulsifiers, anti-foam additives); solvents (e.g., THF, ether, ethyl acetate, acetonitrile, dimethylsulfoxide, sulfolene, sulfolane, dimethylformamide, formamide, ethylene carbonate, propylene carbonate, dimethylacetamide, hexamethylphosphoramide); fossil fuel products (e.g., creosote, coal tar, coal pyrolysis oil components, crude oil, water-soluble components of crude oil): colorants (e.g., dyes, pigments, organic pigments, stains, mordants); undesired compounds and mixtures (e.g., dirt or stains on clothing or equipment).

Selected compounds that may be suited to extraction methods described herein include compounds that are soluble to different degrees in water of lower ionic strength and water of higher ionic strength. Certain selected solutes are more soluble in aqueous solutions as described herein that have lower ionic strength and include an amine additive than they are in neat water. Because the following description is about a reversible reaction that proceeds from low ionic strength to high ionic strength and back again, over and over, one must choose one of these two states to begin the process. However, this choice is arbitrary, and as described below, one could start with either state depending on the specific application.

Switchable Additive

The exemplary description provided below starts with the low ionic strength switchable water, which comprises water and a switchable additive in its non-Ionic form that is substantially soluble in water. The switchable water with the non-ionic form of the additive has little to no ionic strength. This switchable water can be used as a solvent to dissolve compounds that do not react with the additive. When it is desirable to separate dissolved compounds from the non-ionic switchable water, a trigger is applied and the additive is converted to its ionic form. The resultant ionic switchable water has a higher ionic strength.

In accordance with one example, both the non-ionic and the ionic forms of the switchable additive employed in this reversible reaction are soluble with water, such that where a liquid mixture separates into two phases, a hydrophobic phase and an aqueous phase, substantially all of the additive remains in the aqueous layer, no matter whether it is in its non-ionic form or its ionic form. In this example, in contrast to the additive, certain compounds will no longer be soluble in the higher ionic strength solution, and they will separate into a phase that is distinct from the ionic aqueous phase. This distinct phase may be a pre-existing hydrophobic liquid phase (non-aqueous solvent).

In accordance with an alternative example, only ionic form of the switchable additive is soluble in water, such that when the additive is converted to its non-ionic form, two phases are formed, with the non-Ionic form of the additive in the non-aqueous phase. The non-aqueous phase can include only the non-ionic form of the switchable additive, or it can include a solvent that is not soluble or miscible with water, such as a pre-existing hydrophobic liquid phase (non-aqueous solvent).

The switchable additive (also referred to herein as an "additive") is a compound comprising an amine nitrogen that is sufficiently basic that when it is in the presence of water and $CO_2$ (which form carbonic acid), for example, it becomes protonated. When an aqueous solution that includes such a switchable additive is subjected to a trigger, the additive reversibly switches between two states, a non-Ionic state where the amine nitrogen is trivalent and is uncharged, and an ionic state where the amine nitrogen is protonated making it a 4-coordinate positively charged nitrogen atom. Accordingly, the charged amine moiety has a negatively charged counterion that is associated with it in solution. The nature of the counterion depends on the trigger used and will be described below. An aqueous solution comprising the additive in its ionic state is distinguishable from an aqueous solution comprising the compound in its non-ionic state by comparing the ionic strengths.

In certain embodiments, the switchable water comprises water and an amine additive that is peralkylated. The term "peralkylated" as used herein means that the amine has alkyl or other groups connected to nitrogen atoms that are sufficiently basic that they are protonated by carbonic acid, so that the molecule contains no N—H bonds. Amine compounds of formulae (1) and (4) which do not have any N—H bonds are preferred because most primary and secondary amines are capable of carbamate formation during switching with $CO_2$. Removal of carbamate ions in water by heating and bubbling with a flushing gas to switch the salt back to the amine form can be difficult. This is evident from comparative example 2, in which it was determined that it was not possible to switch certain primary and a secondary amine additives in ionic form back to the corresponding non-Ionic amine forms using low energy input triggers. Thus, carbamate formation is undesirable because it can decrease the efficiency of reverting an ionic solution back to an aqueous solution of amine (non-ionic form). This concern about formation of carbamate ions is not relevant if the amine is an aniline (i.e., an aryl or heteroaryl group is attached directly to a nitrogen atom); in such a molecule, an N—H bond is not considered preferred.

Stable carbamate formation can be greatly reduced by using bulky substituents on primary and secondary amines to provide steric hindrance (Bougle F. and illiuta M. C., Chem Eng Sci, 2009, 64, 153-162 and references cited therein). Steric hindrance allows for easier $CO_2$ desorption. Tertiary amines are preferred since their ionic forms do not include carbamates but rather are bicarbonates anions. However, in some embodiments, primary and secondary amines that have bulky substituents are preferred because the switching process may be faster than that observed with tertiary amines. As demonstrated in Example 22 below, the inventors reasonably expect that efficient reversible switching is possible between non-ionic and ionic forms with primary and secondary amines that have bulky substituents. The inventors also reasonably expect that the presence of a small amount of a secondary or primary amine that is capable of carbamate formation, in addition to a switchable additive compound of formula (1), would not inhibit switching of the additive. In some embodiments, the presence of a small amount of secondary or primary amine may increase the rate of switching of the additive between its ionic and non-ionic forms.

In one embodiment, a primary amine additive can be used. However, the reversion of the ionic form of the primary amine additive to the non-ionic form is too difficult to be of practical use in application where reversion is required. Rather, a primary amine additive can be valuable in situations in which reversal of the additive ionization is unnecessary.

In another embodiment, a secondary amine additive can be used. As demonstrated in Example 22, certain secondary amine additives are reversibly switchable between an ionized and a non-ionized form.

Useful additives can comprise more than one nitrogen centre. Such compounds can be called, for example, diamines, triamines or polyamines. Polyamines include polymers with nitrogens in the polymer backbone. Polyamines also include polymers with nitrogens in pendant groups. Polyamines also include polymers with nitrogens in the polymer backbone and with nitrogens in pendant groups.

Polyamines also include small molecules (i.e., not polymers) that have more than one nitrogen atom. Examples of polyamines include poly(vinylamine), poly(N-vinyl-N,N-dimethylamine), poly(allylamine) poly(N-allyl-N,N-dimethylamine), 1,2,3,4,5,6-hexakis(N,N-dimethylaminomethyl)benzene (e.g., $C_6(CH_2NMe_2)_6$) and 1,2,3,4,5,6-hexakis(N,N-dimethylaminomethyl)cyclohexane (e.g., $C_6H_8(CH_2NMe_2)_6$).

An example of a method to prepare polyamine additive includes reacting homopolymers of propylene oxide or ethylene oxide with maleic anhydride under free radical conditions either in solution or in solid state to yield grafted material. As an alternative to homopolymers, random or block copolymers of propylene oxide and ethylene oxide can be used. Once prepared, the grafted material is reacted with a diamine (e.g., N1,N1-dimethylpropane-1,3-diamine) to form a polyamine additive that is useful as an additive in embodiments of the invention described herein. In some embodiments, ratios of the ethylene oxide and propylene oxide repeating units of the polyamine are controlled such that, at a given temperature and pressure, the additive in its "off" state is substantially insoluble in water and in its "on" state is soluble in water.

Another example of a method to prepare polyamine additive includes reacting a polymer of acrylic acid (or a corresponding ester) with a diamine (e.g., N1,N1-dimethylpropane-1,3-diamine) to form the additive via amide bond formation. As an alternative to acrylic acid polymer, another polymer that comprises carboxylic acid (or a corresponding ester thereof) can be used. An example of such a polymer includes a random or block co-polymer of polystyrene and a polymer comprising carboxylic acid. The amide bond is formed, for example, via dehydration, acid chloride reaction, cataytically, or the like. Any secondary or primary amide nitrogen atom can be alkylated to further tune solubility properties of the additive. In some embodiments, ratios of the components of the polyamine are controlled such that, at a given temperature and pressure, the additive in its "off" state is substantially insoluble in water and in its "on" state, after exposure to $CO_2$ and $H_2O$, is soluble in water.

In certain embodiments the additive is immiscible or insoluble, or poorly miscible or poorly soluble, in water but is converted by a trigger to a form that is ionic and is soluble or miscible with water. The immiscibility or insolubility of the additive in its non-Ionized form is advantageous in some applications because the additive can be readily removed from the water, when such removal is desired, by the removal of the trigger. TEDAB is an example of an additive that functions according to this embodiment.

In certain aspects of the invention the additive is a compound of formula (1).

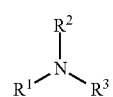

(1)

where $R^1$, $R^2$, and $R^3$ are independently:

H;

a substituted or unsubstituted $C_1$ to $C_8$ aliphatic group that is linear, branched, or cyclic, optionally wherein one or more C of the alkyl group is replaced by a {—Si(R')$_2$—O—} unit up to and including 8 C units being replaced by 8 {—Si($R^{10}$)$_2$—O—} units;

a substituted or unsubstituted $C_nSi_m$ group where n and m are independently a number from 0 to 8 and n+m is a number from 1 to 8;

a substituted or unsubstituted $C_4$ to $C_8$ aryl group wherein aryl is optionally heteroaryl, optionally wherein one or more C is replaced by a {—Si($R^{10}$)$_2$—O—} unit;

a substituted or unsubstituted aryl group having 4 to 8 ring atoms, optionally including one or more {—Si($R^{10}$)$_2$—O—} unit, wherein aryl is optionally heteroaryl;

a —(Si($R^{10}$)$_2$—O)$_p$— chain in which p is from 1 to 8 which is terminated by H, or is terminated by a substituted or unsubstituted $C_1$ to $C_8$ aliphatic and/or aryl group;

a substituted or unsubstituted $C_1$ to $C_8$ aliphatic-$C_4$ to $C_8$ aryl group wherein aryl is optionally heteroaryl, optionally wherein one or more C is replaced by a {—Si($R^{10}$)$_2$—O—} unit; or wherein $R^{10}$ is a substituted or unsubstituted $C_1$ to $C_8$ aliphatic group, $C_1$ to $C_8$ alkoxy, or $C_4$ to $C_8$ aryl wherein aryl is optionally heteroaryl.

A substituent may be independently: alkyl; alkenyl; alkynyl; aryl; aryl-halide; heteroaryl; cycloalkyl (non-aromatic ring); Si(alkyl)$_3$; Si(alkoxy)$_3$; halo; alkoxyl; amino, which includes diamino; alkylamino; alkenylamino; amide; amidine; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester; or a combination thereof. The substituents may themselves be substituted. For instance, an amino substituent may itself be mono or independently disubstitued by further substituents defined above, such as alkyl, alkenyl, alkynyl, aryl, aryl-halide and heteroaryl cyclic (non-aromatic ring).

A substituent may be preferably at least one hydrophilic group, such as Si($C_1$-$C_4$-alkoxy)$_3$, $C_1$-$C_4$-alkoxyl, amino, $C_1$-$C_4$-alkylamino, $C_2$-$C_4$-alkenylamino, substituted-amino, $C_1$-$C_4$-alkyl substituted-amino, $C_2$-$C_4$-alkenyl substituted-amino amide, hydroxyl, thioether, $C_1$-$C_4$-alkylcarbonyl, $C_1$-$C_4$-alkylcarbonyloxy, $C_1$-$C_4$-alkoxycarbonyloxy, carbonate, $C_1$-$C_4$-alkoxycarbonyl, aminocarbonyl, $C_1$-$C_4$-alkylthiocarbonyl, phosphate, phosphate ester, phosphonato, phosphinato, acylamino, imino, sulfhydryl, $C_1$-$C_4$-alkylthio, thiocarboxylate, dithiocarboxylate, sulfate, sulfato, sulfonate, sulfamoyl, sulfonamide, nitro, nitrile, $C_1$-$C_4$-alkoxy- $C_1$-$C_4$-alkyl, silicon-containing moieties, thioester, or a combination thereof.

In some embodiments, compounds of formula (1) are water-soluble or water-miscible. In alternative embodiments, compounds of formula (1) are water-insoluble or water-immiscible, or only partially water-soluble or water-miscible.

In certain embodiments, each of $R^1$, $R^2$ and $R^3$ may be substituted by a tertiary amine, which is optionally sufficiently basic to become protonated when it is in the presence of water and $CO_2$ (which form carbonic acid).

The present application further provides an ionic solution comprising water and a salt additive of formula (2) where $R^1$, $R^2$, and $R^3$ are as defined for the compound of formula (1) and E is O, S or a mixture of O and S,

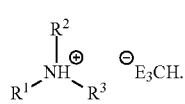

(2)

In some embodiments, a compound of formula (2) is prepared by a method comprising contacting a compound of formula (1) with $CO_2$, $CS_2$ or COS in the presence of water, thereby converting the compound to the salt of formula (2). In some embodiments, a compound of formula (2) is water soluble.

Any of $R^1$, $R^2$, and $R^3$ of the salt of formula (2) may be optionally substituted as discussed for the compound of formula (1). However, should the optional substituent comprise a nitrogen of sufficient basicity to be protonated by carbonic acid, it can be present in its protonated form as it may be protonated by the ionizing trigger. For instance, if the optional substituent is an amino group, such as a tertiary amino group, this may exist as a quaternary ammonium moiety in the salt of formula (2).

The present application further provides a switchable water comprising water and a salt of formula (3). In a preferred embodiment, in the presence of water and $CO_2$, an amine compound of formula (1), converts to an ammonium bicarbonate, depicted as a salt of formula (3) as shown below

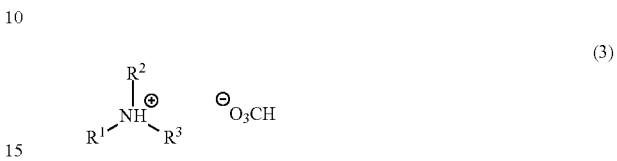

(3)

where $R^1$, $R^2$, and $R^3$ are as defined above. In some embodiments, a compound of formula (3) is water soluble. There may be some carbonate anions present, in addition to bicarbonate anions. Should an optional substituent comprise a basic nitrogen, it may be present in protonated form if it can be protonated by carbonic acid. For instance, if the optional substituent is an amino group, such as a tertiary amino group, this may exist as a quaternary ammonium moiety in the salt of formula (3).

A water-soluble additive of formula (1) can provide a switchable water that is a single-phase mixture and can function as a solvent for water-soluble substances. Although in theory an aqueous solution of the water-soluble compound of formula (1), in the absence of other components, will have an ionic strength of zero since no charged species are present; in practice, the ionic strength might be small but higher than zero due to some impurities such as dissolved air or small amounts of salts. Because of the zero or small ionic strength, a switchable water comprising a water-miscible compound of formula (1) is particularly useful as a solvent for substances which are miscible or soluble in low ionic strength aqueous solutions.

In some embodiments, both the non-ionic additive of formula (1) and the salt additive formula (2) are water-soluble and can each, therefore, form a single phase aqueous solution when dissolved in water. This means that the non-ionic compound of formula (1) and the salt of formula (2) can remain in aqueous solution as a single phase with water after switching. Switching a non-ionic switchable water comprising the compound of formula (1) to an ionic switchable water comprising the salt of formula (2) increases the ionic strength of the switchable water. Increasing the ionic strength of the switchable water can be used to expel a dissolved substance which is insoluble in such an increased ionic strength solution without the need for distillation or other energy intensive separation techniques.

Alternatively water-insoluble, or poorly soluble, additive of formula (1) can provide a switchable water that is a two-phase mixture. Although in theory the water in the two-phase mixture, in the absence of other components, will have an ionic strength of zero since no charged species are present; in practice, the ionic strength might be small but higher than zero due to some impurities such as dissolved air or small amounts of salts. Because of the zero or small ionic strength, a switchable water mixture comprising a water-immiscible, or poorly miscible additive of formula (1) is particularly useful as a solvent for substances which are miscible or soluble in low ionic strength aqueous solutions.

In some embodiments, the non-ionic additive of formula (1) is water-insoluble, or poorly soluble, and the salt additive formula (2) is water-soluble such that a single phase is formed only when the additive is switched to its ionic form. Switching a non-ionic switchable water comprising the compound of formula (1) to an ionic switchable water comprising the salt of formula (2) increases the ionic strength of the switchable water. In this embodiment, the fact that the non-ionic form of the additive is water-insoluble or immiscible, can be useful in situations where it is beneficial to remove the additive from the aqueous phase following switching to the non-Ionic form.

In accordance with either embodiment, the salt of formula (2) can be switched back into a non-ionic additive of formula (1) by removal of the ionizing trigger, such as $CO_2$, or by addition of a non-ionizing trigger. This is advantageous because it allows the re-use of the switchable water.

In certain embodiments, at least one of $R^1$, $R^2$ and $R^3$ can be replaced by one or more further tertiary amine groups. For instance, $R^1$ may be substituted with a tertiary amine, which may itself be further substituted with a tertiary amine. Thus, the present invention includes the use of an aqueous solution comprising water and a compound of formula (4).

(4)

where $R^2$, and $R^3$, are independently as defined for the compound of formula (1):

$R^5$ and $R^6$ are independently selected from the definitions of $R^1$, $R^2$ and $R^3$ of formula (1);

$R^4$ is a divalent bridging group selected from a substituted or unsubstituted $C_1$ to $C_8$ alkylene group that is linear, branched or cyclic; a substituted or unsubstituted $C_2$ to $C_8$ alkenylene group that is linear, branched or cyclic; a substituted or unsubstituted —$C_nSi_m$— group where n and m are independently a number from 0 to 8 and n+m is a number from 1 to 8; a substituted or unsubstituted $C_5$ to $C_8$ arylene group optionally containing 1 to 8 {—Si($R^{10}$)$_2$—O—} units; a substituted or unsubstituted heteroarylene group having 4 to 8 atoms in the aromatic ring optionally containing 1 to 8 {—Si($R^{10}$)$_2$—O—} units; a —(Si($R^{10}$)$_2$—O)$_p$— chain in which "p" is from 1 to 8; a substituted or unsubstituted $C_1$ to $C_8$ alkylene-$C_5$ to $C_8$ arylene group optionally containing 1 to 8 {—Si($R^{10}$)$_2$—O—} units; a substituted or unsubstituted $C_2$ to $C_8$ alkenylene-$C_5$ to $C_8$ arylene group optionally containing 1 to 8{—Si($R^{10}$)$_2$—O—} units; a substituted or unsubstituted $C_1$ to $C_8$ alkylene-heteroarylene group having 4 to 8 atoms in the aromatic ring optionally containing 1 to 8{—Si($R^{10}$)$_2$—O—} units; a substituted or unsubstituted $C_2$ to $C_8$ alkenylene-heteroarylene group having 4 to 8 atoms in the aromatic ring optionally containing 1 to 8 {—Si($R^{10}$)$_2$—O-} units; $R^{10}$ is a substituted or unsubstituted $C_1$ to $C_8$ alkyl, $C_5$ to $C_8$ aryl, heteroaryl having from 4 to 8 carbon atoms in the aromatic ring or $C_1$ to $C_8$ alkoxy moiety; and "a" is an integer. In some embodiments, compounds of formula (4) are water-soluble. Additives with large values of "a" are likely to be more effective in increasing the ionic strength when they are in their ionic forms but may suffer from poor solubility in water when they are in their non-ionic forms. For the avoidance of doubt, it is pointed out that when "a">0, in a repeat unit —N($R^5$)—$R^4$—, $R^4$ and $R^5$ may have a different definition from another such repeat unit.

In some embodiments, the additive is an oligomer or a polymer that contains one or more than one nitrogen atom(s) that is sufficiently basic to be protonated by carbonic acid in the repeating unit of the oligomer or polymer. In accordance with one embodiment, the nitrogen atoms are within the backbone of the polymer. The additive of formula (4) is a specific example of such a polymer in which the nitrogen atom(s) are within the backbone of the polymer. In alternative embodiments, the additive is an oligomer or polymer that contains one or more than one nitrogen atom(s) that is sufficiently basic to be protonated by carbonic acid in a pendant group that is part of the repeating unit, but that is not situated along the backbone of the oligomer or polymer. In some embodiments, some oral of the nitrogen atom(s) that are sufficiently basic to be protonated by carbonic acid are amidine groups. Such amidine groups may be part of the backbone of the oligomer or polymer or may be in pendant group s that are part of the repeating unit.

Example polymer additives having formulae (5a-f) are shown below. In these formulae, "n" refers to the number of repeat units containing at least one basic group and "m" refers to the number of repeat units containing no basic group. Additives with large values of "n" are likely to be more effective in increasing the ionic strength when they are in their ionic forms but may have poor solubility in water when they are in their non-ionic forms. It is not necessary that the backbone of the polymer be entirely made of carbon and hydrogen atoms; In some embodiments, the backbone may comprise other elements. For example, the polymer may have a polysiloxane backbone with amine-containing side groups, a polyether backbone with amine-containing side groups, or the backbone can itself comprise amine groups. In some embodiments, it is preferably to have a backbone or side groups that is reasonably hydrophilic or polar. Without wishing to be bound by theory, it is contemplated that a hydrophilic or polar backbone or side groups can help the charged form of the additive from precipitating.

(5a)

(5b)

(5c)

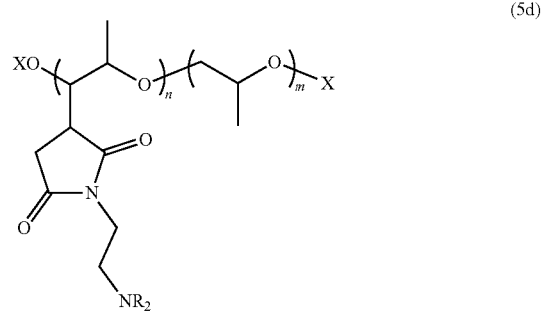

(5d)

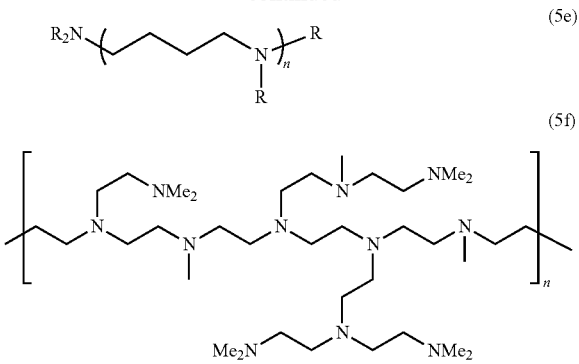

R[1] can be substituted with a tertiary amine, which may itself be further substituted with a tertiary amine, as shown in the compound of formula (4). Such tertiary amine sites may be protonated when contacted with $CO_2$, $CS_2$ or COS in the presence of water. Thus, in certain embodiments the present invention provides an ionic solution comprising water and a salt of formula (4).

It will be apparent that when the polymer additive is in its ionized form, in order to balance the positive charges on the quaternary ammonium sites in the cation, a number of anions equivalent to the number of protonated basic sites should be present. For example, in the ionized form of the polymer additive of formula (4), there will be (a+1) $^-E_3CH$ anionic counterions for each cation having (a+1) quaternary ammonium sites in the salt of formula (4). Alternatively, some of the $^-E_3CH$ ions are replaced by anions of formula $CE_3^{2-}$.

Each of R[1], R[2], and R[3] in the compound of formula (1) can be substituted with a tertiary amine which may itself be further substituted with a tertiary amine. Such tertiary amine sites may be protonated when contacted with $CO_2$, $CS_2$ or COS in the presence of water. However, not all amine compounds having more than one amine site (i.e. polyamines) may be capable of protonation by the trigger at every amine site. Thus, amine compounds of formula (4) may not be protonated at every tertiary amine site when contacted with $CO_2$, COS or $CS_2$. Consequently, it should not be assumed that all basic sites must be protonated in order to effectively raise the ionic strength of the switchable water.

Furthermore, the $pK_{aH}$ (i.e. the $pK_a$ of the conjugate acid (i.e., ionic form)) of the amine compound of formula (1) should not be so high as to render the protonation irreversible. In particular, the ionic form of the additive should be capable of deprotonation through the action of the non-ionizing trigger (which is described below to be, for example, heating, bubbling with a flushing gas, or heating and bubbling with a flushing gas). For example, in some embodiments, the $pK_{aH}$ is in a range of about 6 to about 14. In other embodiments, the $pK_{aH}$ is in a range of about 7 to about 13. In certain embodiments the $pK_{aH}$ is in a range of about 7.8 to about 10.5. In some embodiments, the $pK_{aH}$ is in a range of about 8 to about 10.

Additives useful in a switchable water can have higher aliphatic ($C_5$-$C_8$) and/or siloxyl groups. Monocyclic, or bicyclic ring structures, can also be used. A higher number of aliphatic groups can cause a compound to be waxy and water-immiscible at room temperature. As described above, this may be advantageous if it means that the non-Ionic form of the additive is water-immiscible, but the ionic form is water miscible.

In certain embodiments, the additive is liquid at room temperature.

It is preferred that the aliphatic and/or siloxyl chain length is 1 to 6, more preferably 1 to 4. A siloxyl group contains $\{-Si(R^{10})_2-O-\}$ units; where $R^{10}$ is a substituted or unsubstituted $C_1$ to $C_8$ alkyl, $C_5$ to $C_8$ aryl, heteroaryl having from 4 to 8 carbon atoms in the aromatic ring or $C_1$ to $C_8$ alkoxy moiety. Conveniently, in some discussions herein, the term "aliphatic/siloxyl" is used as shorthand to encompass aliphatic, siloxyl, and a chain which is a combination of aliphatic and siloxyl units.

Optionally the additive comprises a group that includes an ether or ester moiety. In preferred embodiments, an aliphatic group is alkyl. Aliphatic groups may be substituted with one or more moieties such as, for example, alkyl, alkenyl, alkynyl, aryl, aryl halide, hydroxyl, heteroaryl, non-aromatic rings. $Si(alkyl)_3$, $Si(alkoxy)_3$, halo, alkoxy, amino, ester, amide, amidine, guanidine, thioether, alkylcarbonate, phosphine, thioester, or a combination thereof. Reactive substituents such as alkyl halide, carboxylic acid, anhydride and acyl chloride are not preferred.

Strongly basic groups such as amidines and guanidines may not be preferred if their protonation by carbonic acid is difficult to reverse.

In other embodiments of the invention, substituents are lower aliphatic/siloxl groups, and are preferably small and non-reactive. Examples of such groups include lower alkyl ($C_1$ to $C_4$) groups. Preferred examples of the lower aliphatic groups are $CH_3$, $CH_2CH_3$, $CH(CH_3)_2$, $C(CH_3)_3$, $Si(CH_3)_3$, $CH_2CH_2OH$, $CH_2CH(OH)CH_3$, and phenyl. Monocyclic, or bicyclic ring structures, may also be used.

It will be apparent that in some embodiments substituents R may be selected from a combination of lower and higher aliphatic groups. Furthermore, in certain embodiments, the total number of carbon and silicon atoms in all of the substituents R[1], R[2], R[3] and R[4] (including optional substituents) of a water-soluble compound of formula (1) may be in the range of 3 to 20, more preferably 3 to 15.

Referring to FIG. 1, a chemical scheme and schematic drawing are shown for a switchable ionic strength solvent system of a water-miscible amine additive of formula (1) and water. The chemical reaction equation shows an additive (non-ionic form) which is an amine compound of formula (1) and water on the left hand side and an ionic form of the additive as an ammonium bicarbonate salt of formula (3) on the right hand side. This reaction can be reversed, as indicated. The schematic shows the same reaction occurring in the presence of tetrahydrofuran (THF) wherein a single-phase aqueous solution of an amine additive (e.g., a compound of formula (1)) that is water-miscible, water and THF is shown on the left side under a blanket of $N_2$. A two phase (layered) mixture is shown on the right side under a blanket of $CO_2$. The two phases being an aqueous solution of the salt of formula (3) comprising ammonium bicarbonate and water, and THF.

Referring to FIG. 2, structures of a number of compounds of formula (1) are provided. DMEA is N, N-(dimethylamino)ethanol, which in formula (1) has R[1] is methyl; R[2] is methyl; and R[3] is $C_2H_4OH$). MDEA is N-methyl diethanolamine, which in formula (1) has R[1] is methyl; R[2] is $C_2H_4OH$; and R[3] is $C_2H_4OH$). Both compounds, DMEA and MDEA, are monoamines having a single tertiary amine group. TMDAB is N, N, N', N'-tetramethyl-1, 4-diaminobutane, which in formula (1) has R[1] is methyl; R[2] is methyl; R[3] is $C_4H_8N(CH_3)_2$). THEED is N, N, N', N'-tetrakis(2-hydroxyethyl) ethylenediamine, which in formula (1) has R[1] is $C_2H_4OH$; R[2] is $C_2H_4OH$; and R[3] is $C_2H_4N(C_2H_4OH)_2$).

Compounds TMDAB and THEED are diamines having two tertiary amine groups. Compound DMAPAP is a triamine, having three tertiary amine groups, 1-[bis[3-(dimethyl-amino)]propyl]amino]-2-propanol, which in formula (1) has $R^1$ is methyl; $R^2$ is methyl; and $R^3$ is $C_3H_6N(CH_2CH(OH)CH_3)C_3H_6N(CH_3)_2)$. Compound HMTETA is a tetramine, having four tertiary amine groups, 1,1,4,7,10,10-hexamethyl triethylenetetramine, which in formula (1) has $R^1$ is methyl; $R^2$ is methyl; and $R^3$ is $C_2HN(CH_3)C_2HN(CH_3)C_2H_4N(CH_3)_2)$. These compounds are discussed further in the working examples.

Figure 3:
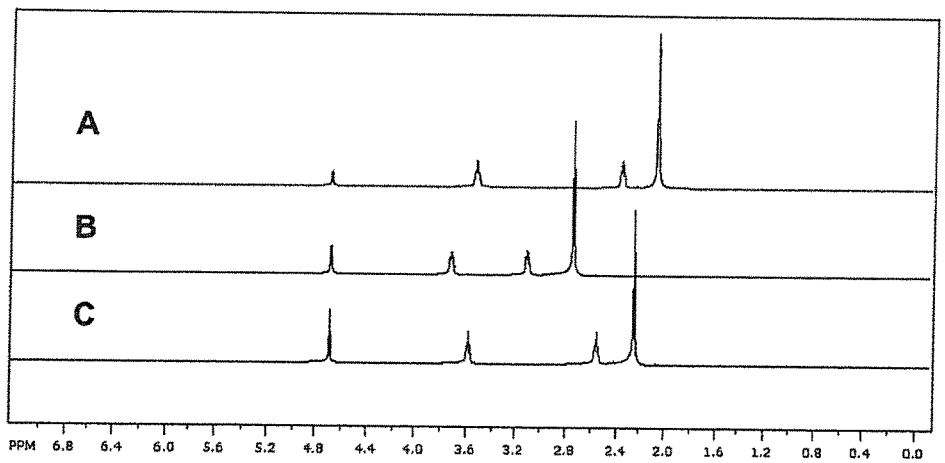
FIG. 3 shows multiple $^1$H NMR spectra from switchability study of MDEA carried out in $D_2O$ at 400 MHz. Spectrum A was captured with no $CO_2$ treatment, spectrum B was captured after 20 minutes of $CO_2$ bubbling, and spectrum C was captured after 300 minutes of $N_2$ bubbling. This is discussed in Example 4 below.

Referring to FIG. 3, multiple $^1H$ NMR spectra are shown from a MDEA switchability study carried out in $D_2O$ at 400 MHz. This is discussed in Example 4 below.

Figure 4:
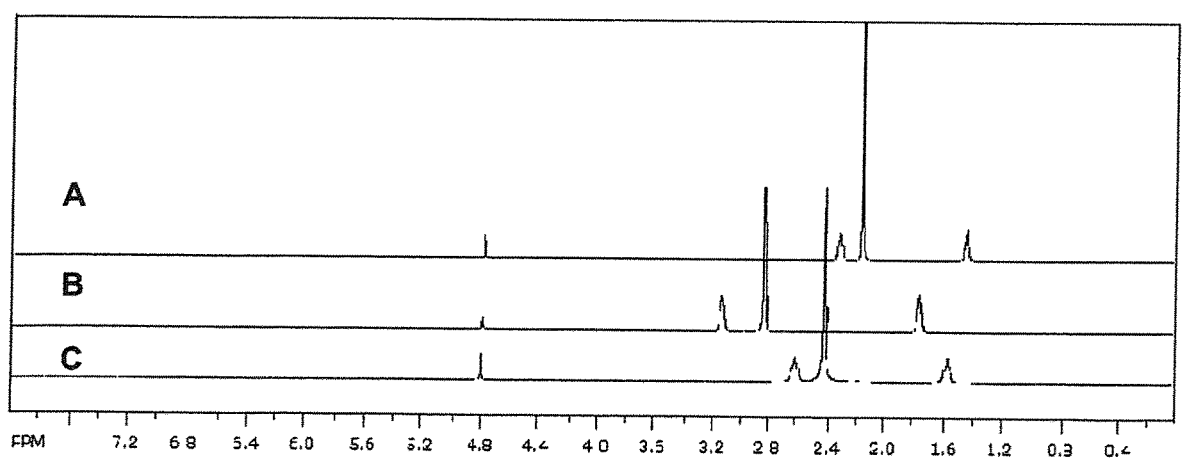
FIG. 4 shows multiple $^1$H NMR spectra from a switchablity study of DMAE carried out in $D_2O$ at 400 MHz. Spectrum A was captured with no $CO_2$ treatment, spectrum B was captured after 30 minutes of $CO_2$ bubbling, and spectrum C was captured after 240 minutes of $N_2$ bubbling. This is discussed in Example 4 below.

Referring to FIG. 4, multiple $^1H$ NMR spectra are shown from a DMAE switchability study carried out in $D_2O$ at 400 MHz. This is discussed in Example 4 below.

Figure 5:
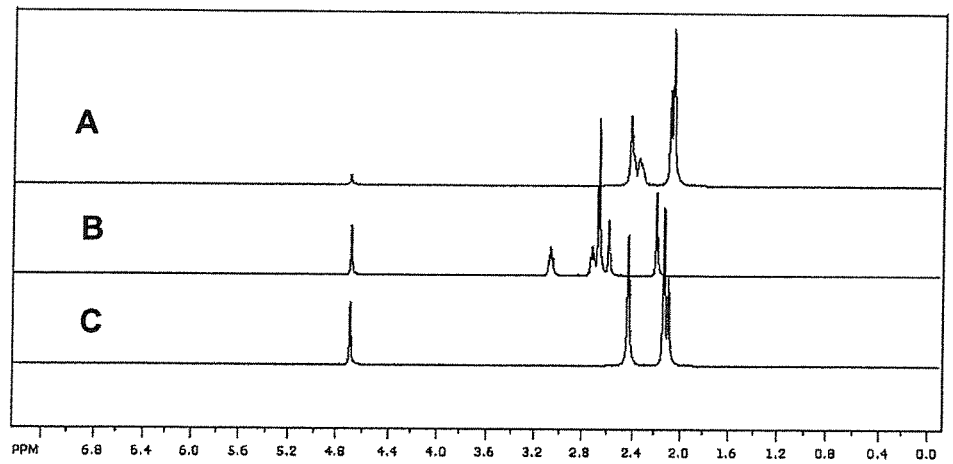
FIG. 5 shows multiple $^1$H NMR spectra from a switchability study of HMTETA carried out in $D_2O$ at 400 MHz. Spectrum A was captured with no $CO_2$ treatment, spectrum B was captured after 20 minutes of $CO_2$ bubbling, and spectrum C was captured after 240 minutes of $N_2$ bubbling. This is discussed in Example 4 below.

Referring to FIG. 5, multiple $^1H$ NMR spectra are shown from a HMTETA switchability study carried out in $D_2O$ at 400 MHz. This is discussed in Example 4 below.

Figure 6:
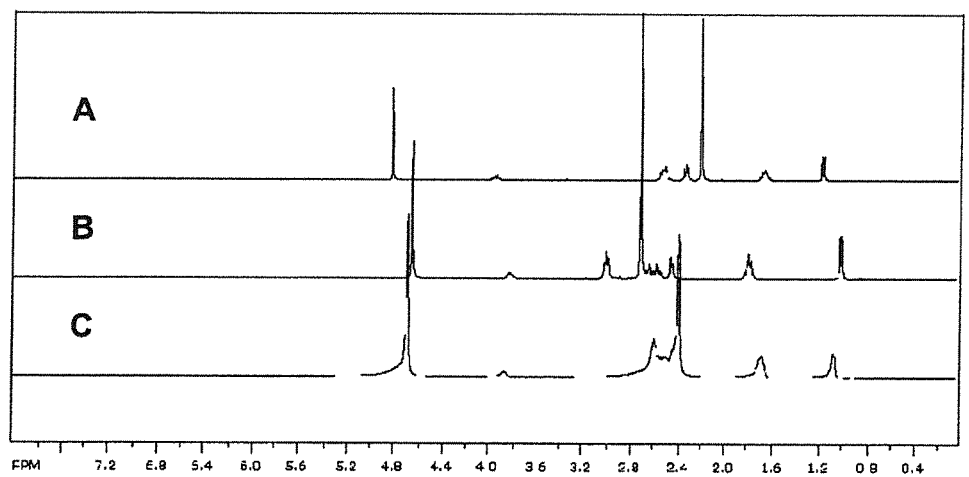
FIG. 6 shows multiple $^1$H NMR spectra from a switchability study of DMAPAP carried out in $D_2O$ at 400 MHz. Spectrum A was captured with no $CO_2$ treatment, spectrum B was captured after 20 minutes of $CO_2$ bubbling, and spectrum C was captured after 120 minutes of $N_2$ bubbling. This is discussed in Example 4 below.

Referring to FIG. 6, multiple $^1H$ NMR spectra are shown from a DMAPAP switchability study carried out in $D_2O$ at 400 MHz. This is discussed in Example 4 below.

Figure 7:
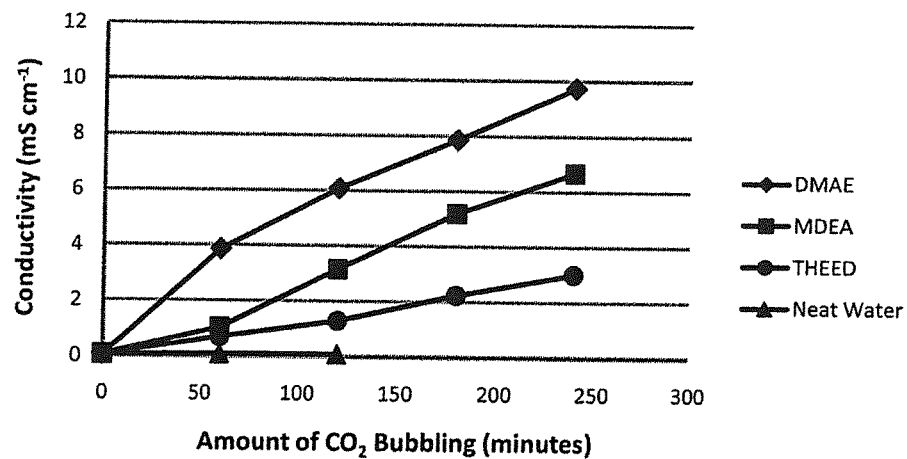
FIG. 7 shows conductivity spectra for the responses of water and 1:1 v/v $H_2O$: DMAE; 1:1 v/v $H_2O$: MDEA; and 1:1 w/w $H_2O$: THEED solutions to a $CO_2$ trigger over time. This is discussed in Example 5 below.

Referring to FIG. 7, conductivity spectra are shown for the responses to a $CO_2$ trigger over time the following solutions: 1:1 v/v $H_2O$:DMAE; 1:1 v/v $H_2O$:MDEA; and 1:1 w/w $H_2O$:THEED. Experimental details are discussed in Example 5 below.

Figure 8:
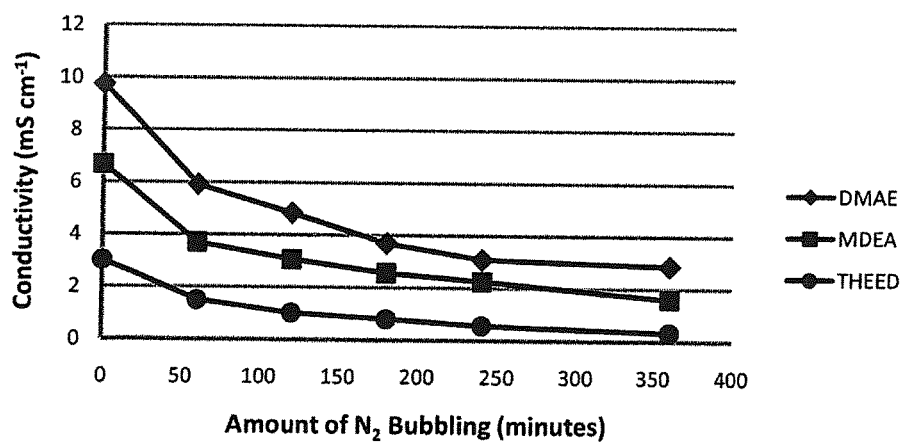
FIG. 8 shows conductivity spectra for the responses of 1:1 v/v $H_2O$: DMAE; 1:1 v/v $H_2O$: MDEA; and 1:1 w/w $H_2O$: THEED solutions, which had been switched with a $CO_2$ trigger, to the removal of $CO_2$ by nitrogen bubbling over time. This is discussed in Example 5 below.

Referring to FIG. 8, conductivity spectra are shown for the responses of 1:1 v/v $H_2O$:DMAE; 1:1 v/v $H_2O$:MDEA; and 1:1 w/w $H_2O$:THEED solutions, which had been switched with a $CO_2$ trigger, to the removal of $CO_2$ by nitrogen bubbling over time. Experimental details are discussed in Example 5 below.

Figure 9:
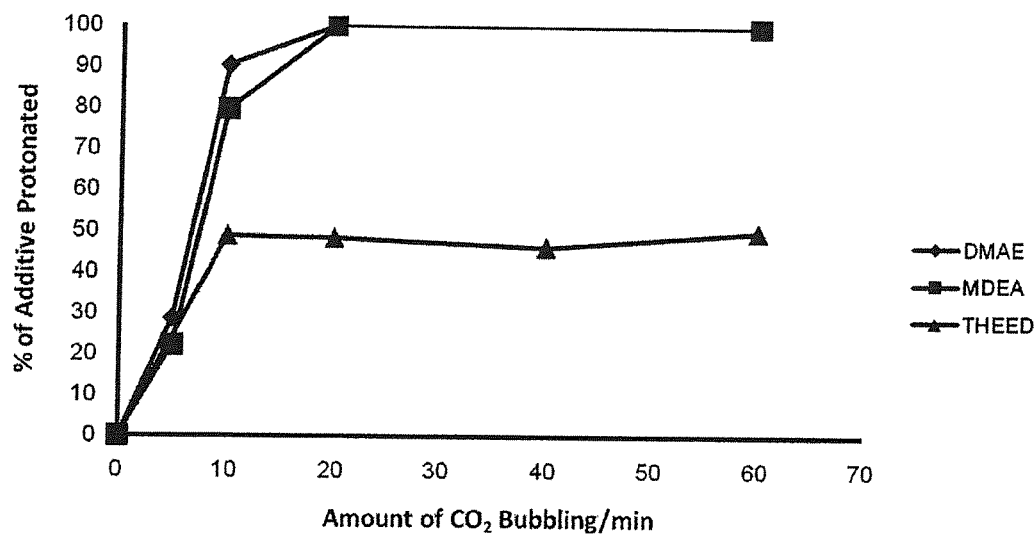
FIG. 9 shows a plot of the degree of protonation of 0.5 M solutions of DMAE and MDEA in $D_2O$ and a 0.1 M aqueous solution of THEED in $D_2O$ resulting from exposure to a $CO_2$ trigger over time. This is discussed in Example 6 below.

Referring to FIG. 9, a plot of the degree of protonation of 0.5 M solutions of DMAE and MDEA in $D_2O$ and a 0.1 M aqueous solution of THEED in $D_2O$ resulting from exposure to a $CO_2$ trigger over time is shown. This is discussed in Example 6 below.

Figure 10:
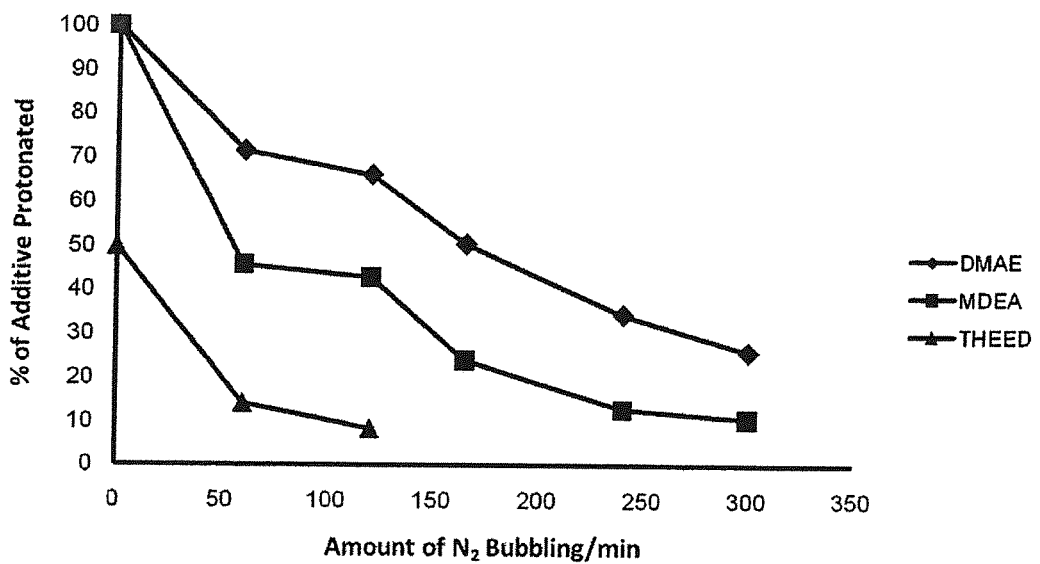
FIG. 10 shows a plot of the degree of deprotonation of 0.5 M solutions of DMAE and MDEA in $D_2O$ and a 0.1 M solution of THEED in $D_2O$ which have been switched with a $CO_2$ trigger to the removal of the trigger by nitrogen bubbling over time. This is discussed in Example 6 below.

Referring to FIG. 10, a plot of the degree of deprotonation of 0.5 M solutions of DMAE and MDEA in $D_2O$ and a 0.1 M solution of THEED in $D_2O$, which have been switched with a $CO_2$ trigger, to the removal of the trigger by nitrogen bubbling over time is shown. This is discussed in Example 6 below.

Figure 11:
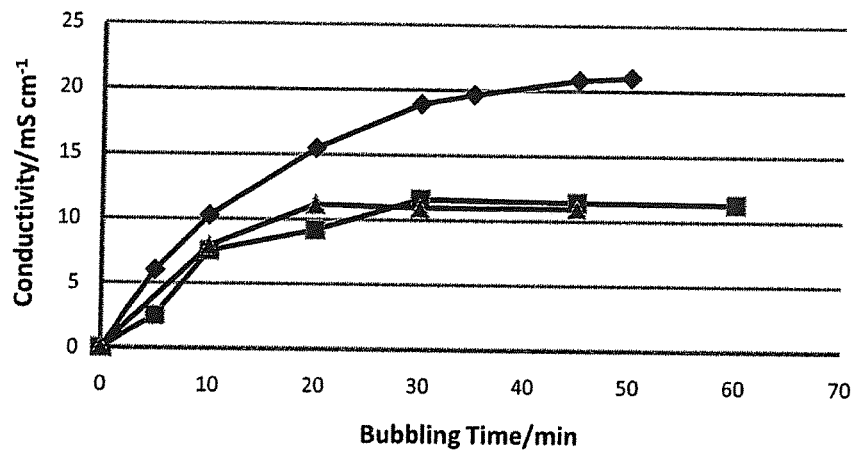
FIG. 11 shows conductivity spectra for the responses of 1:1 v/v $H_2O$: amine solutions to a $CO_2$ trigger over time. In which the amine is TMDAB (♦), HMTETA (■), and DMAPAP (▲). This is discussed in Example 7 below.

Referring to FIG. 11, conductivity spectra for the responses of 1:1 v/v $H_2O$: amine solutions to a $CO_2$ trigger over time, in which the amine is TMDAB (♦), HMTETA (■), and DMAPAP (▲), is shown. This is discussed in Example 7 below.

Figure 12:
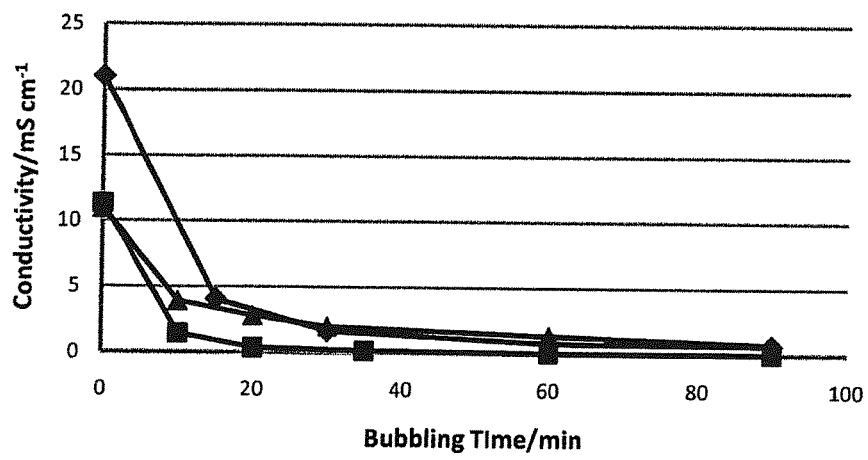
FIG. 12 shows conductivity spectra for the responses of 1:1 v/v $H_2O$: amine solutions, which have been switched with a $CO_2$ trigger, to the removal of the trigger by nitrogen bubbling over time, in which the amine is TMDAB (♦), HMTETA (■), and DMAPAP (▲). This is discussed in Example 7 below.

Referring to FIG. 12, conductivity spectra for the responses of 1:1 v/v $H_2O$: amine solutions, which have been switched with a $CO_2$ trigger, to the removal of the trigger by nitrogen bubbling over time, in which the anine is TMDAB (♦), HMTETA (■), and DMAPAP (▲), are shown. This is discussed in Example 7 below.

Figure 13:
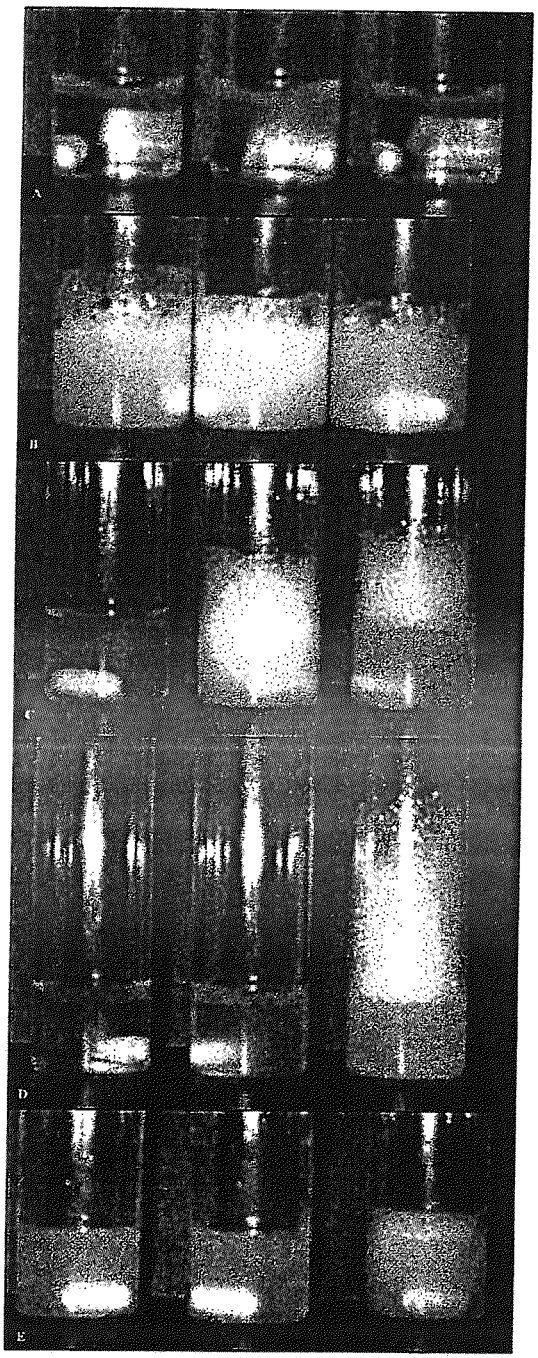
FIG. 13 shows five photographs A-E representing different stages of an experiment exhibiting how the switchable ionic strength character of amine additive TMDAB can be used to disrupt an emulsion of water and n-decanol. This is discussed in Example 8 below.

Referring to FIG. 13, five photographs A-E representing different stages of an experiment exhibiting how the switchable ionic strength character of amine additive TMDAB can be used to disrupt an emulsion of water and n-decanol are shown. This is discussed in Example 8 below.

In accordance with an alternative aspect, the switchable additive is an amidine having formula (6):

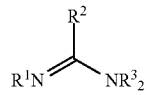

(6)

where $R^1$, $R^2$, and $R^3$ are each, independently, as defined above. The ionized form of the additive of formula (6) is:

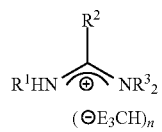

where n is a number from 1 to 6 sufficient to balance the overall charge of the amidinium cation, and E is O, S or a mixture of O and S.

Ionizing and Non-Ionizing Triggers

As used herein, a trigger is a change that leads to a chemical reaction or a series of chemical reactions. A trigger can either be an ionizing trigger, which acts to effect conversion of the additive to is ionic form (e.g., protonated), or a non-ionizing trigger, which acts to effect conversion of the additive to its non-Ionic form (e.g., deprotonated).

As the sidled person will know, there are several ways to protonate a compound in the presence of water. Likewise, there are several ways to deprotonate a compound in the presence of water. In accordance with some embodiments, a non-reversible switch between a non-Ionic (e.g., deprotonated amine) state and an ionic (protonated) state is sufficient. In accordance with other embodiments, a non-reversible switch between an ionic (e.g., protonated amine) state and a non-ionic (deprotonated) state is sufficient. In preferred embodiments the switching between ionic and non-Ionic states is reversible. Accordingly the following discussion will describe several triggers.

An example of a non-Ionizing trigger for converting the ionic state (e.g., protonated amine) to the non-ionic state (e.g., deprotonated amine) in an aqueous solution that has little or no dissolved $CO_2$ is addition of a base to the aqueous solution. An example of an ionizing trigger for converting the non-ionic state (e.g., deprotonated amine) to the ionic state (e.g., protonated amine) in an aqueous solution, is addition of an acid to the aqueous solution.

The compound of formula (1) can advantageously be converted, in the presence of water, from a water-soluble non-Ionic amine form to an ionic form that is also water-soluble. The conversion occurs when the aqueous non-Ionic solution is contacted with an ionizing trigger that is a gas that liberates hydrogen ions in the presence of water. Hydrogen ions protonate the amine nitrogen of the non-ionic compound to form a cation and, in the case of a $CO_2$ trigger, bicarbonate anion acts as a counterion and a salt form is formed. This aqueous salt solution is a single-phase ionic aqueous solution. More particularly, the ionic form is an ammonium salt.

One skilled in the art win recognize that a small amount of carbonate anions will also form and may act as counterions to the protonated ammonium cations.

In the example in which the additive is Immiscible or Insoluble, or poorly miscible or poorly soluble, in water, it can be converted, in the presence of water, to an ionic form that is also water-soluble. For example the conversion can occurs when the mixture of non-ionic additive and water is contacted with a trigger gas that liberates hydrogen ions in the presence of water. Hydrogen ions protonate the amine nitrogen of the non-Ionic compound to form a cation and, in the case of a $CO_2$ trigger, bicarbonate anion acts as a counterion and a salt form is formed. This aqueous salt solution is a single-phase ionic aqueous solution. More particularly, the ionic form is an ammonium salt. One skilled in the art will recognize that a small amount of carbonate anions will also form and may act as counterions to the protonated ammonium cations.

As used herein. "gases that liberate hydrogen ions" fall into two groups. Group (i) Includes gases that liberate hydrogen ions in the presence of a base, for example, HCN and HCl (water may be present, but is not required). Group (ii) Includes gases that when dissolved in water react with water to liberate hydrogen ions, for example, $CO_2$, $NO_2$, $SO_2$, $SO_3$, $CS_2$ and COS. For example, $CO_2$ in water will produce $HCO_3^-$ (bicarbonate ion) and $CO_3^{2-}$ (carbonate ion) and hydrogen counterions, with bicarbonate being the predominant species at pH 7. One skilled in the art will recognize that the gases of group (ii) will liberate a smaller amount of hydrogen ions in water in the absence of a base, and will liberate a larger amount of hydrogen ions in water in the presence of a base.

Preferred gases that liberate hydrogen ions are those wherein the salt form switches to its non-ionic (amine) form when the same gas is expelled from the environment. $CO_2$ is particularly preferred. Hydrogen ions produced from dissolving $CO_2$ in water protonate the amine. In such solution, the counterion for the ammonium ion is predominantly bicarbonate. However, some carbonate ions may also be present in solution and the possibility that, for example, two ammonium molecules, each with a single positive charge, associate with a carbonate counterion is not excluded. When $CO_2$ is expelled from the solution, the ammonium cation is deprotonated and thus is converted to its non-ionic (amine) form.

Of group (ii) gases that liberate hydrogen ions, $CS_2$ and COS behave similarly to $CO_2$ such that their reaction with amine and water is fairy easily reversed. However, they are not typically preferred because their use in conjunction with water and an amine could cause the formation of highly toxic $H_2S$. In some embodiments of the invention, alternative gases that liberate hydrogen ions are used instead of $CO_2$, or In combination with $CO_2$, or in combination with each other. Alternative gases that liberate hydrogen ions (e.g., HCl, $SO_2$, HCN) are typically less preferred because of the added costs of supplying them and recapturing them, if recapturing is appropriate. However, in some applications one or more such alternative gases may be readily available and therefore add little to no extra cost. Many such gases, or the acids generated from their interaction with water, are likely to be so acidic that the reverse reaction, i.e., converting the ammonium salt to the amine form, may not proceed to completion as easily as the corresponding reaction with $CO_2$. Group (i) gases HCN and HCl are less preferred triggers because of their toxicity and because reversibility would likely require a strong base.

Contacting a water-soluble compound of formula (1) with a $CO_2$, $CS_2$ or COS trigger in the presence of water may preferably comprise: preparing a switchable water comprising water and a water-soluble additive of formula (1); and contacting the switchable water with a $CO_2$, $CS_2$ or COS trigger. Alternatively, the contacting a water-soluble compound of formula (1) with $CO_2$, $CS_2$ or COS in the presence of water may comprise: first preparing an aqueous solution of $CO_2$, $CS_2$ or COS in water, and subsequently mixing the aqueous solution with a water-soluble additive of formula (1) to form a switchable water. Alternatively, the contacting a water-soluble additive of formula (1) with $CO_2$, $CS_2$ or COS in the presence of water may comprise: dissolving $CO_2$, $CS_2$ or COS in a water-soluble additive of formula (1) that is in a liquid state to provide a liquid; and mixing the non-aqueous liquid with water to form a switchable water.

Contacting a water-insoluble compound of formula (1) with a $CO_2$, $CS_2$ or COS trigger in the presence of water may preferably comprise: preparing a switchable water comprising water and a water-insoluble additive of formula (1); and contacting the switchable water with a $CO_2$, $CS_2$ or COS trigger. Alternatively, the contacting a water-insoluble compound of formula (1) with $CO_2$, $CS_2$ or COS in the presence of water may comprise: first preparing an aqueous solution of $CO_2$, $CS_2$ or COS in water, and subsequently mixing the aqueous solution with a water-insoluble additive of formula (1) to form a switchable water. Alternatively, the contacting a water-insoluble additive of formula (1) with $CO_2$, $CS_2$ or COS in the presence of water may comprise: dissolving $CO_2$, $CS_2$ or COS in a water-insoluble additive of formula (1) that is in a liquid state to provide a liquid; and mixing the non-aqueous liquid with water to form a switchable water.

Depletion of $CO_2$, $CS_2$ or COS from a switchable water is obtained by using of non-ionizing trigger such as: heating the switchable water; exposing the switchable water to air; exposing the switchable water to vacuum or partial vacuum; agitating the switchable water; exposing the switchable water to a gas or gases that has insufficient $CO_2$, $CS_2$ or COS content to convert the non-Ionic state to the ionic state; flushing the switchable water with a gas or gases that has insufficient $CO_2$, $CS_2$ or COS content to convert the non-ionic state to the ionic state; or any combination thereof. A gas that liberated hydrogen ions may be expelled from a solution by simple heating or by passively contacting with a nonreactive gas ("flushing gas") or with vacuum, in the presence or absence of heating. Alternatively and conveniently, a flushing gas may be employed by bubbling it through the solution to actively expel a gas that liberates hydrogen ions from a solution. This shifts the equilibrium from ionic form to non-Ionic amine. In certain situations, especially if speed is desired, both a flushing gas and heat can be employed in combination as a non-ionizing trigger.

Preferred flushing gases are $N_2$, air, air that has had its $CO_2$ component substantially removed, and argon. Less preferred flushing gases are those gases that are costly to supply and/or to recapture, where appropriate. However, in some applications one or more flushing gases may be readily available and therefore add little to no extra cost. In certain cases, flushing gases are less preferred because of their toxicity, e.g., carbon monoxide. Air is a particularly preferred choice as a flushing gas, where the $CO_2$ level of the air (today commonly 380 ppm) is sufficiently low that an ionic form (ammonium salt) is not maintained in its salt form. Untreated air is preferred because it is both inexpensive and environmentally sound. In some situations, however, it may be desirable to employ air that has had its $CO_2$ component substantially removed as a nonreactive (flushing) gas. By reducing the amount of $CO_2$ in the flushing gas, potentially less salt or amine may be employed. Alternatively, some environments may have air with a high $CO_2$ content, and such flushing gas would not achieve sufficient switching of ionic form to non-Ionic amine form. Thus, it may be desirable to treat such air to remove enough of its $CO_2$ for use as a trigger.

$CO_2$ may be provided from any convenient source, for example, a vessel of compressed $CO_2(g)$ or as a product of a non-interfering chemical reaction. The amines of the invention are able to react with $CO_2$ at 1 bar or less to trigger the switch to their ionic form.

It will be understood by the skilled person that regeneration of a water-miscible compound of formula (1) from an ionic aqueous solution of a salt of formula (2) can be achieved by either active or passive means. The regeneration may be achieved passively if an insufficient concentration of an ionizing trigger, such as $CO_2$, is present in the surrounding environment to keep the additive switched to the ionic form. In this case, an ionizing trigger such as $CO_2$ could be gradually lost from the aqueous solution by natural release. No non-Ionizing trigger, such as heating or active contacting with flushing gases would be required. Heating or contacting with flushing gases would be quicker but may be more expensive.

In studies described herein (see example 7), efficient contact between gas and solution was obtained using a fritted glass apparatus. Heat can be supplied from an external heat source, preheated nonreactive gas, exothermic dissolution of gas in the aqueous ionic solution, or an exothermic process or reaction occurring inside the liquid. In initial studies, the non-Ionizing trigger used to expel $CO_2$ from solution and to switch from ionic form to amine was heat. However, $CO_2$ was expelled, and the salt was converted to the amine by contacting with a flushing gas, specifically, nitrogen. It is also expected that $CO_2$ can be expelled from the ionic solution merely by passively exposing the solution to air.

In some embodiments the amine additive in its non-ionic state is a liquid, in other embodiments the amine additive in its non-ionic state is a solid. Whether liquid or solid, they may be miscible or immiscible with water.

In some embodiments the ionic form of the additive (e.g., ammonium bicarbonate) is a liquid, in other embodiments the ionic form of the additive is a solid. Whether liquid or solid, they may be miscible or immiscible with water.

It is not significant whether neat ammonium bicarbonate salt is a solid or a liquid as long as it is water soluble such that a single phase solution is provided of the ionic aqueous solution. It will be apparent that at least a molar equivalent of water is required to react with the $CO_2$ to provide the carbonic acid to protonate a nitrogen site(s) of the amine group of the compound of formula (1) to form the ammonium cation.

In embodiments where a neat ammonium bicarbonate of formula (3) is a solid and not a liquid, more than a molar equivalent of water relative to the number of nitrogen sites should be present in the aqueous solution to ensure the complete dissolution of the salt in the ionic aqueous solution. In some embodiments, the amount of water is 1 or more weight equivalents relative to the compound of formula (1).

In some embodiments, the mole ratio of water and basic nitrogen sites in the amine capable of protonation is at least about equimolar. It will be apparent to one skilled in the art that when the ionic form is prepared from this mixture, there will remain little or no unreacted reactant(s), and thus little or no water after conversion to the salt form.

In other embodiments, the ratio of non-gaseous reactants is greater than equimolar, i.e., the number of moles of water is greater than the number of moles of basic nitrogen sites in the amine capable of protonation. This provides additional, unreacted water which is not consumed in the switching reaction. This may be necessary to ensure a single phase liquid mixture should the neat resulting salt be a solid, thereby providing a single phase aqueous solution. In some embodiments, a very high ratio of moles of water to moles of non-ionic additive (amine) is preferred so that the cost of the aqueous solvent can be decreased; it is assumed that the amine additive is more expensive than the water. It is preferred that sufficient water is present to dissolve the salt formed after switching so that an ionic aqueous solution is obtained.

If Insufficient water is present to solubilize a sold ammonium bicarbonate formed after switching, unsolublized salt will be present as a precipitate. For instance, should the ratio of (moles of water) to (moles of basic nitrogen sites in the amine capable of protonation) be equimolar, substantially all the water would be consumed in a complete switching reaction. If the salt was a solid rather than an ionic liquid, this solid would form as a precipitate. The formation of the salt as a precipitate may be advantageous in some circumstances because it is easily recoverable, for instance by filtration.

Systems and Methods Employing Switchable Water

As described briefly above, an aspect provided herein is a method and system for switching the ionic strength of water or an aqueous solution. The method comprises the step of mixing water or an aqueous solution with a switchable additive, before, after or simultaneously with the introduction of an ionizing trigger to ionize the switchable additive and consequently raise the ionic strength of the mixture of the water or the aqueous solution and the switchable additive. Optionally, the method additionally comprises the step of introducing a non-ionizing trigger to reverse the ionization of the switchable additive.

Also provided is a switchable water system that comprises: means for providing a switchable additive comprising at least one nitrogen that is sufficiently basic to be protonated by carbonic acid; means for adding the additive to water or to an aqueous solution to form an aqueous mixture with switchable ionic strength; means for exposing the water or aqueous solution to an ionizing trigger, such as $CO_2$, COS, $CS_2$ or a combination thereof, to raise the ionic strength of the aqueous mixture with switchable ionic strength; and, optionally, means for exposing the mixture with raised ionic strength to a non-ionizing trigger, such as (i) heat, (ii) a flushing gas, (iii) a vacuum or partial vacuum, (iv) agitation, (v) or any combination thereof, to reform the aqueous mixture with switchable ionic strength. As will be appreciated, the means for exposing the water or aqueous solution to the ionizing trigger, can be employed before, after or together with the means for adding the additive to the water or the aqueous solution.

Figure 21:
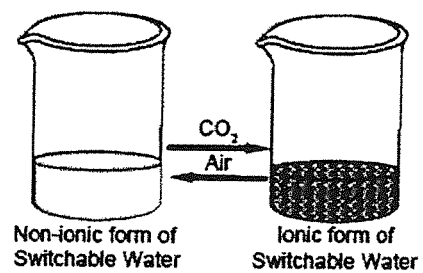
FIG. 21 depicts a system that includes means for reversibly converting a non-Ionized form of switchable water to an ionized form of the switchable water.

FIG. 21 provides an example of a switchable water system as described above. In the system embodiment depicted in FIG. 21, the system includes means for contacting the non-Ionized form of a switchable water with the ionizing trigger, which, in this example is $CO_2$. Following contact with the ionizing trigger, the switchable water is reversibly converted to its ionic form. As also depicted in FIG. 21, the system in this example further comprises a means for introducing a non-ionizing trigger to the ionized form of the switchable water. In this example, the non-ionizing trigger is air.

The following is a non-limiting list of applications of systems and methods employing switchable water:
1. In Osmosis (either by Forward Osmosis (FO) or by Forward Osmosis followed by Reverse Osmosis (FO/RO))
   a. For production of freshwater by desalination of seawater or brackish water.
   b. For partial dewatering of wastewater, process water, or other industrial aqueous solutions (whether waste or in a process). The osmosis concentrates the wastewater/process water/industrial aqueous solution and produces a purified water stream that can be directly recycled or disposed of, or further purified or processed for recycling or disposal.

2. In Forcing immiscibility
   a. For the drying of (i.e., removal of water from) organic liquids by forcing the water-content in the organic liquid to form a second liquid phase.
   b. For the recovery of organic liquids from water by forcing the organic content in the water to form a second liquid phase.
   c. For forcing two immiscible aqueous phases to form (for separating water-soluble polymers such as polyethylene glycol (PEG) from salts or for concentrating solutions of water-soluble polymers such as PEG).

3. In Forcing Insolubility
   a. For recovering a solid compound or compounds (such as an organic product, e.g., an active pharmaceutical ingredient (API) or a contaminant) from water or from an aqueous mixture. The recovered solid compound or compounds can be the target compound or compounds or an undesired compound or compounds (such as contaminants or by-products). This can be useful, for example, after an organic synthesis in water; after the extraction of an organic into water, for recovering proteins from water, for decontaminating contaminated water, for causing a coating, dye or mordant to come out of aqueous solution and attach itself onto a sold.
   b. For adjusting the solubility of salts in water (I.e., the solubility of the salt would be different in the ionic switchable water than in the non-ionic switchable water). Possibly useful in mining or In separations involving salts.
   c. For adjusting the partition coefficient of solutes between an aqueous phase and an organic liquid phase. Certain systems and methods employing switchable water are useful in catalysis, extractions, washing of products, separations of mixtures, etc.

4. In Breaking Dispersions
   a. For breaking emulsions. Can be useful, for example, in the oil industry during or after enhanced oil recovery, during or after pipelining of heavy crudes or bitumen, during or after wastewater treatment, in the treatment of rag layers,
   b. For breaking suspensions. Can be useful, for example, in removal of suspended solids/particles from water (e.g., wastewater or storm water). For example, the present methods and systems can be used in oil sands processing and tailings ponds, in mining, in the treatment of wastewater from mining, in minerals processing and separation, in treatment of wastewater from other industries, in latex preparation, handling and precipitation, in emulsion/microemulsion/miniemulsion/suspension polymerization. In a specific example, the methods and systems can be used in removal of fine clay particles from water.
   c. For breaking foams and froths. Can be useful, for example, in the oil industry for suppressing foams, in mineral separations. In the treatment of aqueous streams after mineral separations.

5. In Causing Other Properties of Aqueous Solutions to Change
   a. For modifying density. The density of the ionic form of a switchable water is expected to be different from the density of the non-ionic version. This density change can be useful in the separation of solid materials like polymers because some would float and some would sink at each density and modifying the density could allow the separation of different polymers at different densities.
   b. For modifying conductivity, for example, in sensors, liquid switches.
   c. For modifying viscosity. The viscosity of the ionic form of a switchable water solution is different from the non-Ionic version.

In specific embodiments, this system and method are used, for example:
   to remove water from a hydrophobic liquid or a solvent;
   to remove or isolate a solute from an aqueous solution;
   to remove or isolate a hydrophobic liquid or solvent from an aqueous mixture;
   to remove salt and/or generate fresh water in a desalination process;
   to destabilize or disrupt micelles and/or to deactivate a surfactant;
   to provide a switchable antifreeze, a switchable electrolyte solution, a switchable conducting solution, or an electrical switch; or
   to provide a $CO_2$, COS, $CS_2$ sensor.

In one embodiment, there is provided a method of extracting a selected substance from a starting material(s) that comprises the selected substance. In some embodiments, the selected substance is soluble in an aqueous solution comprising the non-ionic form of a switchable water (comprising the a non-ionic form of the switchable additive) with zero or low ionic strength, and the selected substance is insoluble in an aqueous solution comprising the ionic form of a switchable water (comprising the ionized form of the additive), which has a higher ionic strength. For instance, the starting material may be a solid impregnated with the selected substance. For another instance, the starting material may be a liquid mixture of the selected substance and a hydrophobic liquid. This method of extracting a selected substance is particularly effective if the selected substance is soluble in the non-ionic aqueous solution. The selected substance, which may be a liquid or a solid, dissolves in the non-ionic aqueous solution comprising an additive of formula (1) and can thereby be readily separable from any water-insoluble remaining starting material (e.g., by filtration) and can be separated from the hydrophobic liquid (e.g., by decantation). Once the non-ionic aqueous solution comprising the selected compound is isolated, the selected substance can be separated from the aqueous phase (i.e., "salted out") by converting the non-ionic aqueous solution to an ionic aqueous solution. The selected substance will then separate out and can be isolated.

Using methods and systems described herein it is possible to separate certain water-soluble selected compounds from an aqueous solution. Once the selected compounds are dissolved in an aqueous solution, and optionally separated from other non-soluble compounds by, for example, filtration, the selected compounds can be isolated from the aqueous solution without having to input a large amount of energy to boll off the water. Conveniently, this separation is done by increasing the ionic strength (amount of charged species) in the aqueous solution (more commonly referred to as "salting out") resulting in a separation of the selected compound from the distinct aqueous phase. The selected compound can then be isolated from the aqueous solution be decanting it or filtering it, as appropriate. Thus, an aqueous solution whose ionic strength is altered upon contact with a suitable trigger can dissolve or separate from a selected compound in a controlled manner. Importantly, this method of salting out is readily reversible, unlike the conventional method of salting out (e.g., adding NaCl to water). A system for employing such a method includes, in addition to the components set out above, means for mechanical separation of solids from a liquid mixture.

In an embodiment, the invention provides a method of removing water (i.e., drying) from hydrophobic liquids such as solvents. As described in detail herein, additives form a salt in the presence of water and $CO_2$, COS or $CS_2$. Accordingly, additives added to wet solvent and an ionizing trigger gas (in any combination) cause any water that was in the wet solvent to separate out as a distinct ionic component in an aqueous phase. A system for employing such a method includes, in addition to the components set out above, means for extracting a water immiscible liquid phase from an aqueous solution.

A conceptual model of such a system is shown in FIG. 1, which shows the reversible separation of tetrahydrofuran (THF) from an aqueous solution of a compound of formula (1). This figure shows that when THF is mixed with a non-ionic aqueous solution. THF is miscible with the non-ionic aqueous solution, providing a single phase. As discussed in working examples 1 and 2, THF was experimentally shown to be miscible with the non-ionic aqueous solution. Further, THF was isolated from the mixture by switching the additive in the solvent from its non-ionic form to its ionic form (ammonium bicarbonate) in order to increase the ionic strength and force THF from the aqueous solution.

Specifically, as discussed in working examples 1 and 2, the aqueous solution was contacted with $CO_2$ to switch the amine to its ammonium bicarbonate form (ionic form) as shown by formula (3). The contacting was carried out by treating a miscible mixture of THF, water and water-soluble amine compound of formula (1) with carbonated water or actively exposing the mixture to $CO_2$. The THF then formed a non-aqueous layer and the ammonium bicarbonate remained in an increased ionic strength aqueous layer (water+salt (3)). The non-aqueous and aqueous layers are immiscible and formed two distinct phases, which can then be separated by decantation, for example. Once separated, the non-aqueous and aqueous layers provide an isolated non-aqueous phase comprising THF and an isolated aqueous phase comprising the ammonium bicarbonate form of additive in the switchable solvent. In this way, the solvent is separated from the THF without distillation. While it is unlikely that every single molecule of THF will be forced out of the aqueous phase, a majority of the THF can be forced out by this method. The amount of THF that remains in the aqueous phase will depend on several factors, including nature and concentration of additive, temperature, effect of other species in solution, mount of $CO_2$ (or other gas(ses) that releases protons in water) In the water, and the number of basic sites on the additive that are protonable by carbonic acid.

The ammonium bicarbonate salt of formula (3) in the aqueous phase was switched back to its non-Ionic form. The aqueous solution of salt (3) which has been switched back to a non-ionic aqueous solution can then be used to dissolve or extract further THF.

Note that the ability of the liquid mixture of water and amine additive (e.g., compound of formula (1)) to dissolve a selected compound may be greater than the ability of pure water to dissolve the same selected compound because the additive may help the desired compound to dissolve in the aqueous solution. This may be because of a polarity-lowering effect of the amine, because of preferential solvation of the molecules of the desired compound by the molecules of the amine additive, and/or because of a miscibility-bridging effed in which the addition of a compound of intermediate polarity increases the mutual miscibility between a low-polarity liquid and a high-polarity liquid.

When the aqueous solutions with switchable ionic strength are switched between their lower ionic strength state and their higher ionic strength state, characteristic of the solution are changed. Such characteristics include: conductivity, melting point, boiling point, ability to solubilise certain solutes, ability to solubilise gases, osmotic pressure, and there may also be a change in vapour pressure. As discussed herein, the switchable ionic strength also affects surfactants by changing their critical micelle concentration and by affecting their ability to stabilize dispersions. Variation of such characteristics can be used, for example, the reversibly switchable ionic strength solution can be a reversibly switchable antifreeze, a reversibly switchable electrolyte solution, or a reversibly switchable conducting solution.

A further aspect provides a non-ionic switchable water mixture that is largely nonconductive (or only weakly conductive) of electricity, that becomes more conductive when it is converted to its ionic form, and that this change is reversible. Such a conductivity difference would enable the mixture to serve as an electrical switch, as a switchable medium, as a detector of $CO_2$, COS or $CS_2$, or as a sensor of the presence of $CO_2$, COS or $CS_2$. This ability of the ionic liquid to conduct electricity can have applications in electrochemistry, in liquid switches and in sensors and/or detectors. Common, affordable $CO_2$ sensors are typically effective at 2-5% $CO_2$. $CO_2$ sensors that work between 2-100% are usually large and prohibitively expensive. A chemical approach based on switchable ionic strength solutions can cost much less.

Further provided is a method for maintaining or disrupting miscibility of two liquids where the first liquid is miscible with low ionic strength water but is immiscible with higher ionic strength water and the second liquid is the reversible switchable ionic strength aqueous solvent described herein. In a mixture of the first and second liquids, they are miscible when the switchable solvent is in its non-ionic form. To disrupt the miscibility, a trigger is applied, causing the ionic strength of the switchable solvent to increase and the newly-Immiscible liquids to separate. Alternatively, the first liquid may be a liquid that is miscible with aqueous solutions of high ionic strength and immiscible with aqueous solutions of low ionic strength. In such a case the ionic and non-ionic forms of the switchable solvent should be used to maintain and disrupt the miscibility, respectively.

Another aspect provides a method of deactivating surfactants is provided. Surfactants (also known as detergents and soap) stabilize the interface between hydrophobic and hydrophilic components. In aqueous solutions, detergents act to clean oily surfaces and clothing by making the (hydrophobic) oil more soluble in water (hydrophilic) by its action at the oil-water interface. Once a cleaning job is finished, soapy water with hydrophobic contaminants remains. To recover the oil from the soapy water, salt can be added to the water and most of the oil will separate from the salt water. With the switchable ionic strength aqueous solution of the present invention, after a cleaning job, the oil can be recovered from the soapy water solution merely by applying a trigger to reversibly increase the solutions ionic strength. The trigger causes the ionic strength to increase, thereby deactivating the surfactant. Many surfactants are unable to function property (effectively stabilize dispersions) at conditions of high ionic strength. The oil then separates from the aqueous phase, and can be decanted off. Then the aqueous solution can be triggered to decrease the ionic strength. Regenerated soapy water can then be reused, over and over.

Another aspect provides switchable water of switchable ionic strengths that are used to stabilize and destabilize emulsions, which may include surfactant-stabilized emulsions. Emulsions of oi and water that include surfactants are used in oil industries to control viscosity and enable transport of oil (as an emulsion) by pipeline. Once the emulsion has been transported, however, it is desirable to separate the surfactant-supported emulsion and recover oil that is substantially water-free. In its non-ionized form, amine additive does not significantly interfere in the stability of an emulsion of water and a water-immiscible liquid (e.g., hexane, crude oil). However, once switched to its ionic form, the increased ionic strength of the solution interferes with the stability of the emulsion, resulting in a breaking of the emulsion. In surfactant-stabilized emulsions, the higher ionic strength solution may interfere with the surfactants ability to stabilize the emulsion. This reversible switch from lower to higher ionic strength is preferable over destabilizing emulsions by traditional means (i.e., increasing the ionic strength by adding of a traditional salt such as NaCl). This preference is because the increase in ionic strength caused by the addition of a traditional salt is difficult to reverse without a large input of energy.

Creating an emulsion is possible, for example by adding a water-immiscible liquid to the lower ionic strength switchable aqueous solution as described previously, to form two phases. Then, a surfactant that is soluble in the aqueous phase should be added to a concentration above the critical micelle concentration of the surfactant. Shear or mixing of the mixture then creates an emulsion. As discussed above, the resultant emulsion can be destabilized by treatment with an ionizing trigger, such as by bubbling it with $CO_2$, COS or $CS_2$ to raise the ionic strength of the aqueous phase. Subsequent removal of $CO_2$, COS or $CS_2$ by treatment with a non-ionizing trigger, such as by bubbling the mixture with a flushing gas and/or by heating it lowers the ionic strength allowing the system to return to the initial conditions.

Non-limiting examples of emulsions include mixtures of water with: crude oil; crude oil components (e.g., gasoline, kerosene, bitumen, tar, asphalt, coal-derived liquids); oil (Including oil derived from pyrolysis of coal, bitumen, lignin, cellulose, plastic, rubber, tires, or garbage); vegetable oils; seed oils; nut oils; linseed oil; tung oil; castor oil; canola oil; sunflower oil; safflower oil; peanut oil; palm oil; coconut oil; rice bran oil; fish oils; animal oils; tallow; or suet. Other non-limiting examples of emulsions include water with colloidal particles, colloidal catalysts, colloidal pigments, clay, sand, minerals, soil, coal fines, ash, mica, latexes, paints, nanoparticles including metallic nanoparticles, nanotubes.

Another aspect provides aqueous solutions of switchable ionic strength, or switchable water, which are used to stabilize and destabilize reverse emulsions.

A suspension is a finely divided solid that is dispersed but not dissolved in a liquid. In an aspect of the invention, aqueous solutions of switchable ionic strength are used to stabilize and destabilize suspension of solids in water, which may include surfactant-stabilized suspensions. In its non-ionized form, amine additive does not interfere in the stability of a suspension. However, once the additive is switched to its ionic form, the increased ionic strength may significantly destabilize a suspension and/or it may inhibit the ability of a surfactant to stabilize such a suspension, resulting in coagulation of the solid particles. This reversible switch from lower to higher ionic strength is preferable to destabilizing a suspension by adding traditional salts (e.g., NaCl) because the increase in ionic strength caused by the addition of a traditional salt is difficult to reverse without a large input of energy. Typical examples of such suspensions may include polymers (e.g., polystyrene), colloidal dyes, and nanoparticles including metallic nanoparticles. Increasing the ionic strength of the solution by applying a trigger, causes small solid particles to aggregate or coagulate to form larger particles that settle to the bottom of the solution. Application of a trigger to convert from higher ionic strength to lower ionic strength (e.g., removal of $CO_2$) allows for redispersion of the particles, regenerating the suspension.

In an alternative aspect there is provided, aqueous solutions comprising switchable water of switchable ionic strength that are used to stabilize and destabilize foam (i.e., gas-in-liquid), which may include surfactant-stabilized foams. In its non-Ionized form, the switchable additive does not interfere in the stability of a foam. However, once the additive is switched to its ionic form, the increased ionic strength interferes with the stability of the foam and/or inhibits a surfactant's ability to stabilize a foam, resulting in the breaking of the foam. This reversible switch from lower to higher ionic strength is preferable to destabilizing foams by adding a traditional salt (e.g., NaCl) because the increase in ionic strength caused by the addition of a traditional salt is difficult to reverse without a large input of energy.

A gas in liquid emulsion can exist in the lower ionic strength aqueous solution that includes an amine additive. When a trigger is applied to increase the solution's ionic strength the foam is destabilized. The application of a trigger to convert it from the higher ionic strength solution to the lower ionic strength solution leads a newly generated foam to be stabilized in the solution. In this situation, a non-ionizing trigger to release $CO_2$, COS or $CS_2$ would preferably be application of a flushing gas (e.g., $N_2$, air). In an embodiment of the method of separating a solute from an aqueous solution, instead of separating the solute in a neat form, it is possible to add a water immiscible liquid (e.g., n-octanol) to the mixture. In the lower ionic strength form, the solute has a given partitioning between the aqueous phase and the hydrophobic phase. With application of a trigger, the aqueous phase converts to a higher ionic strength solution, which causes more of the solute to partition into the hydrophobic phase. In this embodiment, rather than the solute forming its own phase, the solute is dissolved in the hydrophobic phase. If desired, another trigger (e.g., removal of $CO_2$) lowers the ionic strength allowing the solute to return to the aqueous phase. A system for employing such a method would include, in addition to the components described above, means for providing the water immiscible liquid and means for extracting a water immiscible liquid phase from an aqueous solution in another aspect there is provided, aqueous solutions of switchable ionic strength that are used to create aqueous/aqueous biphasic systems. A lower ionic strength aqueous solution with amine additive and a water-soluble polymer (e.g., poly(ethylene glycol) exists as a single phase. With application of a trigger, the aqueous phase converts to a higher ionic strength solution, which causes the mixture to form two separate phases. Specifically, the phases are the polymer and water that it carries with it since is quite water soluble and the aqueous solution of higher ionic strength. If desired, another trigger (e.g., removal of $CO_2$) lowers the ionic strength causing the system to recombine into a single aqueous phase.

In an embodiment of this aspect, there are two solutes in the aqueous solution of switchable ionic strength that comprises a water-soluble polymer (e.g., poly(ethylene glycol). The two solutes may be, for example, two different proteins. Each protein will separate from higher ionic strength aqueous solution (i.e., "salt out") at a distinct and specific ionic strength. If a trigger increases the ionic strength of the switchable solution such that only one of the two proteins separates from the higher ionic strength aqueous phase, the one protein will partition into the water and water-soluble-polymer layer so that it is separated from the other protein. As described above, with another trigger to reduce the ionic strength, the aqueous solution can be used over and over again. In another embodiment of this aspect, a solute may partition from the higher ionic strength aqueous solution into the water with water-soluble-polymer layer in the form of a solid.

Another aspect of the invention is a method of drying hydrophobic liquids by separating the hydrophobic liquid from its water contaminant. As described herein, this separation is effected by adding an additive that forms a salt in the presence of water and $CO_2$, COS or $CS_2$. The salt can then be isolated from the hydrophobic liquid thereby removing its water contaminant. Non-limiting examples of hydrophobic liquids include solvents, alcohols, mineral oils, vegetable oils, fish oils, seed oils.

Yet another aspect of the invention provides a method of reversibly lowering an aqueous solution's boiling point. Another aspect of the invention provides a method of reversibly increasing an aqueous solution's boiling point.

Another aspect of the invention provides a method of reversibly lowering an aqueous solution's boiling point. Another aspect of the invention provides a method of reversibly increasing an aqueous solution's boiling point.

An aspect of the invention provides a reversibly switchable antifreeze.

An aspect of the invention provides a reversibly switchable electrolyte.

In preferred embodiments, conversion of the compound of formula (1) to the salt is complete. In certain embodiments, the conversion to salt is not complete; however, a sufficient amount of the amine is converted to the salt form to change the ionic strength of the liquid. Analogously, in some embodiments, the conversion of ionic form back to the amine compound of formula (1) that is water-miscible may not be complete; however a sufficient amount of the salt is converted to the amine compound of formula (1) that is water-miscible to lower the ionic strength of the solution.

An advantage of switchable water described herein is that it can facilitate syntheses and separations by eliminating the need to remove and replace water or an aqueous solution after each reaction step. With triggers that are capable of causing a drastic change in the ionic strength of the water or aqueous solution while it is still in the reaction vessel, it may be possible to use the same water or aqueous solution for several consecutive reaction or separation steps. This would eliminate the need to remove and replace the solvent water or aqueous solution. For example, a chemical reaction that requires an aqueous solvent could be performed using the switchable water while in its amine form as the solvent. Once the reaction is complete, the solvent could be switched to its higher ionic strength form which is substantially incapable of dissolving a product and/or side-product of the reaction. This would force the product to precipitate. If solid, or become immiscible, if liquid. The solvent could then be separated from the product by physical means such as, for example, filtration or decantation. The solvent could then be switched back to its lower ionic strength form by switching the ionic form to the water-miscible amine and reused. This method allows the use of an aqueous solvent without the requirement for an energy-Intensive distillation step to remove the solvent. Such distillation steps may be complex because both the solvent and the product may have similar boiling points.

Reuse and recycling of solvents of the invention provide economic benefits. The time required to switch between the higher and lower ionic strength solvents is short as demonstrated by studies described in Examples 6 and 7. In Example 6, an incomplete switch between an additive in ionic form and nonionic form can occur in 300 minutes with heating. Example 6 also shows that in excess of about 90% of the ionic forms of MDEA and THEED were converted back to their non-ionic forms. THEED was 98% deprotonated after 120 minutes of heating (75° C.) and bubbling with $N_2$ using a single needle. As shown in FIG. 12 and described in Example 7, conductivity of TMDAB was reduced approximately 95% in 90 minutes when heated at 80° C. and $N_2$ was bubbled through a glass frit. This result demonstrated a dramatic ionic strength reduction.

It is advantageous to convert from non-Ionic amine form to ionic form and then back again (or vice-versa). The solvent comprising water and the additive in its amine form could be miscible with another liquid, and then the solvent could be switched to increased ionic strength form to allow for separation of the resulting two liquid components. The liquid components may or may not appear as distinct layers. Methods for separation of the components may include decanting, or centrifuging followed by decanting. After separation, it is desirable to convert an ionic form of the additive back to its non-ionic amine form in water. Thus the solvent can be reused.

Figure 22:
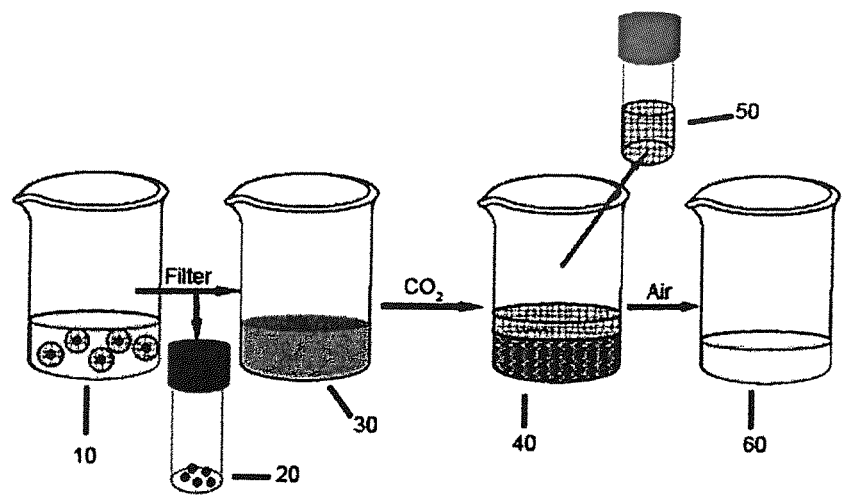
FIG. 22 depicts a system for obtaining at least one compound from a mixture of compounds using switchable water that is reversibly switched from its non-ionic form to an ionized form.

In accordance with a specific embodiment, there is provided a system, as depicted in FIG. 22, for isolating or purifying one or more compounds from a mixture. The system includes a means 10 for introducing a non-ionic switchable water to a mixture of compounds. In this example, the first compound is miscible in the non-Ionic form of switchable water and the second compound is insoluble.

Accordingly, the system additionally comprises means 20 for mechanically collecting the second compound that is insoluble in the non-ionic switchable water. For example, the system can include means for collecting or removing the second compound by filtration thereby leaving a mixture 30 that includes the non-ionic switchable water and the first compound. The system depicted in FIG. 22 further comprises means for contacting mixture 30 with an ionizing trigger (e.g., $CO_2$) to increase the ionic strength of the switchable water and generate a two-phase mixture 40 in which the first compound is no longer miscible with the switchable water. The system shown in FIG. 22 additionally comprises means 50 for collecting the immiscible first compound. For example, the system can include means for decanting or otherwise collecting the top layer of mixture 40, which top layer includes the first compound. Optionally, this system further includes means for reversing the ionic strength increase of the switchable water by introducing a non-ionizing trigger, such as air, to reform the non-ionic form of the switchable water 60.

Switchable water can also be useful in water/solvent separations in biphasic chemical reactions. Separation of a liquid from a switchable solvent can be effected by switching the switchable solvent to its higher ionic strength form. This ability to separate solvents may be useful in many industrial processes where upon completion of a reaction, the solvent can be switched to its higher ionic strength form with the addition of a trigger allowing for facile separation of the two distinct phases. Thus a switchable ionic strength solvent may be used in its lower ionic strength form as a medium for a chemical reaction. Upon completion of the reaction, the chemical product is readily separated from solution by switching the solvent to its higher ionic strength form. The switchable water solvent can then be recovered and reused.

To gain a better understanding of the invention described herein, the following examples are set forth. It should be understood that these examples are for illustrative purposes only. Therefore, they should not limit the scope of this invention in any way.

In the following Working Examples, a variety of tertiary amines have been studied for their properties as switchable additives in switchable ionic strength aqueous solutions (i.e., switchable water).

Results presented in the working examples, figures and tables show that six tertiary amines, selected from monoamines, diamines, triamines and tetramines exhibited reversible switching ionic strength behavior. All of these compounds were miscible with water in aqueous solution, and in the presence of $CO_2$ switched to ammonium bicarbonate salt forms which were soluble in the aqueous phase.

Variations to the structure of these amine compounds are well within the skill of the person of ordinary skill in the art pertaining to the invention. These include minor substitutions, varying the length of a hydrocarbon chain, and the like.

As described in the working examples, several salts of formulae (2) and (3), and of polyamines have been formed according to the invention by reacting $CO_2$ with aqueous solutions of water-miscible amine compounds of formulae (1) and (4). The water system advantageously provides a rapid rate of reaction to form the ammonium bicarbonate compounds from the water-miscible compounds of formulae (1) and (4), and allows the dissolution of the ammonium bicarbonate compounds should they be solid at the temperature of the separation.

WORKING EXAMPLES

The following chemicals were used as received: ethanolamine, 2-(methylamino) ethanol, chloroform-d (99.8+ atom % d), $D_2O$ (99.9+ atom % d), acetonitrile-$d_3$ (99.8+ atom % d), methanol-$d_4$ (99.8+ atom % d), 1,4-dioxane (99+%), DMAE, MDEA, TMDAB, THEED, DMAPAP and HMTETA (Sigma-Aldrich of Oakville, Ontario, Canada, "Aldrich" or TCI of Portland, Oreg., USA); THF (99+%) and ethyl acetate (99.5+%) (Caledon Laboratories, Ontario, Canada); hydrochloric acid (~12 M, Fischer Scientific, Ottawa, Ontario, Canada); and DMSO-da (99.9+ atom % d) Cambridge isotope Labs. St Leonard, Canada).

Diethyl ether was purified using a double-column solvent purification system (Innovative Technologies Incorporated, Newbury Port, USA). Compressed gasses were from Praxair (Mississauga, Ontario, Canada): 4.0 grade $CO_2$ (99.99%), 5.0 grade Ar (99.999%), supercritical grade $CO_2$ (99.999%, $H_2O$<0.5 ppm), nitrogen (99.998%, $H_2O$<3 ppm) and argon (99.998%, $H_2O$<5 ppm).

Unless otherwise specified, water used in studies described herein was municipal tap water from Kingston, Ontario, Canada that was deionized by reverse osmosis and then piped through a MilliQ Synthesis A10 apparatus (Millipore SAS, Molsheim, France) for further purification.

DBU (Aldrich, Oakville, Ontario, Canada, 98% grade) was dried by refluxing over $CaH_2$ and distilled under reduced pressure onto 4 Å molecular sieves and then deoxygenated by repeated freeze/vacuum/thaw cycles or by bubbling with $CO_2$ followed by filtration to remove any bicarbonate precipitate.

$^1$H NMR and $^{13}$C NMR spectra were collected at 300 K on a Bruker AV-400 spectrometer at 400.3 and 100.7 MHz, respectively.

Comparative Example 1: Amidine and Water System

A bicyclic amidine DBU (1,8-diazabicyclo-[5.4.0]-undec-7-ene), having the following structure, was investigated as an additive to provide switchable ionic strength aqueous solutions.

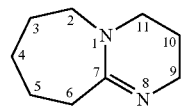

DBU in non-ionic amidine form was soluble in water to provide a single phase aqueous solution. It was found to be capable of switching to a water-soluble amidinium bicarbonate salt form in the presence of water and a $CO_2$ trigger.

Initial experiments with a solution of DBU in water confirmed that compounds THF and 1,4-dioxane were miscible with the aqueous solution of DBU (non-ionic form) in the absence of $CO_2$, and were immiscible with the aqueous solution in the presence of $CO_2$ in which the amidine had been switched into its amidinium bicarbonate ionic form. However, it was found that it was not possible to liberate $CO_2$ from the ionic solution with moderate heating. The two-phase mixture of non-aqueous THF and aqueous amidinium bicarbonate that had been generated from exposure to $CO_2$ could not be converted to a single-phase aqueous solution of DBU (non-Ionic form) and THF.

Specifically, a 1:1:1 (v/v/v) mixture of DBU, water and compound was added to a six dram vial containing a magnetic stirrer and fitted with a rubber septa. To introduce gas to the solution, a single narrow gauge steel needle was inserted and gas was bubbled through. A second narrow gauge steel needle was inserted to allow venting of the gaseous phase.

When the compound was THF, a single phase miscible liquid mixture was observed. After $CO_2$ was bubbled through the solution for 15 min, the mixture separated into two phases, an aqueous phase comprising a solution of the amidinium bicarbonate salt of DBU and a non-aqueous phase comprising THF. Bubbling $N_2$ through the mixture for several hours at 50° C. failed to cause the phases to recombine.

Similarly, a 1:1:1 (v/v/v) mixture of DBU, water and 1, 4-dioxane was observed to be a single phase miscible liquid mixture. After $CO_2$ was bubbled through the solution for 60 min, the mixture separated into two phases, an aqueous phase comprising a solution of the amidinium bicarbonate salt of DBU and a non-aqueous phase comprising 1, 4-dioxane. Bubbling $N_2$ through the mixture for several hours at 50° C. failed to cause the phases to recombine.

Thus, although an aqueous solution of the amidine DBU can be switched from a lower ionic strength form to a higher ionic strength form in order to force out THF or 1,4-dioxane from the solution, the switching was not found to be reversible at the given experimental conditions, it is likely that with high energy input such as high temperatures, reversible switching would be possible.

Comparative Example 2: Primary and Secondary Amine and Water Systems

A primary amine, ethanolamine, and a secondary amine, 2-(methylamino) ethanol were investigated as additives to provide switchable ionic strength aqueous solutions. Six dram vials comprising 3:3:1 (v/v/v) mixtures of $H_2O$, amine, and compound were prepared as described for comparative example 1.

A 3:3:1 (v/v/v) mixture of $H_2O$, ethanolamine, and THF was observed to be a single phase solution. This solution separated into two phases after $CO_2$ was bubbled through the liquid mixture for 30 minutes, with an aqueous phase and a non-aqueous phase comprising THF. However, the two separate phases did not recombine into one miscible layer even after $N_2$ was bubbled through the liquid mixture for 90 minutes at 50° C.

A 3:3:1 (v/v/v) mixture of $H_2O$, ethanolamine, and DMSO was observed to be a single phase solution. This solution did not separate into two phases after $CO_2$ was bubbled through the liquid mixture for 120 minutes, however turbidity was observed.

A 3:3:1 (v/v/v) mixture of $H_2O$, 2-(methylamino)ethanoi, and THF was observed to be a single phase solution. This solution separated into two phases after $CO_2$ was bubbled through the liquid mixture for 10 minutes, with an aqueous phase and a non-aqueous phase comprising THF. However, the two separate phases did not recombine into one miscible layer even $N_2$ was bubbled through the liquid mixture for 90 minutes at 50° C.

Thus, in preliminary studies, certain primary and secondary amine additives did not exhibit reversible switchable of ionic strength character. Although they switched from lower ionic strength to higher ionic strength, they were not successfully switched from higher to lower ionic strength forms using the low energy input conditions of bubbling $N_2$ through the liquid mixture for 90 minutes at 50° C. it is noted that higher temperatures were not used due to the limitation posed by the boiling point of THF of 66° C. Bubbling $N_2$ at a higher temperature may have led to the reverse reaction; however, THF evaporation would have been a problem. Although not wishing to be bound by theory the inventors suggest that this irreversibility may be as a result of carbamate formation arising from the reaction of available N—H groups in the primary and secondary amines with $CO_2$. The removal of carbamate ions in water to give non-Ionic amines by heating and bubbling a nonreactive gas can be difficult.

Example 1: Reversible Solvent Switching in Tertiary Amine/Water Systems

Three tertiary amines, DMAE, MDEA and THEED were investigated as additives for switchable ionic strength solutions. DMAE and MDEA are monoamines, and THEED is a diamine.

Six dram vials containing a magnetic stirrer and fitted with a rubber septa were prepared with 1:1:1 w/w/w solutions of water, THF, and an additive of tertiary amine compound of formula (1). To introduce gas to the solution, a single narrow gauge steel needle was inserted and gas was bubbled through. A second narrow gauge steel needle was inserted to allow venting of the gaseous phase.

The solutions were tested for switchable ionic strength character by bubbling $CO_2$ through the mixtures. The time necessary to observe separation of the THF from the aqueous solution of the ionic bicarbonate salt was recorded and is shown in Table 1, it was determined that it typically takes 30 min of bubbling with $CO_2$ to separate out THF from the aqueous phase.

After separation of the THF into a distinct non-aqueous phase was observed, nitrogen was then bubbled through the two-phase solutions at a temperature of 50° C. In order to remove $CO_2$ from the aqueous phase and switch at least a portion of the ionic bicarbonate salt form back to the non-ionic tertiary amine form. If the switching reaction was sufficiently reversible to reduce the ionic strength of the aqueous phase to a level allowing miscibility with the THF, conversion of the two-phase mixture to a single aqueous phase was observed.

As shown in Table 1, all of the tested tertiary amine additives could be switched back from their ionic forms allowing recombination of the two phase mixtures to a single phase.

Example 2: Quantitative Determination of the Separation of Compound and Additive Upon Switching The three switchable aqueous solution systems of Example 1 were further investigated by $^1H$ NMR spectroscopy to quantity the amount of THF separated from the aqueous phase upon switching of the additive to its higher ionic strength ammonium bicarbonate form, and to quantify the amount of additive retained in the aqueous solution after switching.

To measure the extent of THF being forced out of an aqueous phase by an increase in ionic strength, and the amounts of amine which remained in the aqueous phase, 1:1:1 w/w/w solutions of water, THF, and amine additive were prepared in graduated cylinders and the cylinders were capped with rubber septa. After 30 minutes of bubbling $CO_2$ through the liquid phase at a flow rate of 3-5 ml min$^{-1}$) as measured by a J&W Scientific ADM 2000 intelligent Flow Meter, from a single narrow gauge steel needle, a visible phase separation was observed. The volumes of each phase were recorded. Aliquots of the non-aqueous and aqueous layers were taken and dissolved in $d_3$-acetonitrile in NMR tubes. A known amount of ethyl acetate was added to each NMR tube as an internal standard.

$^1H$ NMR spectra were acquired on a Bruker AV-400 NMR spectrometer at 400.3 MHz for several replicate solutions of each mixture, and through integration of the ethyl acetate standard, a concentration of THF or additive was calculated and scaled up to reflect the total volume of the aqueous or non-aqueous phase giving a percentage of the compound being forced out or retained. The results are shown in Table 2.

The choice of tertiary amine additive was found to determine the amount of THF separated from the aqueous phase upon switching with $CO_2$ as shown in Table 2. When the tertiary amine was MDEA, 74 mol % of the THF was separated from the aqueous phase after bubbling $CO_2$ through the solution, while 90.7 mol % of the additive (In ionic form) was retained in the aqueous phase.

In some embodiments, it is preferred that substantially all of the additive remains in the aqueous phase, rather than going into the non-aqueous phase. This is because the utility of such solutions as reusable solvent systems would be increased if losses of the additive from the aqueous phase could be minimised. In the case of MDEA, 90.7 mol % of the MDEA remained in the aqueous phase. Thus, 9.3 mol % of the MDEA was transferred into the non-aqueous phase comprising THF. Interestingly, THEED had the best retention in the aqueous phase at approximately 98.6 mol %, even though it was least successful in forcing about 67.7 mol % of the THF out of solution.

Subsequent bubbling of $N_2$ through the mixture lowered the ionic strength and allowed the THF and aqueous phases to become miscible and recombine. At 50° C., this took about 30 minutes for the MDEA/THF/water mixture (Table 1). The rate of recombination would increase at higher temperatures, but this was not attempted in this case because of the low boiling point of THF (boiling point 66° C.).

These experiments were also conducted using air rather than nitrogen as the nonreactive gas to drive off $CO_2$ from the aqueous solution and switch at least a portion of the additive from ionic form to non-ionic form. The time taken for the recombination of the aqueous and non-aqueous phases was approximately the same for air as it was for $N_2$ for each additive.

Example 3: Quantitative Determination of the Separation of Compound and Additive Upon Switching at Different Additive Loadings Reversible solvent switching in amine/water systems were explored for different loadings of five additives, while keeping the ratio of THF:water at a constant 1:1 w/w. The additives were all tertiary amines selected from monoamines DMAE and MDEA, diamine TMDAB, triamine DMAPAP and tetramine HMTETA.

To measure the extent of THF being forced out of an aqueous phase by an increase in ionic strength, and the amounts of amine which remained in the aqueous phase, 1:1 w/w solutions of water:THF were prepared in graduated cylinders and the appropriate amount of amine additive added. The graduated cylinders were capped with rubber septa. This comparison involved bubbling $CO_2$ through a single narrow gauge steel needle for 30 min at a rate of 3-5 ml min$^{-1}$ as measured by a J&W Scientific ADM 2000 Intelligent Flow Meter to switch the tertiary amine in aqueous solution with THF to ionic form. A second narrow gauge steel tube was provided to vent the gaseous phase. A visible phase separation into two liquid phases occurred, resulting in a non-aqueous and an aqueous phase. Aliquots of the non-aqueous and aqueous layers were taken and were spiked with a known amount of ethyl acetate to act as an internal standard and the amounts of THF and additive were quantified by $^1$H NMR integration as discussed in Example 2. The results are shown in Table 3.

It is apparent that an increase in the loading of the additive generally resulted in an increase in the % THF separated from the aqueous solution after switching, as would be expected. It can also be seen that the diamine compound TMDAB at a 9 wt % loading (i.e. 5:5:1 THF:$H_2O$:amine) forced 87% of the THF out of the aqueous phase after switching while 99.8% of the additive was retained in the aqueous phase. Even at a 3 wt % loading of TMDAB (15:15:1 THF:$H_2O$:amine), 74% of the THF was forced out after switching. In comparison, the monoprotonated additives DMAE and MDEA were only effective at higher loadings and had greater losses of the additive to the THF phase (Table 3).

In all experiments, the effect of the increase in ionic strength upon switching with $CO_2$ could be reversed; such that the THF phase recombined with the aqueous phase to regenerate a one phase system when the mixture was heated and sparged with $N_2$ or air to remove $CO_2$.

Example 4A: Qualititative Determination of the Separation of Selected Compound (THF) and Additive (Amine) Upon Switching at Equivalent Additive Loadings A qualitative comparison of reversible solvent switching in the five amine/water systems of Example 3 was undertaken at equivalent additive loadings to determine by $^1$H NMR spectroscopy the relative effectiveness of switching each additive from non-ionic amine to ionic ammonium bicarbonate and back to non-ionic amine forms. Aqueous solutions (0.80 molal) of DMAE, MDEA, TMDAB, THEED, DMAPAP, HMTETA additives were added to 1:1 w/w solutions of THF:$D_2O$ in NMR tubes, which were sealed with rubber septa. $^1$H NMR spectra were acquired for each sample prior to any gas treatment, and are shown as the A spectra in FIGS. 4, 5, 6, and 7 for DMAE, TMDAB, HMTETA and DMAPAP respectively. Two narrow gauge steel needles were inserted and the trigger gas was gently bubble through one of the needles into the solution at a rate of 4-5 bubbles per second. The second needle served as a vent for the gas phase, which was maintained at a positive pressure above atmospheric by the bubbling.

$CO_2$ was used as the trigger to switch the amine from its non-ionic to ionic form. $^1$H NMR spectra were acquired for each sample after switching with $CO_2$.

The spectrum obtained after switching DMAE by 20 minutes of bubbling at 25° C., with a $CO_2$ trigger is shown as spectrum B in FIG. 4. Subsequently, the additive was switched back to non-Ionic form by bubbling a nitrogen gas trigger through the solution for 300 minutes at 75° C. and the spectrum is shown as spectrum C in FIG. 4.

The spectrum obtained after switching TMDAB by 30 minutes of bubbling at 25° C., with a $CO_2$ trigger is shown as spectrum B in FIG. 5. Subsequently, the additive was switched back to non-ionic form by bubbling a nitrogen gas trigger through the solution for 240 minutes at 75° C. and the spectrum is shown as spectrum C in FIG. 5.

The spectrum obtained after switching HMTETA by 20 minutes of bubbling at 25° C., with a $CO_2$ trigger is shown as spectrum B in FIG. 6. Subsequently, the additive was switched back to non-ionic form by bubbling a nitrogen gas trigger through the solution for 240 minutes at 75° C. and the spectrum is shown as spectrum C in FIG. 6.

The spectrum obtained after switching DMAPAP by 20 minutes of bubbling at 25° C., with a $CO_2$ trigger is shown as spectrum B in FIG. 7. Subsequently, the additive was switched back to non-ionic form by bubbling a nitrogen gas trigger through the solution for 120 minutes at 75° C. and the spectrum is shown as spectrum C in FIG. 7.

Example 4B: Quantitative Determination of the Separation of Selected Compound (THF) and Additive (Amine) Upon Switching at Equivalent Additive Loadings To measure the amount of THF being separated out of an aqueous phase by increasing its ionic strength, and the amounts of amine which remained in the aqueous phase, 1:1 w/w solutions of THF and water were prepared in graduated cylinders. The appropriate mass of amine additive to result in a 0.80 molal solution was added and the cylinders were capped with rubber septa. After 30 minutes of bubbling $CO_2$ through the liquid phase from a single narrow gauge steel needle, a visible phase separation was observed. The two phases were a non-aqueous phase comprising THF, which was forced out of the increased ionic strength aqueous solution, and an aqueous phase comprising the additive in ionic form. The volumes of each phase were recorded. Aliquots of the non-aqueous and aqueous layers were taken and dissolved in $d_3$-acetonitrile in NMR tubes. A known amount of ethyl acetate was added to each NMR tube as an internal standard. $^1$H NMR spectra were acquired as for the fully protonated additives, and through integration of the ethyl acetate standard, a concentration of THF or additive was calculated and scaled up to reflect the total volume of the aqueous or non-aqueous phase giving a percentage of the compound being forced out or retained. The results are shown in Table 4.

Diamine TMDAB, triamine DMAPAP and tetramine HMTETA additives exhibited superior THF separation compared to monoamine additives DMAE and MDEA. This observation can be explained due to the increase in ionic strength as a result of the increased charge on the quaternary ammonium cations resulting from the protonation of multiple basic nitrogen centres in the diamine, triamine and tetramine. It is apparent from equation (C) that for an equimolal concentration of additive, an increase in the charge on the cation of the salt from +1 to +2 should give rise to a tripling in ionic strength.

It should be noted that although TMDAB and DMPAP contain more than two tertiary amine centres, only two of the basic sites in each molecule are capable of protonation as a result of switching with $CO_2$. This means that equimolal solutions of the protonated salts of TMDAB, DMAPAP and HMTETA should each exhibit a similar ionic strength, and thus similar % THF separations, as is apparent from Table 4.

Example 5: Reversible Protonation of Amine Additives in $H_2O$ as Monitored by Conductivity Protonation of aqueous solutions of three tertiary amine additives, DMAE, MDEA, and THEED, in response to the addition of a $CO_2$ trigger was performed and monitored by conductivity meter.

Aqueous solutions of an additive with distilled, deionised $H_2O$ were prepared (1:1 v/v $H_2O$ and DMAE, 1:1 v/v $H_2O$ and MDEA and 1:1 w/w $H_2O$ and THEED) In sample beakers. 1:1 w/w $H_2O$ and THEED was used because a 1:1 v/v solution was too viscous to pour accurately. A trigger gas chosen from $CO_2$, air or nitrogen was bubbled at identical flow rates through the solution via a narrow gauge steel tube and the conductivity of the solution was measured periodically using a Jenway 470 Conductivity Meter (Bibby Scientific, NJ, US) having a cell constant of 1.02 cm$^{-1}$.

Results of bubbling a $CO_2$ gas trigger through the solutions of additives in water at room temperature are depicted in FIG. 7. As shown in this Figure, the conductivity of each of the additive solutions rose as the amine was converted to its ionic form as it was contacted with the $CO_2$ trigger. The aqueous solution of DMAE showed the largest rise in conductivity.

It is noted that conductivity is not simply a function of salt concentration; conductivity is also strongly affected by a solution's viscosity. Thus, even if two separate additive solutions have identical numbers of basic sites which can be fully protonated and have identical concentrations in water, they may have different conductivity levels.

The deprotonation reactions of the ionic solutions of additives in water were monitored in a similar manner, and the conductivity plot is shown in FIG. 8. Nitrogen gas was flushed through the solution at 80° C. to switch salts back to their non-ionic tertiary amine form. The residual levels of conductivity exhibited show that none of the additives were completely deprotonated by this treatment within 6 h.

Example 6: Reversible Protonation of Amine Additives in $D_2O$ as Monitored by $^1$H NMR Spectroscopy The degree of protonation of tertiary amine additives upon contact with a $CO_2$ trigger was investigated by $^1$H NMR spectroscopy. Two monoamines, DMAE and MDEA, and the diamine THEED were chosen for study.

In order to establish the chemical shifts of the protonated bases, molar equivalents of several strong acids, including HCl and $HNO_3$, were added to separate solutions of the amines dissolved in $D_2O$. $^1$H NMR spectra were acquired on a Bruker AV-400 NMR spectrometer at 400.3 MHz for three replicate solutions of each amine. An average value of each chemical shift for each protonated base was calculated along with standard deviations. If the bases when reacted with the trigger to ionic form showed chemical shifts within this error range, they were considered to be 100% protonated within experimental error. The $^1$H NMR chemical shifts of the unprotonated amines were also measured.

The extent of protonation by $CO_2$ of each additive at room temperature at 0.5 M (except THEED was at 0.1 M) in $D_2O$ was monitored by $^1$H NMR. The amine was dissolved in $D_2O$ in an NMR tube and sealed with a rubber septa. The spectrum was then acquired. Subsequently, two narrow gauge steel needles were inserted and gas was gently bubbled through one of them into the solution at approximately 4-5 bubbles per second. The second needle served as a vent for the gaseous phase.

Firstly $CO_2$ was bubbled through the solution for the required length of time and then the spectrum was re-acquired. This process was repeated. The % protonation of the amine was determined from the observed chemical shifts by determining the amount of movement of the peaks from the normal position for the unprotonated amine towards the position expected for the fully protonated amine.

The results shown in FIG. 9 indicate that DMAE and MDEA are fully protonated (the peaks fell within the standard deviation of the HCl and $HNO_3$ salts) within 20 minutes when $CO_2$ was bubbled through the solution. THEED is one half protonated (49%) by 10 minutes, meaning that only one of the two nitrogen atoms of this diamine has been protonated.

The reverse reaction was monitored in a similar manner and the results shown in FIG. 10. Nitrogen gas was flushed through the solution at 75° C. The spectra showed that none of the additives were completely deprotonated by this treatment within 5 hours, (2 hours for THEED), with the ionic form of THEED reacting the fastest of the three, and with DMAE being the slowest. THEED was 98% deprotonated (I.e., the ionic strength of the solution dropped twenty-five fold) after 2 hours of $N_2$ bubbling.

The observed rates of switching, as represented by the protonation and deprotonation processes, are affected by the manner in which the $CO_2$ or sparging gas was introduced (e.g., its rate of introduction and the shape of the vessel containing the solution). For example, a comparison of FIG. 7 with FIG. 9 shows that the rate of the reaction in the $^1$H NMR experiment was faster than that in the conductivity experiment. This rate difference is due to the difference in equipment. The $^1$H NMR experiment was performed in a tall and narrow NMR tube, which is more efficiently flushed with $CO_2$ than the beaker used in the conductivity tests. Furthermore, it is very likely that the rate of deprotonation and thus reduction in the ionic strength of the solution could be increased if the $N_2$ sparging were done in a more efficient manner than simple bubbling through a narrow gauge tube.

Thus, a 1:1 v/v mixture of MDEA and water can be taken to 100% protonated and returned back to about 4.5% protonation by bubbling/sparging with $N_2$. It is possible to calculate an approximate ionic strength of the 100% and 4.5% degrees of protonation of the amine additive. The density of MDEA is 1.038 g/ml, so a 1 L sample of this mixture would contain 500 g of water and 519 g (4.4 mol) MDEA. Therefore the concentration of MDEA is 4.4 M. The ionic strength, assuming an ideal solution and assuming that the volume does not change when $CO_2$ is bubbled through the solution, is 4.4 M at 100% protonation and 0.198 M at 4.5% protonation (using equation (A) above).

Example 7: Reversible Protonation of Amine Additives in $H_2O$ as Monitored by Conductivity Three tertiary polyamine additives were selected for further investigation of additives for switchable ionic strength aqueous solutions. TMDAB is a diamine, DMAPAP is a triamine, and HMTETA is a tetramine.

1:1 v/v solutions of the various additives and distilled, deionised water were prepared in six dram glass vials and transferred to a fritted glass apparatus which acted as a reaction vessel. The fritted glass apparatus consisted of a long narrow glass tube leading to a fine glass frit having a diameter of approximately 4 cm. The other end of the glass frit was connected to a cylindrical glass tube which held the solution of the additive during contacting with the trigger gas. This apparatus allowed a multiple source of trigger gas bubbles to contact the solution, compared to the single point source of Example 5.

A trigger gas chosen from $CO_2$, air or nitrogen was bubbled through the solution via the glass frit at a flow rate of 110 ml min$^{-1}$ as measured by a J&W Scientific ADM 2000 Intelligent Flowmeter (CA, USA). For each conductivity measurement, the solution was transferred back to a six dram vial, cooled to 298 K and measured in triplicate. Conductivity measurements were performed using a Jenway 470 Conductivity Meter (Bibby Scientific, NJ, US) having a cell constant of 1.02 cm$^{-1}$.

FIG. 11 shows a plot of the conductivity changes resulting from bubbling $CO_2$ through the three solutions at 25° C. It is apparent that HMTETA (■) and DMAPAP (▲), the tetramine and triamine respectively, exhibit lower conductivities than TMDAB (♦), the diamine. In addition, TMDAB exhibits the highest rate of conductivity increase.

The reverse reaction was monitored in a similar manner and the results shown in FIG. 12. Nitrogen gas was flushed through the solution at 80° C. It is apparent that the conductivity of the solution of HMTETA (■) in ionic form returns to close to zero after 20 minutes, indicating substantial removal of $CO_2$ from the solution and reversion of the additive to its non-ionic form. The rate of conductivity decrease is highest for TMDAB (♦), the diamine, indicating it can be reversibly switched between non-ionic and ionic forms at a higher rate than HMTETA and DMAPAP (▲)

The observed rates of switching, as represented by the changes in conductivity, appear to be affected by the manner in which the $CO_2$ or sparging gas was introduced (e.g., its rate of introduction and the shape of the vessel containing the solution). For example, a comparison of FIG. 11 with FIG. 7 shows that the rate of the reaction utilising the fritted gas apparatus appears to be faster than that the delivery of the trigger via a narrow gauge steel tube, although it is accepted that different additives are being compared. This may be because the fritted glass apparatus is more efficiently flushed with $CO_2$ than the beaker used in the conductivity tests.

Example 8: Emulsion Formation and Disruption of Solutions Comprising a Surfactant and Switchable Amine Additive Three vials were prepared, each containing 0.462 g N,N,N',N'-tetramethyl-1,4-diaminobutane (TMDAB) in 4 ml water (giving a 0.80 molal solution) and 20 mg SDS (sodium dodecyl sulfate, a nonswitchable surfactant) at 0.50 wt % loading. To each vial n-decanol (0.25 ml) was added and the vials were capped with rubber septa. FIG. 13, photograph "A" shows the three vials at this stage in the experiment. In each vial, there are two liquid phases. The lower liquid aqueous phase has a larger volume and is transparent and colourless. The upper liquid n-decanol phase has a smaller volume and is also colourless though is is not as transparent. n-Decanol is not miscible with neat water.

The three vials were then shaken by hand for 30 seconds. FIG. 13, photograph "B" shows the appearance after the shaking. All three vials show an opaque liquid mixture with cloudiness and foaming typical of an emulsion, which is as expected because of the presence of the known surfactant SDS.

Gases were then bubbled through the solutions for 30 min via a narrow gauge steel needle inserted through the septum and down into the liquid mixture. For each vial, gas was allowed to vent out of the vial via a short second needle inserted into the septum but not into the liquid phase. The gas was $CO_2$ for the left vial and $N_2$ for the centre and right vials. FIG. 13, photograph "C" shows the appearance after the treatment with gas. Only the right two vials show the cloudiness typical of an emulsion. The liquid in the left vial is now clear and free of foam, showing that the conversion of the aqueous solution to its high-ionic strength form has greatly weakened the ability of the SDS to stabilize emulsions and foams. The liquid contents of the centre and right vials still show the cloudiness and foaminess typical of an emulsion, indicating that bubbling $N_2$ gas through the solution does not have the effect of weakening the ability of SDS to stabilize emulsions and foams. This is because $N_2$ had no effect on the ionic strength of the aqueous phase.

While the left vial was allowed to sit for 30 min without further treatment. $CO_2$ gas was bubbled through the liquid phase of the centre vial for 30 min and $N_2$ was bubbled through the right vial. FIG. 13, photo "D" shows the appearance of the three vials after this time. The liquids in the left and centre vials are now largely clear and free of foam, showing that the conversion of the aqueous solution to its high-ionic strength form has greatly weakened the ability of the SDS to stabilize emulsions and foams. The emulsion and foam still persist in the right vial.

$N_2$ gas was bubbled through the liquid phases of the left and centre vials for 90 min in order to remove $CO_2$ from the system and thereby lower the ionic strength of the aqueous solution. The two vials were then shaken for 30 min. During this gas treatment and shaking, the right vial was left untouched. FIG. 13, photograph "E" shows the appearance of the three vials after this time. AN three exhibit the cloudiness typical of an emulsion, although foaminess in the left two vials is not evident, presumably because the conversion of the aqueous solution back to a low ionic strength is not complete, in practice, substantial conversion to low ionic strength is not difficult. However, it can be more difficult to achieve complete conversion.

Example 9: Description of Ionic Strength

The ionic strength of an aqueous solution of the salt will vary depending upon the concentration of the salt and the charge on the ammonium ion. For example, an amine B having n sites which can be protonated by carbonic acid to provide a quaternary ammonium cation of formula $[BH_n^{n+}]$, may have a switching reaction shown in reaction (1):

$$B + nH_2O + nCO_2 \rightleftharpoons [BH_n^{n+}] + n[{}^-O_3CH] \qquad \text{reaction (1)}$$

If the molality of the amine in aqueous solution is m, the ionic strength l of the ionic solution after switching can be calculated from equation (C):

$$l = \tfrac{1}{2} m(n^2 + n) \qquad (C)$$

Thus, for a given molality m, the ionic strength of a diprotonated diamine (n=2) will be three times that of a monoprotonated monoamine (n=1). Similarly, the ionic strength of a triprotonated triamine (n=3) will be six times that of that of a monoprotonated monoamine and the ionic strength of a tetraprotonated tetramine (n=4) will be ten times that of a monoprotonated monoamine. Thus, by increasing the number of tertiary amine sites in the compound of formula (1) which can be protonated by the trigger, the ionic strength of a solution comprising the corresponding salt of formula (2) can be increased, for a given concentration.

Not all the basic sites on a compound of formula (1) may be capable of protonation by a gas which generates hydrogen ions in contact with water. For instance, when the gas is $CO_2$, the equilibrium between $CO_2$ and water and the dissociated carbonic acid, $H_2CO_3$ is shown in reaction (2):

$$CO_2 + H_2O \rightleftharpoons H^+ + HCO_3^- \qquad \text{reaction (2)}$$

The equilibrium constant, $K_a$ for this acid dissociation is calculated from the ratio $$\frac{[H^+][HCO_3^-]}{[CO_2]}$$

at equilibrium—in dilute solutions the concentration of water is essentially constant and so can be omitted from the calculation. The equilibrium constant $K_a$ is conventionally converted into the corresponding $pK_a$ value by equation (D):

$$pK_a = -\log K_a \qquad (D)$$

The $pK_a$ for reaction (2) is 6.36. The corresponding equilibrium for the dissociation of a protonated amine base $BH^+$ (i.e. the conjugate acid) is provided by reaction (3), $$BH^+ \rightleftharpoons H^+ + B \qquad \text{reaction (3)}$$

The equilibrium constant $K_{aH}$, for the conjugate acid $BH^+$ dissociation is calculated by the ratio $$\frac{[B][H^+]}{[BH^+]}.$$

The equilibrium constant $K_{aH}$ is conventionally converted into the corresponding $pK_{aH}$ value analogously to equation (D). From the foregoing, it will be apparent that the equilibrium constant for the switching reaction shown in reaction (1) above in which n=1 can be calculated from the ratio $$\frac{[BH^+][HCO_3^-]}{[B][CO_2]},$$

which is equivalent to $$\frac{K_a}{K_{aH}}.$$

The ratio $$\frac{K_a}{K_{aH}}$$

can also be expressed in terms of the corresponding pK values as $10^{pK_{aH} - pK_a}$. Thus, in the case of the dissociation of $CO_2$ in water, if the $pK_{aH}$ value of the conjugate acid $BH^+$ exceeds 6.36, the ratio $$\frac{[BH^+][HCO_3^-]}{[B][CO_2]}$$

is greater than 1, favoring the production of ammonium bicarbonate. Thus, it is preferred that a salt as used herein comprises at least one quaternary ammonium site having a $pK_{aH}$ greater than 6 and less than 14. Some embodiments have at least one quaternary ammonium site having a $pK_{aH}$ in a range of about 7 to about 13. In some embodiments the salt comprises at least one quaternary ammonium site having a $pK_{aH}$ in a range of about 7 to about 11. In other embodiments, the salt comprises at least one quaternary ammonium site having a $pK_{aH}$ in a range of about 7.8 to about 10.5.

Example 10: Synthesis of Diamine and Triamine Switchable Additives

Example 10A: Synthesis of N,N,N',N'-tetraethyl-1,4-diaminobutane (TEDAB)

4.658 g (63.4 mmol) diethylamine was dissolved in 100 ml dichloromethane and cooled to 0° C. 2.339 g (15.1 mmol) succinyl chloride was added dropwise to the solution. The solution was warmed to room temperature and stirred for 18 hours.

An aqueous solution 0.80 ml concentrated HCl and 25 ml $H_2O$ was added to the mixture to wash the organic layer. The organic layer was then removed and dried with $MgSO_4$. The solvent was removed in vacuo to yield 3.443 g of N,N,N', N'-tetraethylsuccinamide in 99% yield. $^1$H NMR (400 MHz CDCl$_3$)–δ: 3.37 (q, =7 Hz, 8H), 2.69 (s, 4H), 1.20 (t, J=7 Hz, 6H), 1.11 (t, J=7 Hz, 6H), 3.443 g (15.1 mmol) of N,N,N',N'-tetraethylsuccinamide is dissolved in 100 ml THF, degassed with N$_2$ and cooled to 0° C. 61.0 ml of 2.0M LiAlH$_4$ in THF solution (122 mmol) was added dropwise to the solution. The solution was then refluxed for 6 hours.

The solution was then cooled to 0° C. and the excess LiAlH$_4$ was quenched by adding 4.6 ml H$_2$O, 4.6 ml, 15% NaOH, and 13.8 ml H$_2$O. The solution was warmed to room temperature and stirred for 12 hours. The precipitate was filtered off and washed with THF. The washings were combined with the original THF solution and dried with MgSO$_4$. The solvent was removed in vacuo to yield 2.558 g of a brown liquid resulting in a 84.6% yield of N,N,N',N'-tetraethyl-1,4-diaminobutane. $^1$H NMR (400 MHz CDCl$_3$)–δ: 2.55 (q, =7 Hz, 8H), 2.41 (t, J=7 Hz, 4H), 1.43 (t, J=7 Hz, 4H), 1.02 (t, J=7 Hz, 12H).

All other straight chain diamines, N,N,N',N'-tetrapropyl-1,4-diaminobutane and N,N'-diethyl-N,N'-dipropyl-1,4-diaminobutane, were synthesized in a similar fashion utilizing the appropriate starting materials. Succinyl chloride, diethylamine, dipropylamine, lithium aluminum hydride solution were all purchased from Sigma Aldrich and used as received. N-ethylpropylamine was purchased from Alfa Aesar and the solvents and MgSO$_4$ were purchased from Fisher and used as received.

Example 108: Synthesis of 1,1',1''-(cyclohexane-1,3,5-triyl)tris(N,N,-dimethylmethanamine) (CHTDMA)

1.997 g (9.2 mmol) 1,3,5-cyclohexane-tricarboxylic add was taken up in 40 ml dichloromethane to create a suspension. 3.84 g (29.8 mmol) oxalyl chloride and one drop of DMF were added to the solution. The solution was refluxed for 3 hours, giving a yellow solution with white precipitate. The mixture was cooled to room temperature and the solvent was removed in vacuo resulting in 2.509 g of a solid which contained both the desired 1,3,5-cyclohexane tricarbonyl trichloride and unwanted salts. $^1$H NMR (400 MHz CDCl$_3$)–δ:2.88 (t, J=9 Hz, 3H), 2.69 (d, J=13 Hz, 3H), 1.43 (q, J=13 Hz, 3H).

2.509 g of the sold mixture was taken up in 50 mi THF and cooled to 0° C. 34.5 ml of a 2.0 M dimethylamine solution in THF (69 mmol) was added. The solution was warmed to room temperature and stirred for 18 hours. The solvent was then removed in vacuo leaving a yellow solid. The solid was taken up in a solution of 2.081 g (37.1 mmol) KOH in 20 ml H$_2$O. Organic contents were then extracted with 3×40 ml chloroform washings. The organic washings were collected and the solvent removed in vacuo to yield 1.930 g of a yellow liquid, N,N,N',N',N'',N''-hexamethylcyclohexane-1,3,5-tricarboxamide in 70.2% yield. $^1$H NMR (400 MHz CDCl$_6$)–δ: 3.06 (s, 9H), 2.92 (s, 9H), 2.65 (q, J=8.15 Hz, 3H), 1.86 (t, J=8 Hz, 8H), 1.930 g (6.5 mmol) of N,N',N',N'',N''-hexamethylcyclohexane-1,3,5-tricarboxamide was dissolved in 80 ml THF and cooled to 0° C. 42.0 ml of 2.0M LiAlH$_4$ in THF solution (84 mmol) was added dropwise to the solution. The solution was then refluxed for 6 hours.

The solution was then cooled to 0° C. and the excess LiAlH$_4$ was quenched by adding 3.2 ml H$_2$O, 3.2 ml 15% NaOH, and 9.6 ml H$_2$O. The solution was warmed to room temperature and stirred for 12 hours. The precipitate was filtered off and washed with THF. The washings were combined with the original solution and dried with MgSO$_4$. The solvent was removed in vacuo to yield 1.285 g of a yellow liquid resulting in a 54.4% yield of 1,1',1''-(cyclohexane-1,3,5-triyl)tris(N,N,-dimethylmethanmine). $^1$H NMR (400 MHz CDCl$_3$)–δ: 2.18 (s, 18H), 2.07 (d, J=7 Hz, 8H), 1.89 (d, J=12 Hz, 3H), 1.52, (m, J=4.7 Hz, 3H), 0.48 (q, J=12 Hz, 3H). M$^+$=255.2678, Expected=255.2674.

Other cyclic triamines, N,N,N',N',N'',N''-1,3,5-benzenetrimethanamine, were synthesized in a similar fashion utilizing the appropriate starting materials. 1,3,5-benzenetricarbonyl trichloride was purchased from Sigma Aldrich and used as received. 1,3,5-cyclohexanetricarboxylic acid was purchased from TCI and used as received.

Example 11: Controlling the Zeta Potential of Suspended Clay Particles in Water

In a suspension of solid particles in a liquid, a zeta potential near to zero indicates that the particles have little effective surface charge and therefore the particles will not be repelled by each other. The particles will then naturally stick to each other, causing coagulation, increase in particle size, and either settling to the bottom of the container or floating to the top of the liquid. Thus the suspension will not normally be stable if the zeta potential is near zero. Therefore having the ability to bring a zeta potential close to zero is useful for destabilizing suspensions such as clay-in-water suspensions. However, strategies such as addition of calcium salts or other salts are sometimes undesirable because, while these strategies do cause the destabilization of suspensions, the change in water chemistry is essentially permanent; the water cannot be re-used for the original application because the presence of added salts interferes with the original application. Therefore there is a need for a method for destabilizing suspensions that is reversible.

Experimental Methods:

Clay fines were weighed and placed into individual vials (0.025 g, Ward's Natural Science Establishment). Kaolinite and montmorilonite were used as received, but as illite day was ground into a powder using a motar and pestle. Solutions containing additives were made with deionized water (18.2 MΩ/cm, Millipore) and 10 ml was added to the clay fines. A suspension was created using a vortex mixer and subsequently dispensed into a folded capillary cell. The zeta potential was measured using a Malvern Zetasizer instrument. The errors reported on the zeta potential values were the standard deviations of the zeta potential peaks measured.

Unless specified, all carbon dioxide treatments were conducted with the aqueous solutions prior to addition to day fines. For applicable measurements, ultra pure carbon dioxide (Supercritical CO$_2$ Chromatographic Grade, Paxair) was bubbled through the solutions using a syringe.

Results:

| Illite | |
|---|---|
| Additive | Zeta Potential (mV) |
| 0.8 molal BDMAPAP | −19.1 ± 3.92 |
| 0.8 molal BDMAPAP + 1 h CO$_2$ | −1.87 |
| 0.8 molal TMDAB | −26.0 ± 3.92 |
| 0.8 molal TMDAB + 1 h CO$_2$ | −4.56 |
| 1 mM TMDAB | −39.5 ± 6.32 |
| 1 mM TMDAB + 1.5 h CO$_2$ | −4.69 ± 4.23 |
| 10 mM TMDAB | −48.2 ± 7.44 |
| 10 mM TMDAB + 1.5 h CO$_2$ | −3.12 ± 7.16 |

| Kaolinite | |
| --- | --- |
| Additive | Zeta Potential (mV) |
| 0.8 molal BDMAPAP | −24.3 ± 2.29 |
| 0.8 molal BDMAPAP + 1 h $CO_2$ | −3.99 |
| 0.8 molal TMDAB | −17.4 ± 3.92 |
| 0.8 molal TMDAB + 1 h $CO_2$ | 2.29 |
| 1 mM TMDAB | −39.6 ± 6.68 |
| 1 mM TMDAB + 1.5 h $CO_2$ | −5.03 ± 4.46 |
| 10 mM TMDAB | −50.7 ± 13.1 |
| 10 mM TMDAB + 1.5 h $CO_2$ | −3.35 ± 8.49 |

| Montmorillonite | |
| --- | --- |
| Additive | Zeta Potential (mV) |
| 0.8 molal BDMAPAP | −16.8 ± 4.64 |
| 0.8 molal BDMAPAP + 1 h $CO_2$ | −2.99 |
| 0.8 molal TMDAB | −25.8 ± 4.14 |
| 0.8 molal TMDAB + 1 h $CO_2$ | −5.52 |
| 1 mM TMDAB | −40.2 ± 6.87 |
| 1 mM TMDAB + 1.5 h $CO_2$ | −3.20 ± 4.61 |
| 10 mM TMDAB | −23.6 ± 5.68 |
| 10 mM TMDAB + 1.5 h $CO_2$ | 9.07 ± 4.18 |

For three of the clays tested, it was found that switchable wat add s TMDAB and BDMAPAP were effective additives were changing clay zeta potentials. Upon addition of $CO_2$, the absolute values of the clay zeta potentials were reduced. This effect was observed even at low concentrations of the switchable water additive (1 mM).

The data above demonstrate the ability of switchable water to affect the zeta potential of clay suspensions, however, the $CO_2$ treatments were conducted on the aqueous solutions of TMDAB before the clay fines were added (a method referred to as "switching externally"). Another experiment was performed in which $CO_2$ was bubbled through a 1 mM aqueous solution of TMDAB that already contained clay fines (a method referred to as "switching in situ"). The results with kaolinite clay are summarized in the table below.

| Kaolinite clay | | |
| --- | --- | --- |
| | Zeta Potential (mV) | |
| | Switching externally | Switching in situ |
| 1 mM TMDAB | −39.6 ± 6.68 | −38.9 ± 8.69 |
| 1 mM TMDAB + 1 h $CO_2$ | −5.03 ± 4.46 | −0.31 ± 4.15 |
| 1 mM TMDAB + 1 h $CO_2$ + 1.5 h $N_2$ At 70° C. | −25.0 ± 5.84 | −32.5 ± 6.38 |

It was observed that the magnitude of the zeta potential of the day surfaces decreased regardless of whether the switching externally method or the switching in situ method was used. In addition, the zeta potential could be restored to its original value upon treatment with nitrogen gas at 70° C.

Example 12: Reversible Destabilization of a Clay-in-Water Suspension

Three variations of clay setting experiments were conducted with 1 mM TMDAB (TCI America, Batch FIB01) to elucidate the ability of this switchable ionic strength additive to affect stability of clay suspensions.

Experiment 1

Figure 14A:
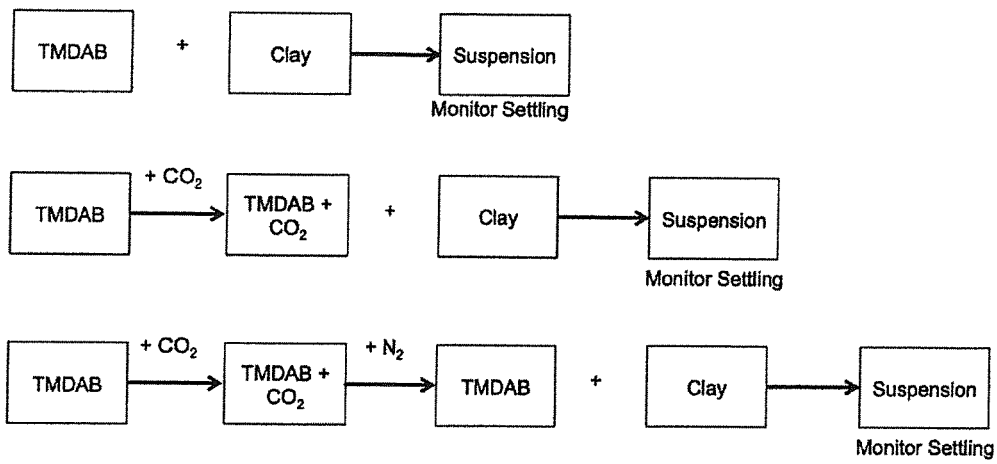
FIG. 14A-C schematically depict studies performed to monitor clay settling in switchable water according to various embodiments (FIG. 14A; Study 1 of Example 12.

As depicted in FIG. 14A, Kaolinite clay fines (5 g) were added to 100 ml of 1 mM TMDAB in deionized water. The mixture was stirred for 15 minutes at 900 rpm prior to transferring into a 100 ml graduated cylinder, which was subsequently sealed with a rubber septum. Settling of the clay fines was monitored as a function of time using a cathetometer.

$CO_2$ was bubbled through 100 ml of 1 mM TMDAB using a dispersion tube for 1 hour. Kaolinite fines (5 g) were added to the aqueous solution and the mixture was stirred for 15 minutes at 900 rpm prior to transferring into a 100 ml graduated cylinder and sealing with a rubber septum. Settling of clay fines was monitored. $CO_2$ was bubbled through 100 ml of 1 mM TMDAB using a dispersion tube for 1 hour. The solution was heated to 70° C. and $N_2$ was bubbled through for 1 hour. After cooling to room temperature, kaolinite fines (5 g) were added and the mixture was stirred 900 rpm for 15 minutes prior to transferring into a 100 ml graduated cylinder and sealing with a rubber septum. Settling of clay fines was monitored.

Experiment 2

Figure 14B:
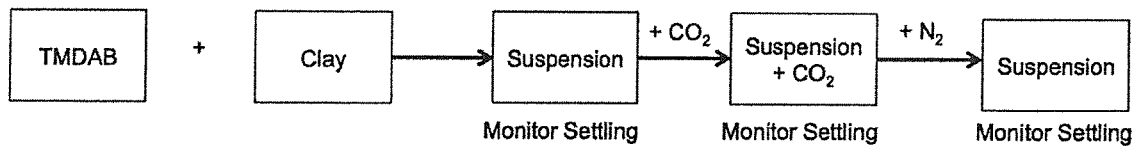

As depicted in FIG. 14B, Kaolinite day fines (5 g, Ward's Natural Science Establishment) were added to 100 ml of 1 mM TMDAB in deionized water. The mixture was stirred for 15 minutes at 900 rpm prior to transferring into a 100 ml graduated cylinder, which was subsequently sealed with a rubber septum. Settling of the clay fines was monitored as a function of time.

$CO_2$ was bubbled through the suspension above. The mixture was stirred for 15 minutes at 900 rpm prior to transferring into a 100 ml graduated cylinder, which was subsequently sealed with a rubber septum. Settling of the day fines was monitored.

The clay fines above were resuspended in the solution and the mixture was heated to 70° C. $N_2$ was bubbled through for 1 hour. After cooling to room temperature, the mixture was stirred 900 rpm for 15 minutes prior to transferring into a 100 ml graduated cylinder and sealing with a rubber septum. Settling of clay fines was monitored.

Experiment 3

Figure 14C:
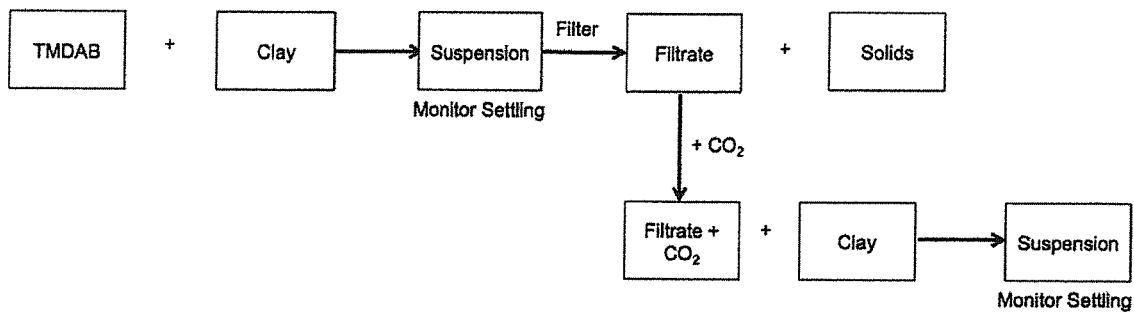

As depicted in FIG. 14C, Kaolinite clay fines (5 g, Ward's Natural Science Establishment) were added to 100 ml of 1 mM TMDAB in deionized water. The mixture was stirred for 15 minutes at 900 rpm prior to transferring into a 100 mi graduated cylinder, which was subsequently sealed with a rubber septum. Settling of the clay fines was monitored as a function of time.

The suspension above was filtered. $CO_2$ was bubbled through the filtrate for 1 hour. Kaolinite clay fines (4.5 g) were added and the mixture was stirred for 15 minutes at 900 rpm prior to transferring into a 100 ml graduated cylinder, which was subsequently sealed with a rubber septum. Settling of clay fines was monitored.

Control Experiment $CO_2$ was bubbled through 100 ml of deionized water for 1 h. Kaolinite clay (5 g) was added and the mixture was stirred for 15 minutes at 900 rpm prior to transferring into a 100 ml graduated cylinder, which was subsequently sealed with a rubber septum. Settling of clay fines was monitored.

Results

Figure 15A:
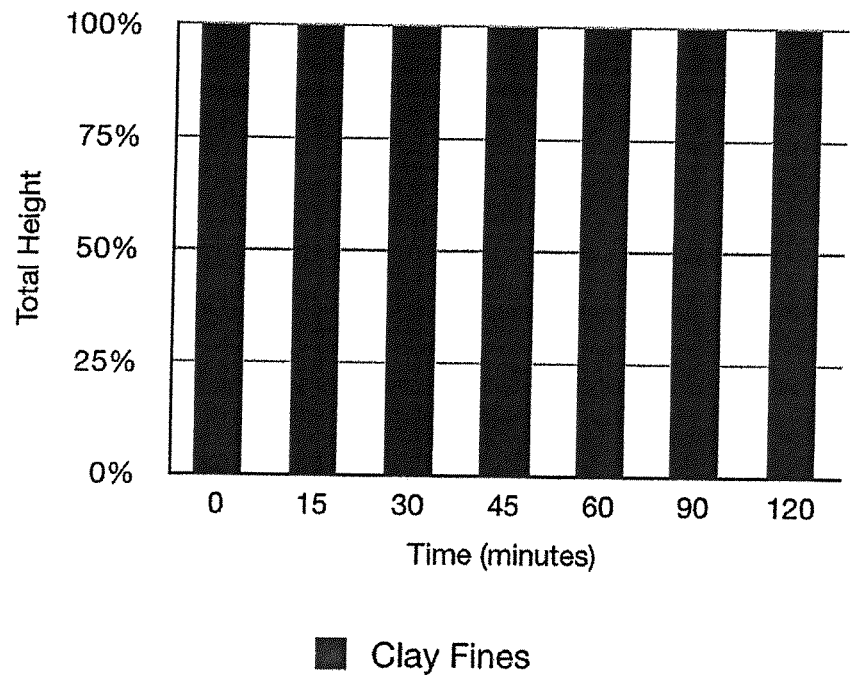
FIG. 15A-D shows the results of mixing a switchable water with kaolinite clay fines and treatment with $CO_2$ followed by treatment with $N_2$ (FIG. 15A clay+1 mM TMDAB.
Figure 15B:
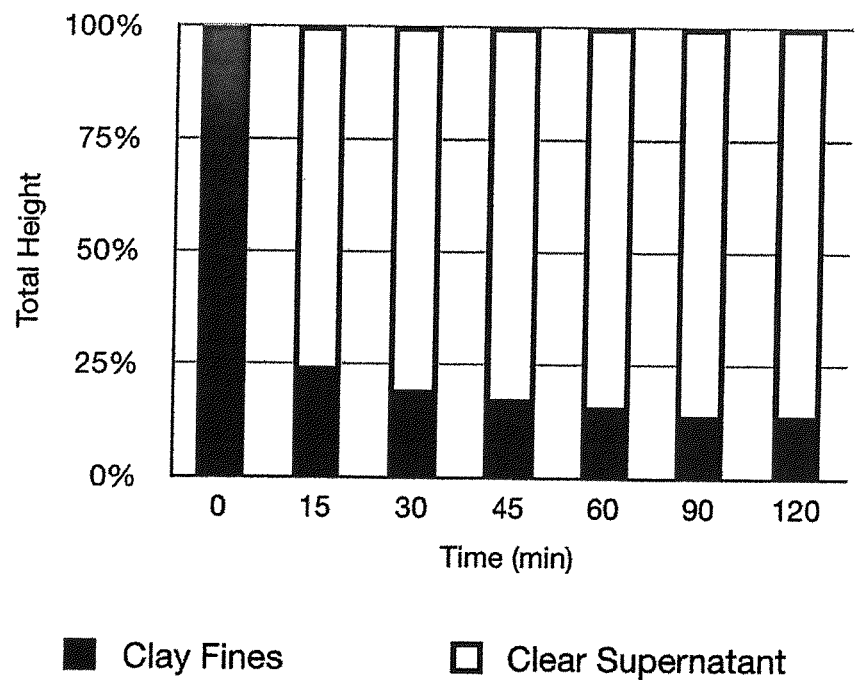
Figure 15C:
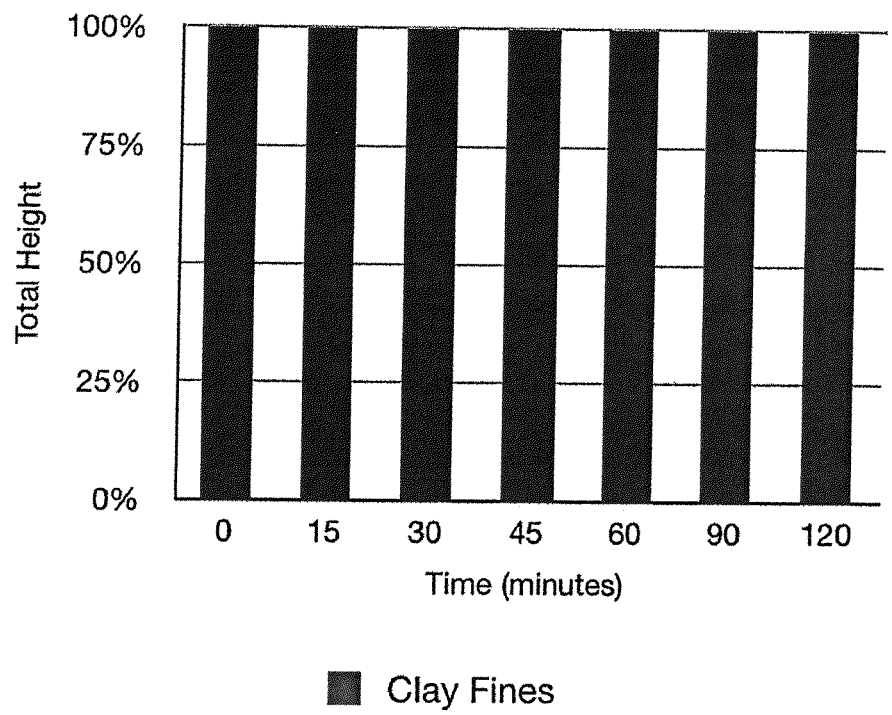

Experiment 1 was conducted to examine the effect of the switchable water additive on the settling behavior of clay. The switching was conducted in the absence of clay to ensure that the switching occurred fully without any impedance from the day. The results are plotted in FIGS. 15A-C.

Figure 15D:
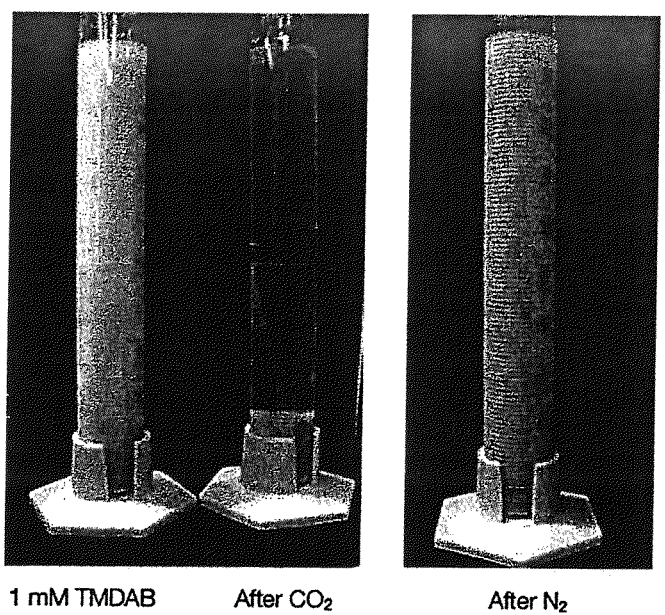

A stable suspension was formed with kaolinite clay and 1 mM TMDAB. However, kaolinite clay with 1 mM of $CO_2$ treated TMDAB resulted in the settling of clay with a clean supernatant and a clear sediment line. A stable suspension was also formed with kaolinite clay and 1 mM of TMDAB treated with 1 h of $CO_2$ followed by 1 h of $N_2$ treatment. Photographs were taken after each 1 hr treatment and are provided in FIG. 15D.

Experiment 2 was conducted to examine if the switchable water additives would still switch upon addition of $CO_2$ in the presence of kaolinite clay.

Figure 16A:
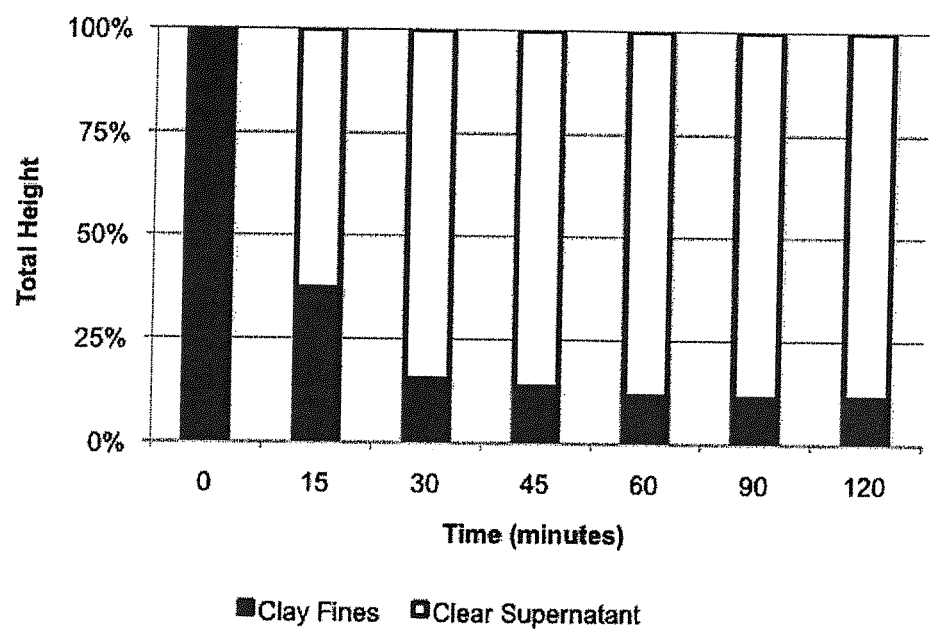
FIG. 16A-B shows the results of mixing a switchable water with kaolinite clay fines and treatment with $CO_2$ in the presence of clay (FIG. 1A clay+1 mM TMDAB after 1 h $CO_2$.
Figure 16B:
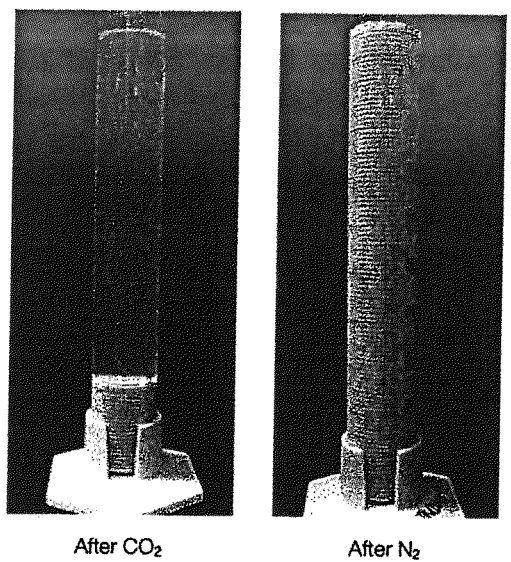
Figure 17A:
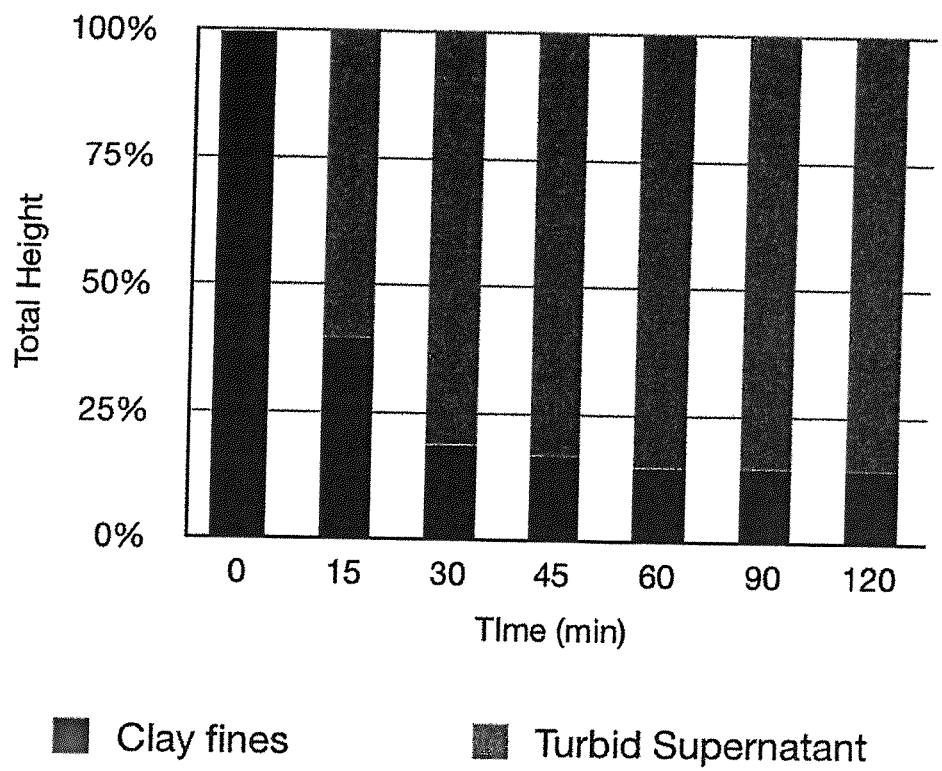
FIG. 17A-C shows the results of mixing a $CO_2$ treated filtrate (obtained from a mixture of switchable water with kaolinite clay fines) with clay (FIG. 17A 1 h $CO_2$ filtrate+clay.
Figure 17B:
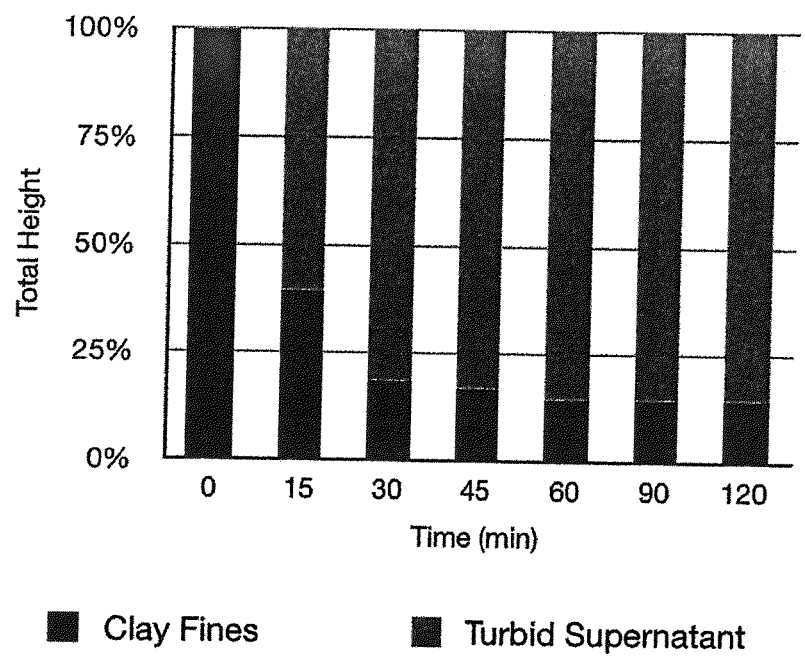
Figure 17C:
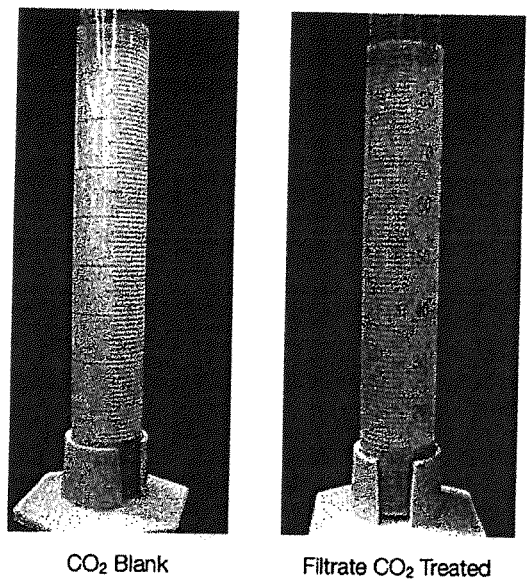

Kaolinite clay and 1 mM TMDAB were initially mixed to give a stable suspension. This suspension was treated with $CO_2$, which resulted in the settling of the clay fines with a clean supernatant and a clear sediment line. As shown in FIGS. 16A-B, the behavior observed was exactly as that observed for Experiment 1. The settled clay was stirred to reform a suspension, which was treated with $N_2$, after which the suspension was stable. Experiment 3 was conducted to determine if the switchable ionic strength additive adheres to the clay surface and would therefore be lost upon removal of the clay. The suspension created with the $CO_2$ treated filtrate settled much like the previous two experiments. A clear sediment line was observed, however, the liquid above the sediment line was turbid and still contained clay fines (See, FIGS. 17A and C). This behavior was also observed with deionized water treated with $CO_2$ in the absence of any switchable water additive (See, FIGS. 17B and C).

Example 13: The Removal of Water from an Organic Liquid 2.710 g THF ($3.76 \times 10^{-2}$ mol) and 0.342 g $H_2O$ ($1.90 \times 10^{-2}$ mol) were mixed together in a graduated cylinder to create a single phase solution of roughly 8:1 THF:$H_2O$ (w/w). 0.109 g ($7.56 \times 10^{-4}$ mol) of N,N,N'N'-tetramethyl-1,4-diaminobutane (TMDAB) was added to the solution again generating a single phase solution. The THF:TMDAB ratio was approximately 25:1 (w/w). This solution containing three components had a mol % composition as follows: 65.6 mol % THF, 33.1 mol % $H_2O$, and 1.3 mol % TMDAB.

A stir bar was added to the solution in the graduated cylinder and the cylinder was capped with a rubber septa. A long narrow gauge steel needle was inserted through the septa and into the solution. A second needle was pushed through the septa but not into the solution. $CO_2$ was bubbled into the solution through the first steel needle at a flow rate of about 5 ml min$^{-1}$ with stirring of ~300 RPM for 30 minutes. At the end of the bubbling a clear, colourless aqueous phase at the bottom of the cylinder had creamed out of the original organic phase. The organic phase was separated from the aqueous phase by decantation.

76.1 mg of the top organic phase was extracted and placed in an NMR tube. The sample was diluted with deuterated acetonitrile and 32.3 mg of ethyl acetate was added to act as an internal standard. A $^1$H NMR spectrum was acquired. Using the integration of the NMR signals of the $H_2O$ and TMDAB compared to those of the known amount of ethyl acetate added, calculated masses of 4.58 mg and 0.46 mg of $H_2O$ and TMDAB were acquired respectively. The remaining mass of 71.06 mg corresponds to the THF in the sample.

The "dried" organic THF phase had a mol % composition as follows: 79.3 mol % THF, 20.5 mol % $H_2O$ and 0.3 mol % TMDAB.

Example 14: Use of a Switchable Additive to Expel an Organic Compound Out of Water and then the Removal of Much of the Additive from the Aqueous Phase In some embodiments, the non-ionized form of the additive is water-immiscible. This makes it possible to create high ionic strength in the water, while $CO_2$ is present, in order to achieve some purpose such as the expulsion of an organic compound from the aqueous phase and then, by removing the $CO_2$, to recover the majority of the additive from the water. Here we describe the expulsion of THF from a water/THF mixture and subsequent recovery of much of the additive from the water.

1.50 g $H_2O$, 1.50 g THF, and 0.30 g N,N,N'N'-tetraethyl-1,4-diaminobutane (TEDAB) were mixed together in a graduated cylinder to generate a single phase solution. The solution had a total volume of 3.54 ml. A small stir bar was added to the solution and the cylinder was capped with a rubber septa. The following procedure was run in triplicate with a new sample (of the same contents shown above) each time.

A long, narrow gauge needle was inserted through the septa into the solution. A second small needle was inserted into the septa but not into the solution itself. $CO_2$ was bubbled through the solution a flow rate of about 5 ml/min for 45 minutes with stirring until a $2^{nd}$ phase creams out on top of the aqueous phase. The $CO_2$ bubbling was stopped and the needles withdrawn. The cylinder was immersed in a hot water bath for several seconds to facilitate the separation of the liquid phases. Both phases were clear and yellow in colour. The top organic layer had a volume of 1.50 ml and the remaining aqueous layer had a volume of 2.04 ml.

The organic phase was decanted off giving a mass of 1.253 g (density=0.84 g/m). The aqueous phase had a mass of 1.94 g (density=0.98 g/ml) resulting in a loss of 0.12 g due to transferring of solutions or blow-off.

A 39.1 mg sample of the organic phase was placed in an NMR tube with deuterated acetonitrile and 50.2 mg ethyl acetate to act as an internal standard. A 66.2 mg sample of the aqueous phase was placed in a $2^{nd}$ NMR tube with deuterated acetonitrile with 22.3 mg ethyl acetate to act as an internal standard. A $^1$H NMR spectra was acquired and knowing the corresponding amount of ethyl acetate in each sample the resulting amounts of THF in the aqueous sample and additive in the organic sample can be calculated. Knowing the mass, volume, and density of each layer, the total amount of THF or additive in a respective layer can be calculated.

It was found that an average of 77.2±3.5% THF was removed from the aqueous phase with 91.1±3.7% of the TEDAB residing in the aqueous phase. 1.943 g (1.90 ml) of the aqueous phase was returned to the same graduated cylinder. The needles and septa were put back into the cylinder and the cylinder was immersed in a 60° C., water bath. $N_2$ was introduced in the same fashion as $CO_2$ preformed previously and the $N_2$ was bubbled through the solution for 90 minutes where a deep yellow organic phase creams out of the aqueous phase.

The new organic phase had a volume of 0.17 ml leaving an aqueous phase of 1.57 ml. The organic layer was decanted off giving a mass of 0.09 g while the remaining aqueous phase had a mass of 1.507 g (density=0.96 g/ml). A 37.9 mg sample of the aqueous phase was taken up in an NMR tube with deuterated acetonitrile and 41.5 mg ethyl acetate to act as an internal standard. A $^1$H NMR spectra was acquired and using the same procedure of comparing integrations as performed above, it was found that 49.3±6.3% of the TEDAB was removed from the aqueous phase. It was also found that the overall 90.0±2.1% of the total THF had been removed from the aqueous phase at the end of the procedure.

Using N,N'-diethyl-N,N'-dipropyl-1,4-diaminobutane instead of N,N,N'N'-tetraethyl-1,4-diaminobutane (TEDAB) in the above procedure caused the expulsion of 68% of the THF from the aqueous phase after $CO_2$ treatment. After $N_2$ treatment of the separated aqueous phase, 81% of the N,N'-diethyl-N,N'-dipropyl-1,4-diaminobutane was removed from the aqueous phase.

Example 15: Determining the Miscibility of Several Diamines and Triamines with Water in the Presence and Absence of $CO_2$ In some embodiments, the non-ionized form of the additive is water-Immiscible while the charged form is water-miscible or water-soluble. The following experiments were performed in order to identify whether certain diamines and triamines have this phase behavior.

A 5:1 w/w solution of water and the liquid additive (total volume 5 m) were mixed together in a glass vial at room temperature. Whether the mixture formed one or two liquid phases was visually observed. Then $CO_2$ was bubbled through the mixture via a single narrow gauge steel needle at a flow rate of ~5 ml min$^{-1}$ for 90 min. Whether the mixture formed one or two phases was visually observed. The results were as follows:

| Additive | Before addition of $CO_2$ | After addition of $CO_2$ |
|---|---|---|
| 1,3,5-$C_6H_3(CH_2NMe_2)_3$ | miscible | miscible |
| 1,3,5-cyclo$C_6H_9(CH_2NMe_2)_3$ | immiscible | miscible |
| $Et_2NCH_2CH_2CH_2CH_2NEt_2$ | immiscible | miscible |
| $PrEtNCH_2CH_2CH_2CH_2NPrEt$ | immiscible | miscible |
| $Pr_2NCH_2CH_2CH_2CH_2NPr_2$ | immiscible | immiscible |

Example 16: Preparation and Use of a Polyamine for Expulsion of Acetonitrile from Water

Example 16A: Preparation of the Polyamine

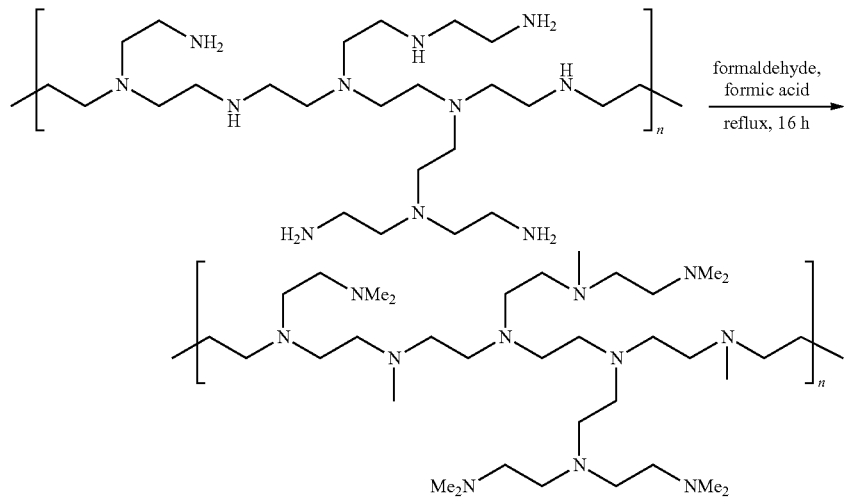

Polyethyleneimine samples of three different molecular weights (M.W. 600, 99%; M.W. 1800, 99%; and M.W. 10,000, 99%) were purchased from Alfa Aesar. Formaldehyde (37% in $H_2O$) and formic acid were purchased from Sigma-Aldrich. AD reagents were used without further purification. Amberlite™ IRA-400 (OH) ion exchange resin was purchased from Supelco.

For the samples using polyethylenelmine M.W. 600 and 1800: A 250 ml round bottom flask was equipped with a 2 cm teflon sirring bar and placed over a magnetic stirring plate. 1.8 g (M.W. 600: 3.0 mmol, 1 eq. M.W. 1800:1.0 mmol, 1 eq) of the polyethylenelmine were placed in the flask and 9.73 ml (120 mmol: M.W. 600: 40 eq and M.W. 1800 120 eq) formaldehyde solution and 4.53 ml (120 mmol: M.W. 600:40 eq and M.W. 1800 120 eq) formic acid were added. The flask was equipped with a condenser and the reaction mixture was heated to 60° C. for 16 h with an oil bath. After 16 h the mixture was allowed to cool to room temperature and the solvents were removed under reduced pressure. Then, the crude product was dissolved in 20 ml EtOH anhydrous and 4 g of Amberlite resin was added to the solution. The resulting mixture was stirred for 4 h or for 16 h at room temperature before the resin was filtered of and the EtOH was removed under reduced pressure. The methylated polymer was obtained as a dark yellow oil (1.8 g from the M.W. 600 sample and 1.7 g from the M.W. 1800 sample).

For the sample using polyethyleneimine M.W. 10.000: A 250 ml round bottom flask was equipped with a 2 cm teflon stirring bar and placed over a magnetic stirring plate. 1.8 g (1.0 mmol, 1 eq) of the polyethylenelmine were placed in the flask and 9.73 ml (120 mmol, 120 eq) formaldehyde solution and 4.53 ml (120 mmol, 120 eq) formic acid were added. The flask was equipped with a condenser and the reaction mixture was heated to 60° C. for 16 h with an oil bath. After 16 h the mixture was allowed to cool to room temperature and the solvents were removed under reduced pressure. Then, the crude product was dissolved in 20 ml EtOH anhydrous and 4 g of Amberlite resin was added to the solution. The resulting mixture was stirred for 16 h at room temperature before the resin was filtered of and the EtOH was removed under reduced pressure. The resulting crude product was dissolved in 10 ml $CH_2Cl_2$ and 10 ml of a 2 M aqueous solution of NaOH in water. The phases were separated and the aqueous layer was extracted three times with 10 ml of $CH_2Cl_2$. The organic phases were dried over $MgSO_4$ and the $CH_2Cl_2$ was removed under reduced pressure to yield the methylated polyethylenelmine as a yellow oil.

Methylated polyethylenelmine (M.W. 600 before methylation):

$^1$H NMR (CDCl$_3$, 400 MHz): δ [ppm]=2.18-2.91 (m), no NH signal appear in the spectra $^{13}$C NMR (CDCl$_3$, 100.7 MHz): δ [ppm]=42.2 (q), 44.1 (q), 44.4 (q), 50.5-56.0 (m, t) Methylated polyethylenelmine (M.W. 1800 before methylation)

$^1$H NMR (CDCl$_3$, 400 MHz): δ [ppm]=2.16 (s, CHs), 2.23 (bs, CHs), 2.44-2.64 (m), no NH signal appear in the spectra $^{13}$C NMR (CDCl$_3$, 100.7 MHz): δ [ppm]=41.5 (q), 44.0 (q), 50.8-51.1 (m, t), 53.7 (t), 55.0 (t)

Methylated polyethyleneimine (M.W. 1800 before methylation)

$^1$H NMR (CDCl$_3$, 400 MHz): δ [ppm]=2.18 (s, CH$_3$), 2.21 (s, CH$_3$), 228-2.62 (m), no NH signal appear in the spectra $^{13}$C NMR (CDCl$_3$, 100.7 MHz): δ [ppm]=42.9 (q), 43.0 (q), 45.9 (q), 46.0 (q), 52.8-54.0 (m, t), 55.8-56.9 (m, t). 57.2-57.8 (m, t)

Example 16B; Use of the Polyamine to Expel Acetonitrile from Water

The methylated polyamines were investigated as additives for switchable ionic strength solutions. To measure the extent of acetonitrile being forced out of an aqueous phase by an increase in ionic strength, and the amounts of amine, which remained in the aqueous phase, 1:1 w/w solutions of acetonitrile and water (1.5 g each) were prepared in graduated cylinders. 300 mg of the non-ionic polyamine additive were added and the cylinders were capped with rubber septa. After 30 min of bubbling carbon dioxide through the liquid phase from a single narrow gauge steel needle at room temperature, a visible phase separation was observed. The volumes of each phase were recorded. Aliquots of the non-aqueous and aqueous layers were taken and dissolved in D$_2$O in NMR tubes. A known amount of ethyl acetate or dimethylformamide (DMF) was added to each NMR tube as an internal standard. $^1$H NMR spectra were acquired and through integration of the ethyl acetate or DMF standard, a concentration of acetonitrile or additive was calculated and scaled up to reflect the total volume of the aqueous or non-aqueous phase giving a percentage of the compound being forced out. The results are shown in the following table.

| polyethyleneimine | Acetonitrile forced out |
|---|---|
| M.W. 600 | 56% |
| M.W. 1800 | 72% |
| M.W. 10000 | 77% |

99.9% of the polyamine was retained in the aqueous phase.

Argon was then bubbled through the solution while heating to 50° C. until the two phases recombined into a single phase (typically 30 min). Bubbling CO$_2$ through the mixture again for 30 min caused the liquid mixture to split into two phases and a subsequent bubbling of argon for 30 min caused the two phases to merge again, which shows that the process was fully reversible.

Example 17: Preparation and Use of a Tetraamine for Expulsion of THF from Water

Example 17A: Preparation of the tetraamine

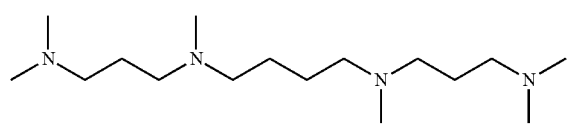

Spermine (97% purity) was purchased from Alfa Aesar, formaldehyde (37% in H$_2$O), Zn powder from Sigma-Aldrich and acetic acid from Fisher Scientific.

A 250 ml round bottom flask was equipped with a 2 cm teflon stirring bar and placed over a magnetic stirring plate. 2.02 g (10 mmol, 1.0 eq) spermine were placed in the flask and dissolved in 40 ml water. Afterwards, 9.72 ml (120 mmol, 12.0 eq) formaldehyde solution and 13.7 ml (240 mmol, 24.0 eq) acetic acid were added and the solution was allowed to stir at room temperature for 15 min. Afterwards, 7.84 g (120 mmol, 12.0 eq) Zn powder were added in small portions, which resulted in gas formation. A cold water bath was used to maintain the temperature in the flask under 40° C. After complete addition the reaction mixture was vigorously stirred for 16 h at room temperature. 20 ml NH$_3$-solution were added and the aqueous phase was extracted with ethyl acetate in a separation funnel (3 times 25 ml).

The combined organic layers were dried over MgSO$_4$, filtered through filter paper removed under reduced pressure. The crude product was purified by high vacuum distillation to yield 1.3 g (4.5 mmol, 42%) of a yellow oil which was formally called N$^1$,N$^{1'}$-(butane-1,4-diyl)bis(N$^1$,N$^2$,N$^3$-trimethylpropane-1,3-diamine). As used herein, this compound is referred to as MeSpe (i.e. methylated spermine).

$^1$H NMR (CDCl$_3$, 400 MHz): δ [ppm]=1.36-1.44 (m, 4H, CH$_2$), 1.55-1.66 (m, 4H, CH$_2$), 2.18 (s, 6H, CH$_3$), 2.19 (s, 12H, CH$_3$), 2.21-2.27 (m, 4H, CH$_2$), 2.28-2.35 (m, 8H, CH$_2$);

$^{13}$C NMR (CDCl$_3$, 100.7 MHz): δ [ppm]=25.3 (t), 25.7 (t), 42.3 (q), 45.6 (q), 55.8 (t), 57.8 (t), 58.0 (t):

MS (EI): m/z (%)=287.32 (7), 286.31 (41) [M]$^+$, 98.08 (28), 86.08 (44), 85.07 (100), 84.07 (41):

HRMS (EI): calc. for [M]$^+$: 286.3097, found: 288.3091.

Example 17B; Reversible Solvent Switching of Tetramine/Water System

The methylated spermine was investigated as additive for switchable ionic strength solutions. To measure the extent of THF being forced out of an aqueous phase by an increase in ionic strength, and the amounts of amine, which remained in the aqueous phase, 1:1 w/w solutions of THF and water were prepared in graduated cylinders. The appropriate mass of amine additive to result in a 0.80 molal solution was added and the cylinders were capped with rubber septa. After 30 minutes of bubbling carbon dioxide through the liquid phase rom a single narrow gauge steel needle, a visible phase separation was observed. The volumes of each phase were recorded. Aliquots of the non-aqueous and aqueous layers were taken and dissolved in d$_3$-acetonitrile in NMR tubes. A known amount of ethyl acetate was added to each NMR tube as an internal standard. $^1$H NMR spectra were acquired and through integration of the ethyl acetate standard, a concentration of THF or additive was calculated and scaled up to reflect the total volume of the aqueous or non-aqueous phase giving a percentage of the compound being forced out or retained. Then argon was bubbled through the solution while heating to 50° C. until the two phases recombined (15 to 60 min). The whole switching process (30 min CO$_2$, sample take, then another 30 min of Ar) was repeated. The results are shown in the following table.

Salting Out-Experiments Using Methylated Spermine (MeSpe)

| run | THF forced out | Additive retained in THF |
|---|---|---|
| 1 | 84.3% | 99.85% |
| 2 | 85.5% | 99.79% |

Example 17C: NMR Measurement of the Degree of Protonation of Methylated Spermine by Carbonated Water The degree of protonation of the tetraamine (methylated spermine) upon contact with a carbon dioxide trigger was investigated by $^1$H NMR.

In order to establish the chemical shifts of the protonated bases, molar equivalents of several strong acids, including HCl and HNO$_3$, were added to separate solutions of the tetraamine dissolved in D$_2$O. $^1$H NMR spectra were acquired on a Bruker AV-400 NMR spectrometer at 400.3 MHz for three replicate solutions of the amine. An average value of each chemical shift for each protonated base was calculated along with standard deviations. If the base when reacted with the trigger to ionic salt form showed chemical shifts within this error range, it was considered to be 100% protonated within experimental error. The $^1$H NMR chemical shifts of the unprotonated amine were also measured.

The extent of protonation of the additive at room temperature at 0.1 M (in D$_2$O was monitored by $^1$H NMR. The amine was dissolved in D$_2$O in an NMR tube and sealed with a rubber septa. The spectrum was then acquired. Subsequently, two narrow gauge steel needles were inserted and gas was gently bubbled through one of them into the solution at approximately 4-5 bubbles per second. The second needle served as a vent for the gaseous phase.

Firstly CO$_2$ was bubbled through the solution for the required length of time and then the spectrum was re-acquired. This process was repeated. The % protonation of the amine was determined from the observed chemical shifts by determining the amount of movement of the peaks from the normal position for the unprotonated amine towards the position expected for the fully protonated amine.

The results show that the tetraamine was protonated to a degree of 93%.

Example 18: Osmotic Desalination System

Figure 18:
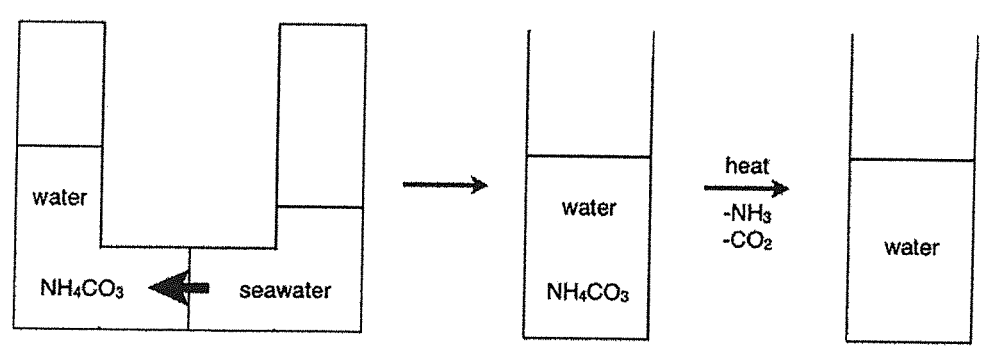
FIG. 18 depicts a standard system for seawater desalination using forward osmosis.

Water desalination by reverse osmosis is energetically costly. An alternative that has been proposed in the literature is forward osmosis (FIG. 18), where water flows across a membrane from seawater into a concentrated ammonium carbonate solution (the "draw solution"). Once the flow is complete, the draw solution is removed from the system and heated to eliminate the NH and CO$_2$. The principle costs of the process are the energy input during the heating step and the supply of make-up ammonium carbonate. The limiting factors for the technology are, according to a 2006 review of the field (Cath, T. Y.; Childress, A. E.; Elimelech, M. *J. Membrane Sci.* 2006, 281, 70-87), a "lack of high-performance membranes and the necessity for an easily separable draw solution."

Described in this example is a new easily separable draw solution, which takes advantage of the present method of reversibly converting a switchable water from low to high ionic strength. The osmotic pressure of a switchable water should dramatically rise as the conversion from low ionic strength to high ionic strength takes place. Although the osmotic pressures of the solution before and after CO$_2$ have not been measured, literature data (Cath, T. Y.; Childress, A. E.; Elimelech, M. *J. Membrane Sci.* 2006, 281, 70-87) show that the osmotic pressure of a 4 M solution of a neutral organic such as sucrose is much lower (about 130 atm) than the osmotic pressure of a salt containing a dication such as MgCl$_2$ (800 atm). This reversible change in osmotic pressure can be used in a method for desalination of water as depicted in FIG. 19.

Figure 19:
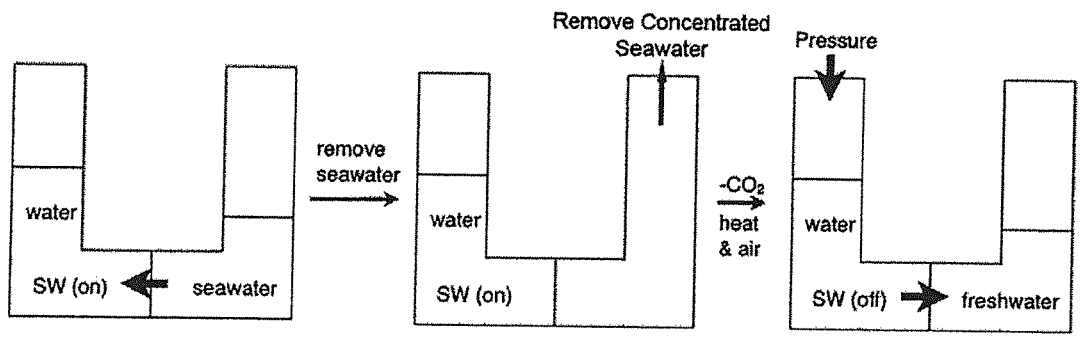
FIG. 19 depicts a system and process for desalination by forward osmosis followed by reverse osmosis using a switchable water ("SW on" refers to the bicarbonate form of the switchable water and "SW off" refers to the non-ionized form of the switchable water).

The process depicted in FIG. 19 employs a switchable water solution in its ionic form as the draw solution. After forward osmosis, the seawater is removed and the CO$_2$ is removed from the switchable water solution, dropping the osmoic pressure dramatically. Reverse osmosis produces fresh water from the switchable water solution with little energy requirement because of the low osmotic pressure.

The key advantages of this process over conventional forward osmosis are the expected lower energy requirement for the heating step (see Table of expected energy requirements below) and the facile and complete recycling of the amine. The key advantage of the proposed process over conventional reverse osmosis is the much lower pressure requirement during the reverse osmosis step.

| Process step | Energy requirement for process with NH$_4$CO$_3$, kJ/mol | Energy requirement for proposed process, kJ/mol |
| --- | --- | --- |
| Deprotonation of NH$_4^+$ or NR$_3$H$^+$ | 52.3[3] | 36.9[3] |
| Removal of CO$_2$ from water | 19.4 | 19.4 |
| Removal of NH$_3$ from water | 30.5 | 0 |
| Reverse osmosis step | 0 | unknown |
| TOTAL | 102.2 | >56.3 |

[3]Mucci, A.; Domain, R.; Benoit, R. L. *Can. J. Chem.* 1980, 58, 953-958.

Figure 20:
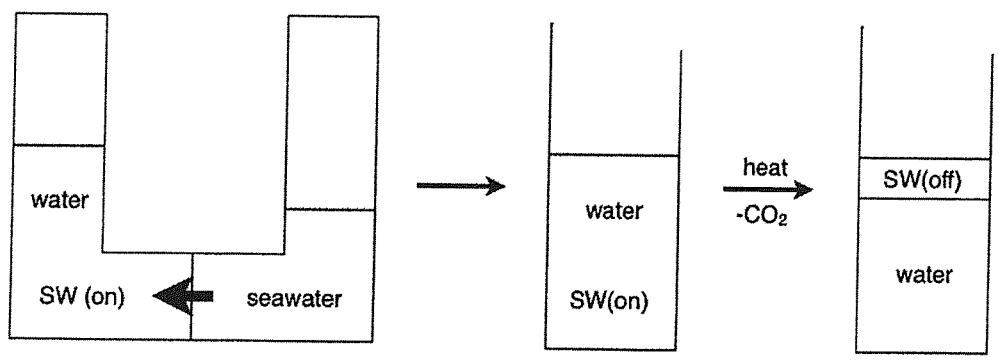
FIG. 20 depicts an alternative system and process for desalination by forward osmosis followed by removal of $CO_2$ (by heat or bubbling of a non-acidic gas) causing separation of much or all of the additive from the water, using a switchable water ("SW on" refers to the bicarbonate form of the switchable water and "SW off" refers to the non-ionized form of the switchable water). In such a process, if the separation of the switchable water additive from the water is incomplete, reverse osmosis or nanofiltration can be used to remove the remaining additive from the water.

A modification of this process, shown in FIG. 20, differs only in the last step, where the switchable water additive in the solution is switched "off", or back to its nonionic form, and then removed by a method other than reverse osmosis. For example, if the non-ionic form of the additive is insoluble or immiscible with water, then it can be removed by filtration or decantation, with any small amounts of remaining additive in the water being removed by passing the water through silica. Results have shown successful use of such a separation process.

Example 19: Preparation and Use of a Diamidine for Expulsion of THF from Water

Example 19A' Preparation of the diamidine

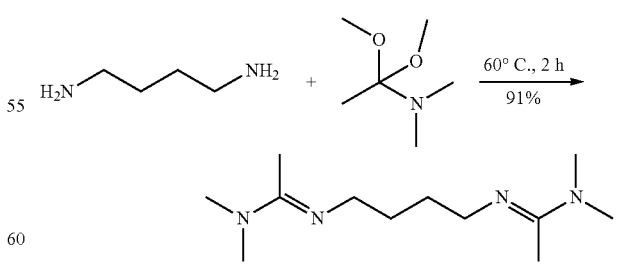

1,4-Diaminobutane was purchased from Sigma-Aldrich and dimethylacetamide dimethylacetale was purchased from TCI.

A 100 ml flask was equipped with a condenser and a 1 cm stirring bar and was then placed over a stirplate. 1.14 ml (1.0 g, 11.3 mmol, 1 eq.) of 1,4-diaminobutane and 3.64 ml (3.31 g, 24.9 mmol, 2.2 eq.) of dimethylacetamide dimethylacetale were the placed into the flask. The reaction mixture was then stirred with 600 rpm and heated to 60° C. After 2 h the reaction mixture was allowed to cool to room temperature and the resulting methanol was removed under reduced pressure to yield a yellow oil. This crude product was then purified by high vacuum distillation. The pure product was obtained as a light yellow oil (2.32 g, 10.2 mmol, 91%). The compound was called N,N-(butane-1,4-diyl)bis(N,N-dimethylacetimidamide) and in this application was referred to as 'DIAC' (i.e. diacetamidine)

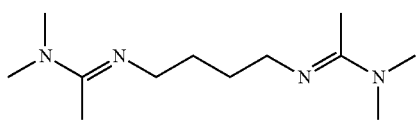

$^1$H NMR (CDCl$_3$, 400 MHz): δ [ppm]=1.45-1.53 (m, 4H, CH$_2$), 1.80 (s, 3H, CCH$_3$), 2.79 (s, 6H, N(CH$_3$)$_2$), 3.09-3.19 (m, 4H, CH$_2$);
$^{13}$C NMR (CDCl$_3$, 100.7 MHz): δ [ppm]=12.3 (q, CCH$_3$), 30.2 (t, CH$_2$), 37.9 (q, 2C, N(CH$_3$)$_2$), 50.0 (t, CH$_2$), 158.7 (s); MS (EI): m/z (%)=227.22 (3), 226.21 (21), 198.16 (7), 182.17 (7), 141.14 (14), 140.13 (21), 128.11 (10), 127.10 (30), 114.11 (23), 113.11 (28), 112.09 (52), 99.09 (27), 70.07 (45), 56.05 (100);
HRMS (EI): calc. for [M]$^+$: 226.2157, found: 228.2161.

Example 17B: Reversible Solvent Switching of Diamidine/Water System

The diamidine was investigated as additive for switchable ionic strength solutions. To measure the extent of THF being forced out of an aqueous phase by an increase in ionic strength, and the amounts of amine, which remained in the aqueous phase, 1:1 w/w solutions of THF and water were prepared in graduated cylinders. The appropriate mass of amine additive to result in a 0.80 molal solution was added and the cylinders were capped with rubber septa. After 30 minutes of bubbling carbon dioxide through the liquid phase from a single narrow gauge steel needle, a visible phase separation was observed. The volumes of each phase were recorded. Aliquots of the non-aqueous and aqueous layers were taken and dissolved in d$_3$-acetonitrile in NMR tubes. A known amount of ethyl acetate was added to each NMR tube as an internal standard. $^1$H NMR spectra were acquired and through integration of the ethyl acetate standard, a concentration of THF or additive was calculated and scaled up to reflect the total volume of the aqueous or non-aqueous phase giving a percentage of the compound being forced out or retained. The results showed that the amount of THF forced out of the aqueous phase was 54.5% and the amount of additive retained in the aqueous phase was 99.5%

Then argon was bubbled through the solution while heating to 50° C. until the two phases recombined (15 to 60 min).

Example 20: Precipitation of an Organic Solid Using Switchable Water

Ten millilitres of water was pipetted into a glass centrifuge tube along with 2.038 g TMDAB (~5:1 w/w solution). 68.2 mg of (+)-camphor (used as is from Sigma-Aldrich) was added to the solution. The solution was heated in a 70° C., water bath to expedite the dissolution of the camphor. After complete dissolution of the solid (camphor) and cooling to room temperature (23° C.), the solid remained dissolved in the aqueous solution.

The centrifuge tube was capped with a rubber septum. CO$_2$ was introduced into the solution via a single narrow gauge steel needle at a flow rate of about 5 mL min$^{-1}$. A second needle was inserted into the tube, but not into the solution, to act as a gas outlet. After 30 minutes of bubbling CO$_2$ through the solution a white precipitate appeared throughout the aqueous solution.

The solution was centrifuged for 5 minutes, using a Fisher Scientific Centrific 228 centrifuge at a speed of 3300 RPM, such that all the white solids collected at the top of the aqueous solution. The white solids were collected by vacuum filtration and weighed on a Mettler-Toledo AG245 analytical balance. A mass of 24.0 mg was obtained, resulting in a 35.2% recovery of the original dissolved solid.

Example 21: Primary Amines as Switchable Additives

Primary amines were tested as switchable water additives. The switching of the non-ionized form to the charged form (which is probably a mixture of bicarbonate and carbamate salts) proceeded well. The separation of an organic liquid was observed. However, conversion of the ionic form back to the non-ionized form was unsuccessful. Primary amines are therefore only useful as additives in applications where a single switch to the ionic form, without conversion back to the non-ionized form, is sufficient. Thus, primary amine additives are not reversibly "switchable".

Example 21A: Ethanolamine (5:5:1)

In a glass vial, 5.018 g H$_2$O, 1.006 g ethanolamine, and 4.998 g THF were mixed to generate a single phase, clear, colourless solution. A stir bar was added to the vial and the vial was capped with a rubber septa. CO$_2$ was introduced into the solution via a single narrow gauge steel needle at a flow rate of about 5 mL min-. A second needle was inserted through the septa, but not into the solution, to act as a gas outlet. CO$_2$ was bubbled through the solution for 20 minutes until two liquid phases (aqueous and organic) were observed. It was found by $^1$H NMR spectroscopy that ~62% of the THF was forced out of the aqueous phase into the new organic phase.

The two phase mixture was then placed in a 60° C., water bath while N$_2$ was bubbled through the mixture in a fashion similar to the previous bubbling of CO$_2$. This was performed for 60 minutes. Although some THF boiled off, the two phases did not recombine. The temperature was increased to 75° C. for 30 minutes which appeared to boil off the remainder of the THF as the volume returned to that of the water and amine mixture. Some ethanolamine may have boiled off as well. At this point, a single liquid phase was observed, as the THF was boiled off, however, the phase was cloudy and it appeared to have a white precipitate (likely carbamate salts).

The temperature of the water bath was then increased to 85° C. and N$_2$ bubbling was continued for 90 minutes, giving a total N$_2$ treatment of 3 hours. No additional physical changes were observed. The solution remained cloudy white in colour and some of the white precipitate had collected on the sides of the vial.

Example 21B: Ethylenediamine (18:18:1)

In a glass vial, 5.004 g H$_2$O, 0.283 g ethylenediamine, and 5.033 g THF were mixed to generate a single phase, clear, colourless solution. A stir bar was added to the vial and the vial was capped with a rubber septa. $CO_2$ was introduced into the solution via a single narrow gauge steel needle at a flow rate of about 5 mL min$^{-1}$. A second needle was inserted through the septa, but not into the solution, to act as a gas outlet. $CO_2$ was bubbled through the solution for 10 minutes until two liquid phases (aqueous and organic) were observed. It was found by $^1$H NMR that ~67% of the THF was forced out of the aqueous phase into the new organic phase.

The two phase mixture was then placed in a 60° C., water bath while $N_2$ was bubbled through the mixture in a fashion similar to the previous bubbling of $CO_2$. This was performed for 60 minutes where some THF boiled off, but the two phases did not recombine. The temperature of the water bath was then increased to 85° C. and $N_2$ bubbling was continued for 120 minutes, giving a total $N_2$ treatment of 3 hours. It appeared that all of the THF had boiled off as the volume had returned to that of the water and amine mixture. The solution was a single yellow liquid phase at this point, however a white precipitate (likely carbamate salts) caused the solution to appear cloudy.

Example 22: Salting Out THF from Water Using Secondary Amine Switchable Additives In general, from the observations using primary amines, secondary amines were expected to be difficult to reverse, because both secondary and primary amines tend to form carbamate salts in addition to bicarbonate salts when their aqueous solutions are contacted with $CO_2$. However the following secondary amines were found to be reversibly switchable. Without wishing to be bound by theory, it is possible that the reversibility results from a tendency to form more bicarbonate than carbamate salts.

The N-tert-butylethanolamine was purchased from TCI AMERICA and N-tert-butymethylamine was purchased from Sigma-Aldrich. Both compounds were used without further purification.

N-tert-Butylethanolamine and N-ter-butymethylamine were investigated as additives for switchable ionic strength solutions. To measure the extent of THF being forced out of an aqueous phase by an increase in ionic strength, and to measure the amount of amine remaining in the aqueous phase, 1:1 w/w solutions of THF and water (1.5 g each) were prepared in graduated cylinders. The appropriate mass of amine additive to result in a 1.60 molal solution was added and the cylinders were capped with rubber septa. After 30 minutes of bubbling carbon dioxide through the liquid phase from a single narrow gauge steel needle, a visible phase separation was observed. The volumes of each phase were recorded. Aliquots of the non-aqueous and aqueous layers were taken and dissolved in $d_3$-acetonitrile in NMR tubes. A known amount of ethyl acetate was added to each NMR tube as an internal standard. $^1$H NMR spectra were acquired and through integration of the ethyl acetate standard, a concentration of THF or additive was calculated and scaled up to reflect the total volume of the aqueous or non-aqueous phase giving a percentage of the compound being forced out or retained. Then argon was bubbled through the solution at 5 mL/min while heating to 50° C. until the two phases recombined (30 min for N-tert-butylethanolamine). The recombining of the phases when N-tert-butymethylamine was used as an additive was not successful at 30 min but was achieved by 2 h at a higher Ar flow rate of 15 mL/min. THF was added afterwards to replace the amount of THF being evaporated during the procedure. The whole switching process (30 min $CO_2$, sample take, then another Ar treatment) was repeated. The results are shown in the following table.

Salting Out-Experiments Using Secondary Amine Additives.

| Amine | THF forced out | Additive retained in H2O |
|---|---|---|
| N-tert-butylethanolamine | 68.7 ± 0.4% | 99.84 ± 0.04% |
| N-tert-butymethylamine | 67.6 ± 0.8% | 99.75 ± 0.04% |

All publications, patents and patent applications mentioned in this Specification are indicative of the level of ski of those skilled in the art to which this invention pertains and are herein incorporated by reference to the same extent as if each individual publication, patent, or patent applications was specifically and individually indicated to be incorporated by reference.

It will be understood by those skilled in the art that this description is made with reference to the preferred embodiments and that it is possible to make other embodiments employing the principles of the invention which fall within its spirit and scope as defined by the claims appended hereto. All such modifications as would be obvious to one skilled in the art are intended to be included within the scope of the following claims.

TABLE 1

Duration of $CO_2$ bubbling required to separate THF from aqueous phase comprising additive, and duration of $N_2$ bubbling required to recombine THF and the aqueous phase

| Additive | Time of $CO_2$ bubbling to get phase separation at 25° C. RT (min) | Time of $N_2$ bubbling to get phase recombination at 50° C. (min) |
|---|---|---|
| DMAE | ~30 | ~90 |
| MDEA | ~30 | ~30 |
| THEED | ~30 | ~60 |

TABLE 2

Amount of THF separated out of aqueous phase comprising additive and amount of additive retained in the aqueous phase

| Additive | Amount of THF separated (mol %) | Amount of additive retained (mol %) |
|---|---|---|
| DMAE | 76 ± 1.7% | 73.5 ± 2.0% |
| MDEA | 74 ± 3.0% | 90.7 ± 1.5% |
| THEED | 67 ± 5.0% | 98.6 ± 0.2% |

TABLE 4

Comparison of abilities of 0.80 molal aqueous solutions of amine additives to separate THF from 1:1 w/w solutions of THF and $H_2O$ and retention of amine additive in the aqueous phase when reacted with $CO_2$

| Additive | % THF Separated[a] | % Additive Retained[a] |
|---|---|---|
| DMAE | 70 ± 0.6% | 98.0 ± 0.2% |
| MDEA | 61 ± 0.6% | 99.0 ± 1.3% |
| TMDAB | 82 ± 0.6% | 99.2 ± 0.4% |
| DMAPAP | 79 ± 1.2% | 98.8 ± 0.4% |
| HMTETA | 78 ± 0.9% | 99.3 ± 0.4% |

[a]Determined by $^1$H NMR spectroscopy as discussed in Example 1.

TABLE 3

Comparison of relative amounts of amine additive to the separation of THF from 1:1 w/w solutions of THF and H₂O and retention of amine in aqueous phase when reacted with CO₂.

| Additive | THF:H$_2$O:Additive (w/w/w) | % THF Separated[a] | % Additive Retained[a] |
| --- | --- | --- | --- |
| DMAE | 1:1:1 | 76 ± 1.7% | 73.5 ± 2.0% |
| DMAE | 3:3:1 | 85 ± 2.2% | 93.9 ± 2.1% |
| DMAE | 5:5:1 | 74 ± 5.6% | 91.7 ± 2.6% |
| DMAE | 10:10:1 | 75 ± 0.3% | 98.3 ± 0.4% |
| MDEA | 1:1:1 | 74 ± 3.0% | 90.7 ± 1.7% |
| MDEA | 3:3:1 | 74 ± 3.8% | 95.7 ± 1.5% |
| MDEA | 5:5:1 | 72 ± 0.3% | 95.2 ± 1.5% |
| MDEA | 10:10:1 | 66 ± 3.0% | 96.6 ± 0.6% |
| TMDAB | 3:3:1 | 87 ± 1.3% | 87.1 ± 2.1% |
| TMDAB | 5:5:1 | 87 ± 0.6% | 99.6 ± 0.1% |
| TMDAB | 10:10:1 | 80 ± 0.5% | 99.4 ± 0.1% |
| TMDAB | 15:15:1 | 74 ± 0.9% | 98.4 ± 0.4% |
| DMAPAP | 3:3:1 | 78 ± 6.1% | 87.1 ± 7.3% |
| DMAPAP | 5:5:1 | 81 ± 1.0% | 98.4 ± 0.4% |
| DMAPAP | 10:10:1 | 69 ± 1.4% | 96.0 ± 0.8% |
| DMAPAP | 15:15:1 | 62 ± 1.1% | 94.4 ± 1.1% |
| HMTETA | 3:3:1 | 80 ± 4.0% | 95.6 ± 1.5% |
| HMTETA | 5:5:1 | 80 ± 3.0% | 98.4 ± 1.2% |
| HMTETA | 10:10:1 | 70 ± 1.3% | 98.0 ± 1.0% |
| HMTETA | 15:15:1 | 65 ± 4.9% | 98.2 ± 0.3% |

[a]Determined by $^1$H NMR spectroscopy as discussed in Example 2.

We claim:

1. A system for modulating an osmotic gradient across a membrane, comprising:
a semi-permeable membrane that is selectively permeable for water;
a switchable water, which comprises water and a switchable additive, the switchable water having a switchable ionic strength;
and
a source of an ionizing trigger, wherein the ionizing trigger ionizes the switchable additive into its water-miscible or water soluble protonated salt form and thereby increases the ionic strength of the switchable water;
wherein the switchable water contacts a first side of the semi-permeable membrane, and an aqueous feed stream contacts a second side of the semi-permeable membrane:
wherein the system modulates the osmotic gradient across said semi-permeable membrane via modulating the ionic strength of the switchable water, and
wherein the switchable additive has the general formula (1):

(1)

where $R^1$, $R^2$, and $R^3$ are independently:
H;
a substituted or unsubstituted $C_1$ to $C_8$ aliphatic group that is linear, branched, or cyclic, optionally wherein one or more C of the alkyl group is replaced by $\{-Si(R^{10})_2-O-\}$ up to and including 8 C being replaced by 8 $\{-Si(R^{10})_2-O-\}$;
a substituted or unsubstituted $C_nSi_m$ group where n and m are independently a number from 0 to 8 and n+m is a number from 1 to 8:
a substituted or unsubstituted $C_4$ to $C_8$ aryl group wherein aryl is optionally heteroaryl, optionally wherein one or more C is replaced by $\{-Si(R^{10})_2-O-\}$;
a substituted or unsubstituted aryl group having 4 to 8 ring atoms, optionally including one or more $\{-Si(R^{10})_2-O-\}$, wherein aryl is optionally heteroaryl;
a $-(Si(R^0)_2-O)_p-$ chain in which p is from 1 to 8 which is terminated by H, or is terminated by a substituted or unsubstituted $C_1$ to $C_8$ aliphatic and/or aryl group; or a substituted or unsubstituted ($C_1$ to $C_8$ aliphatic)-($C_4$ to $C_8$ aryl) group wherein aryl
is optionally heteroaryl, optionally wherein one or more C is replaced by a $\{-Si(R^{10})_2-O-\}$;
wherein any two of $R^1$, $R^2$, and $R^3$, taken together with the nitrogen to which they are attached, are optionally joined to form a heterocyclic ring;
wherein $R^{10}$ is a substituted or unsubstituted $C_1$ to $C_8$ aliphatic group, a substituted or unsubstituted $C_1$ to $C_8$ alkoxy, a substituted or unsubstituted $C_4$ to $C_8$ aryl wherein aryl is optionally heteroaryl, a substituted or unsubstituted aliphatic-alkoxy, a substituted or unsubstituted aliphatic-aryl, or a substituted or unsubstituted alkoxy-aryl group; and
wherein a substituent is independently: alkyl; alkenyl; alkynyl; aryl; aryl-halide; heteroaryl; cycloalkyl; Si(alkyl)$_3$; Si(alkoxy)$_3$; halo; alkoxyl; amino; alkylamino; alkenylamino; amide; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether, ester, silicon-containing moieties; thioester; or a combination thereof;
with the proviso that at least one of $R^1$, $R^2$ and $R^3$ is not H.

2. The system of claim 1, wherein the feed stream is seawater, brackish water, or wastewater.

3. The system of claim 1, wherein the ionizing trigger is $CO_2$, COS, $CS_2$, or a combination thereof.

4. The system of claim 3, wherein the ionizing trigger is $CO_2$.

5. The system of claim 1, wherein the system additionally comprises a source of a non-ionizing trigger, wherein the non-ionizing trigger deprotonates the switchable additive.

6. The system of claim 5, wherein the non-ionizing trigger is (i) heat, (ii) a flushing gas, (iii) a vacuum or partial vacuum, (iv) agitation, or (v) any combination thereof.

7. The system of claim 5, wherein the system additionally comprises an apparatus to separate the deprotonated switchable additive from the water in said switchable water.

8. The system of claim 7, wherein the apparatus comprises a reverse osmosis system.

9. The system of claim 7, wherein the deprotonated switchable additive is immiscible in water and wherein the apparatus comprises a decanter to decant the deprotonated switchable additive from the water; or, the deprotonated switchable additive is insoluble in water and wherein the apparatus comprises a filter to remove the insoluble deprotonated switchable additive.

10. The system of claim 1, wherein the switchable additive is:
MDEA (N-methyl diethanol-amine);
TMDAB (N, N, N', N'-tetramethyl-1, 4-diaminobutane);
TEDAB (N,N,N',N'-tetraethyl-1,4-diaminobutane);
EPDAB (N,N'-diethyl-N,N'-dipropyl-1,4-diaminobutane);

THEED (N, N, N', N'-tetrakis(2-hydroxyethyl) ethylene-diamine);
DMAPAP (1-[bis[3-(dimethylamino)]propyl]amino]-2-propanol);
HMTETA (1,1,4,7,10,10-hexamethyl triethylenetetramine);
MeSpe (N$^1$,N$^{1'}$-(butane-1,4-diyl)bis(N$^1$,N$^3$,N$^3$-trimethyl-propane-1,3-diamine);
Methylated polyethyleneimine; or
CHTDMA (1,1',1"-(cyclohexane-1,3,5-triyl)tris(N,N,-dimethylmethanamine).

11. A method of desalinating an aqueous salt solution or concentrating a dilute aqueous solution, comprising the steps of:
(a) contacting a switchable water comprising water and a switchable additive with an ionizing trigger to ionize the switchable additive into its water-miscible or water soluble protonated salt form and thereby increase the ionic strength of the switchable water;
(b) providing a semi-permeable membrane that is selectively permeable for water and has on one side a draw solution that comprises said switchable water, wherein the step of contacting the switchable water with the ionizing trigger to switch the switchable additive into its water-miscible or water soluble protonated salt form is performed before or after association of the switchable water with the semi-permeable membrane to increase the osmotic pressure of the draw solution; and
(c) contacting the other side of the semi-permeable membrane with a feed stream of the aqueous salt solution or the dilute aqueous solution to permit water to flow from the feed stream through the semi-permeable membrane into the increased ionic strength draw solution; wherein the switchable additive has the general formula (1):

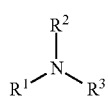
(1)

where R$^1$, R$^2$, and R$^3$ are independently:
H;
a substituted or unsubstituted C$_1$ to C$_8$ aliphatic group that is linear, branched, or cyclic, optionally wherein one or more C of the alkyl group is replaced by {—Si(R$^{10}$)$_2$—O—} up to and including 8 C being replaced by 8 {—Si(R$^{10}$)$_2$—O—};
a substituted or unsubstituted C$_n$Si$_m$ group where n and m are independently a number from 0 to 8 and n+m is a number from 1 to 8;
a substituted or unsubstituted C$_4$ to C$_8$ aryl group wherein aryl is optionally heteroaryl, optionally wherein one or more C is replaced by {—Si(R$^{10}$)$_2$—O—};
a substituted or unsubstituted aryl group having 4 to 8 ring atoms, optionally including one or more {—Si(R$^{10}$)$_2$—O—}, wherein aryl is optionally heteroaryl;
a —(Si(R$^{10}$)$_2$—O)$_p$— chain in which p is from 1 to 8 which is terminated by H, or is terminated by a substituted or unsubstituted C$_1$ to C$_8$ aliphatic and/or aryl group; or a substituted or unsubstituted (C$_1$ to C$_8$ aliphatic)-(C$_4$ to C$_8$ aryl) group wherein aryl is optionally heteroaryl, optionally wherein one or more C is replaced by a {—Si(R$^{10}$)$_2$—O—};

wherein any two of R$^1$, R$^2$, and R$^3$, taken together with the nitrogen to which they are attached, are optionally joined to form a heterocyclic ring;
wherein R$^{10}$ is a substituted or unsubstituted C$_1$ to C$_8$ aliphatic group, a substituted or unsubstituted C$_1$ to C$_8$ alkoxy, a substituted or unsubstituted C$_4$ to C$_8$ aryl wherein aryl is optionally heteroaryl, a substituted or unsubstituted aliphatic-alkoxy, a substituted or unsubstituted aliphatic-aryl, or a substituted or unsubstituted alkoxy-aryl group; and
wherein a substituent is independently: alkyl; alkenyl; alkynyl; aryl; aryl-halide; heteroaryl; cycloalkyl; Si(alkyl)$_3$; Si(alkoxy)$_3$; halo; alkoxyl; amino; alkylamino; alkenylamino; amide; hydroxyl; thioether; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester; or a combination thereof;
with the proviso that at least one of R$^1$, R$^2$ and R$^3$ is not H.

12. The method of claim 11, wherein the feed stream is seawater, brackish water, or wastewater.

13. The method of claim 11, wherein the ionizing trigger is CO$_2$, COS, CS$_2$, or a combination thereof.

14. The method of claim 13, wherein the ionizing trigger is CO$_2$.

15. The method of claim 11, further comprising the step of:
(d) removing the switchable additive from the resulting diluted draw solution.

16. The method of claim 15, wherein step (d) comprises contacting the diluted draw solution with a non-ionizing trigger to deprotonate the switchable additive.

17. The method of claim 16, wherein the non-ionizing trigger is (i) heat, (ii) a flushing gas, (iii) a vacuum or partial vacuum, (iv) agitation, or (v) any combination thereof.

18. The method of claim 16, wherein step (d) comprises reverse osmosis.

19. The method of claim 16, wherein the deprotonated switchable additive is immiscible in water and step (d) additionally comprises decanting the deprotonated switchable additive from the water; or, the deprotonated switchable additive is insoluble in water and step (d) additionally comprises filtering to remove the insoluble deprotonated switchable additive.

20. The method of claim 7, wherein the switchable additive is:
MDEA (N-methyl diethanol-amine);
TMDAB (N, N, N', N'-tetramethyl-1, 4-diaminobutane);
TEDAB (N,N,N',N'-tetraethyl-1,4-diaminobutane);
EPDAB (N,N'-diethyl-N,N'-dipropyl-1,4-diaminobutane);
THEED (N, N, N', N'-tetrakis(2-hydroxyethyl) ethylene-diamine);
DMAPAP (1-[bis[3-(dimethylamino)]propyl]amino]-2-propanol);
HMTETA (1,1,4,7,10,10-hexamethyl triethylenetetramine);
MeSpe (N$^1$,N$^{1'}$-(butane-1,4-diyl)bis(N$^1$,N$^3$,N$^3$-trimethyl-propane-1,3-diamine);
Methylated polyethyleneimine; or
CHTDMA (1,1',1"-(cyclohexane-1,3,5-triyl)tris(N,N,-dimethylmethanamine).

* * * * *